US011803440B2

(12) United States Patent
Harutyunyan et al.

(10) Patent No.: US 11,803,440 B2
(45) Date of Patent: Oct. 31, 2023

(54) AUTOMATED METHODS AND SYSTEMS FOR TROUBLESHOOTING AND OPTIMIZING PERFORMANCE OF APPLICATIONS RUNNING IN A DISTRIBUTED COMPUTING SYSTEM

(71) Applicant: VMware, Inc., Palo Alto, CA (US)

(72) Inventors: Ashot Nshan Harutyunyan, Yerevan (AM); Arnak Poghosyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 63 days.

(21) Appl. No.: 17/490,340

(22) Filed: Sep. 30, 2021

(65) Prior Publication Data

US 2023/0099001 A1    Mar. 30, 2023

(51) Int. Cl.
  *G06F 11/07*  (2006.01)
  *G06N 5/04*  (2023.01)
  *G06F 11/36*  (2006.01)
  *G06F 11/34*  (2006.01)

(52) U.S. Cl.
  CPC ........ *G06F 11/079* (2013.01); *G06F 11/3447* (2013.01); *G06F 11/3612* (2013.01); *G06N 5/04* (2013.01)

(58) Field of Classification Search
  CPC ............... G06F 11/0793; G06F 11/079; G06F 11/3447; G06F 11/302; G06F 11/3051; G06N 5/04
  See application file for complete search history.

(56) References Cited

U.S. PATENT DOCUMENTS

| | | | |
|---|---|---|---|
| 11,188,411 B1 * | 11/2021 | Shen | G06N 20/00 |
| 11,366,842 B1 * | 6/2022 | Swaminathan | G06F 17/18 |
| 2015/0317563 A1 * | 11/2015 | Baldini Soares | G06N 5/04 706/12 |
| 2019/0266070 A1 * | 8/2019 | Bhandarkar | G06F 11/3072 |
| 2019/0377652 A1 * | 12/2019 | Sahoo | G06F 11/3447 |
| 2020/0371891 A1 * | 11/2020 | Horley | G06F 11/0721 |
| 2020/0379837 A1 * | 12/2020 | Krishnaswamy | G06F 11/079 |
| 2020/0409825 A1 * | 12/2020 | Balasubramanian | G06F 16/90335 |
| 2021/0255914 A1 * | 8/2021 | Ciabarra, Jr. | G06F 11/079 |
| 2022/0066906 A1 * | 3/2022 | Kumar | G06N 5/04 |

* cited by examiner

*Primary Examiner* — Yolanda L Wilson

(57) ABSTRACT

Automated processes and systems troubleshoot and optimize performance of applications running in distributed computing systems. An automated computer-implemented processes train an inference model for an application based on metrics associated with the application and a key performance indicator ("KPI") of the application. When a run-time performance problem is detected in run-time KPI values of KPI, the trained inference model is applied to run-time metrics and run-time KPI values to identify relevant run-time metrics that can be used to identify the root cause of the performance problem. The root cause of the performance problem can be used to generate a recommendation for correcting the performance problem. An alert identifying the root cause of the performance problem and the recommendation for correcting the performance problem are displayed on an interface of a display, thereby enabling correction of the performance problem and optimization of the application.

21 Claims, 46 Drawing Sheets

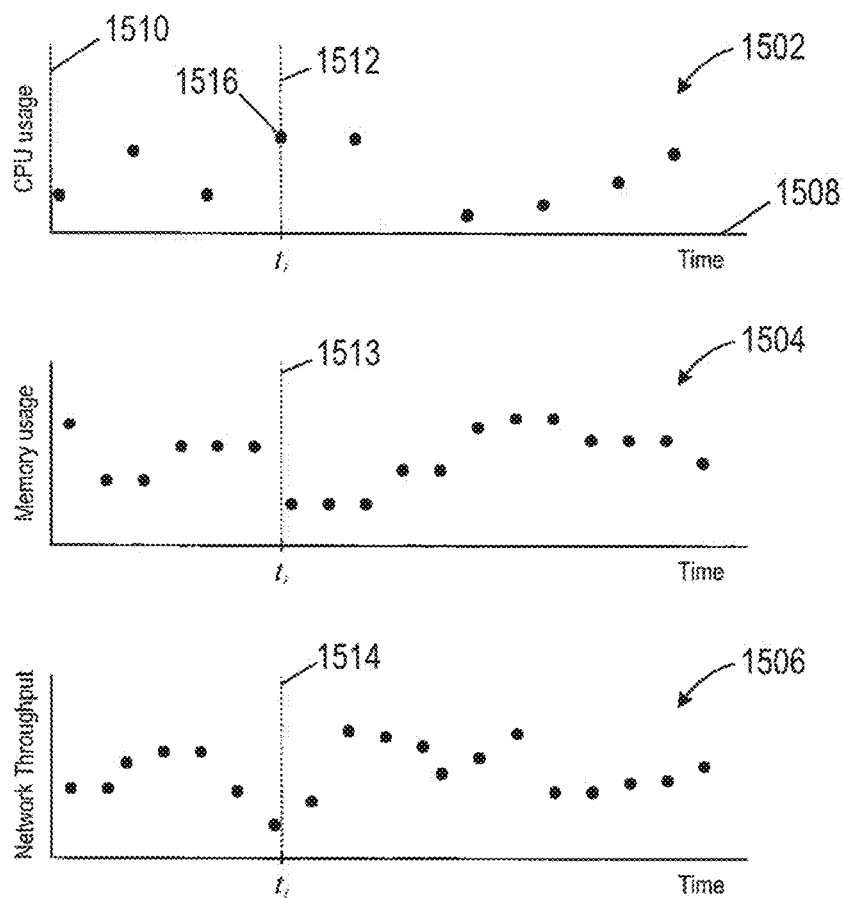
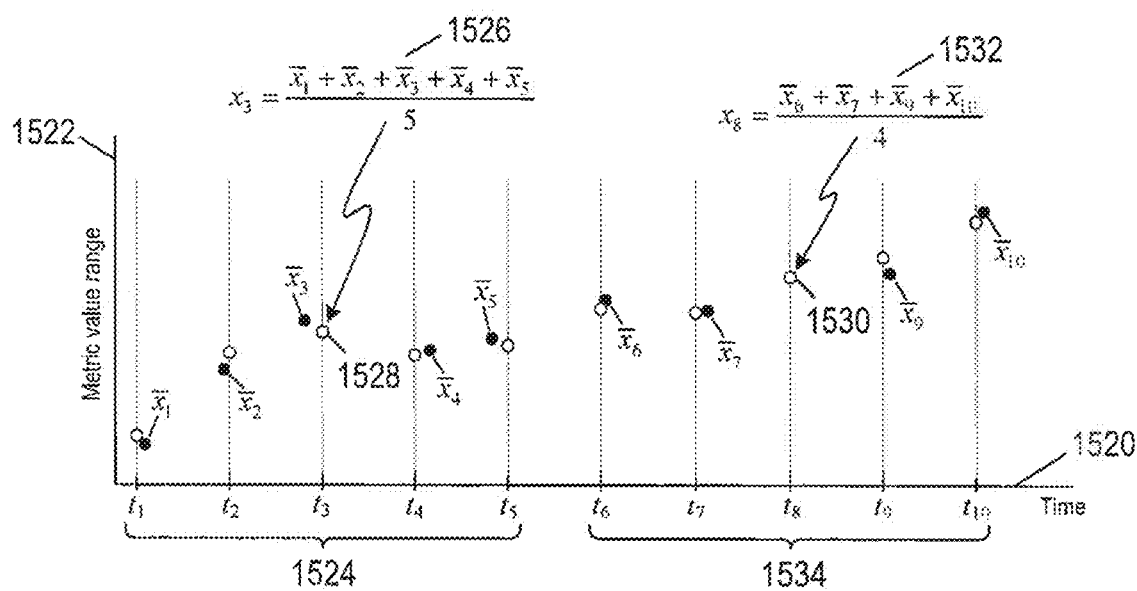
FIG. 15A
FIG. 15B $$Y = \begin{bmatrix} y_1 \\ y_2 \\ y_3 \\ \vdots \\ y_i \\ \vdots \\ y_n \end{bmatrix} \text{—1702} \quad X_j = \begin{bmatrix} x_{1j} \\ x_{2j} \\ x_{3j} \\ \vdots \\ x_{ij} \\ \vdots \\ x_{nj} \end{bmatrix} \text{—1704} \quad X = \begin{bmatrix} x_{11} & x_{12} & x_{13} & \cdots & x_{1j} & \cdots & x_{1p} \\ x_{21} & x_{22} & x_{23} & \cdots & x_{2j} & \cdots & x_{2p} \\ x_{31} & x_{32} & x_{33} & \cdots & x_{3j} & \cdots & x_{3p} \\ \vdots & \vdots & \vdots & & \vdots & & \vdots \\ x_{i1} & x_{i2} & x_{i3} & \cdots & x_{ij} & \cdots & x_{ip} \\ \vdots & \vdots & \vdots & & \vdots & & \vdots \\ x_{n1} & x_{n2} & x_{n3} & \cdots & x_{nj} & \cdots & x_{np} \end{bmatrix} \text{—1706}$$

$$\tilde{X} = \begin{bmatrix} 1 & X_1 & X_2 & \cdots & X_j & \cdots & X_p \end{bmatrix} = \begin{bmatrix} 1 & x_{11} & x_{12} & x_{13} & \cdots & x_{1j} & \cdots & x_{1p} \\ 1 & x_{21} & x_{22} & x_{23} & \cdots & x_{2j} & \cdots & x_{2p} \\ 1 & x_{31} & x_{32} & x_{33} & \cdots & x_{3j} & \cdots & x_{3p} \\ \vdots & \vdots & \vdots & \vdots & & \vdots & & \vdots \\ 1 & x_{i1} & x_{i2} & x_{i3} & \cdots & x_{ij} & \cdots & x_{ip} \\ \vdots & \vdots & \vdots & \vdots & & \vdots & & \vdots \\ 1 & x_{n1} & x_{n2} & x_{n3} & \cdots & x_{nj} & \cdots & x_{np} \end{bmatrix}$$

(1710, 1708)

$$\beta = \begin{bmatrix} \beta_0 \\ \beta_1 \\ \beta_2 \\ \vdots \\ \beta_j \\ \vdots \\ \beta_p \end{bmatrix} \text{—1712} \quad \varepsilon = \begin{bmatrix} \varepsilon_1 \\ \varepsilon_2 \\ \varepsilon_3 \\ \vdots \\ \varepsilon_i \\ \vdots \\ \varepsilon_n \end{bmatrix} \text{—1714}$$

FIG. 17

$$\hat{M}^{(0)} \longrightarrow C_p^{(0)}$$
$$\hat{M}^{(1)} \longrightarrow C_p^{(1)}$$
$$\hat{M}^{(2)} \longrightarrow C_p^{(2)}$$
$$\hat{M}^{(3)} \longrightarrow C_p^{(3)}$$
$$\vdots \qquad \vdots$$
$$\hat{M}^{(\gamma)} \longrightarrow C_p^{(\gamma)}$$
$$\vdots \qquad \vdots$$
$$\hat{M}^{(p-Q+1)} \longrightarrow C_p^{(p-Q+1)}$$

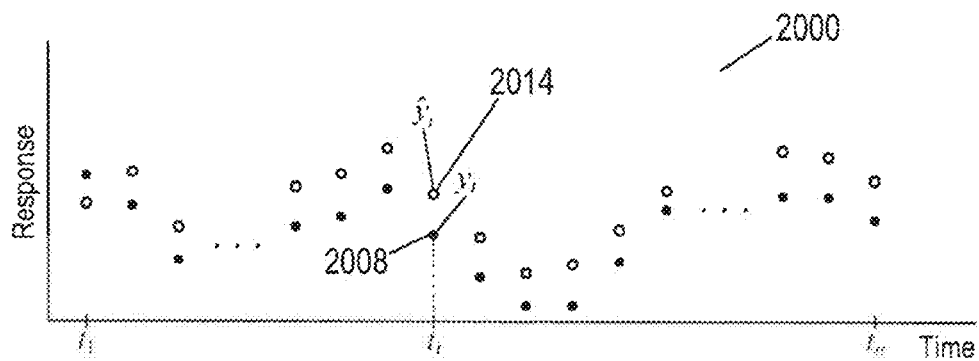
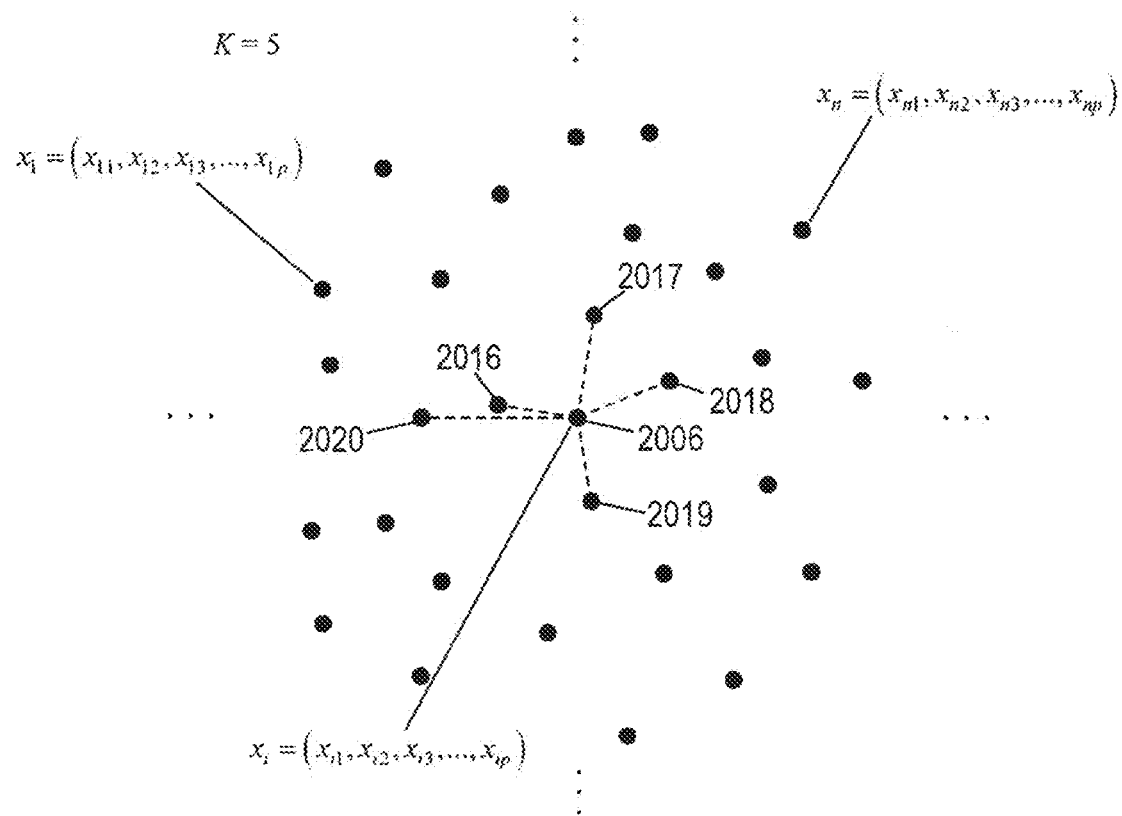
FIG. 20B

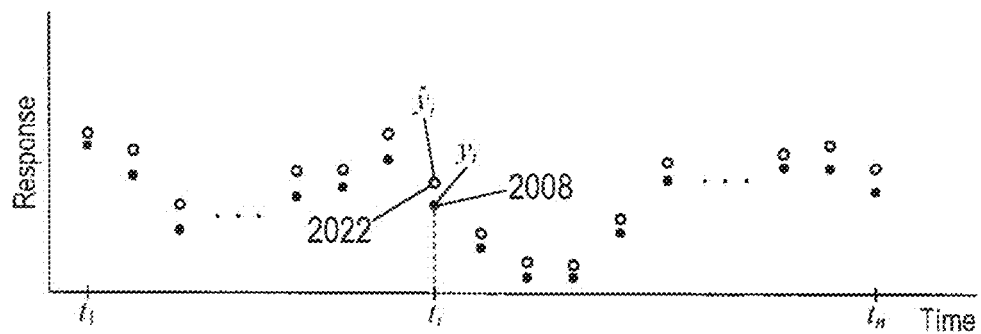
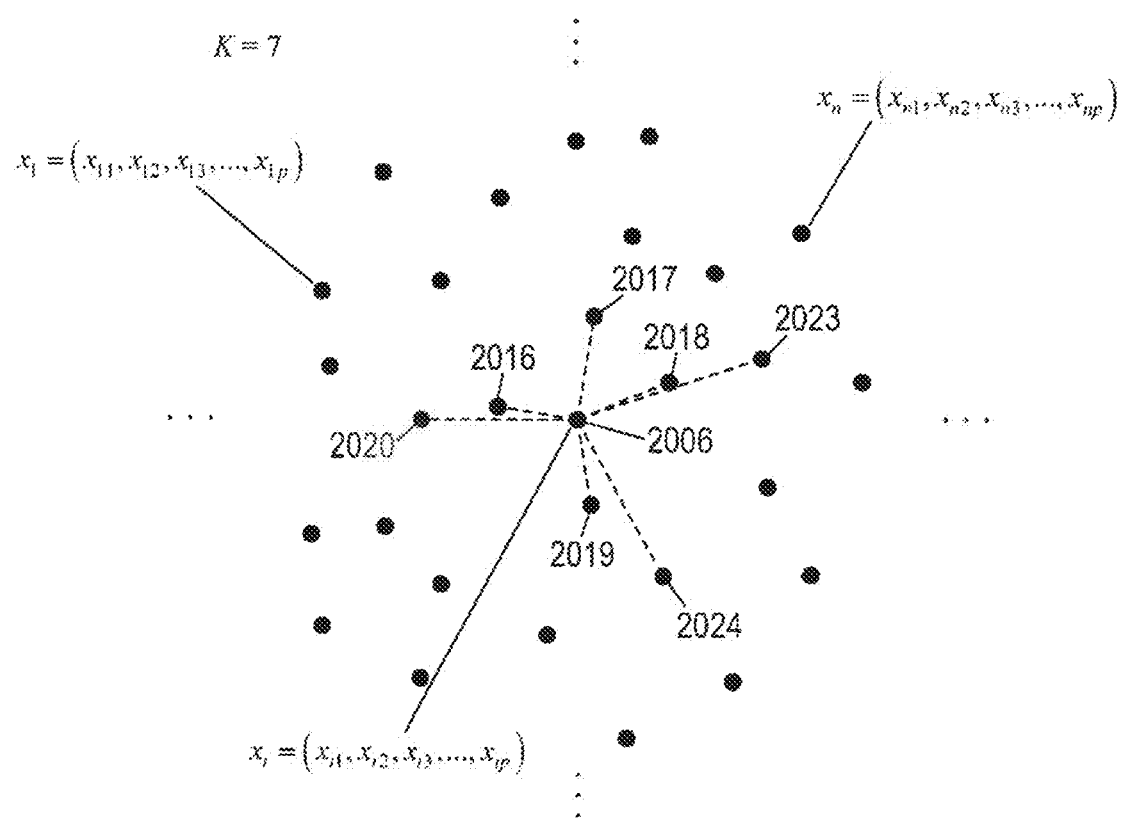
FIG. 20C

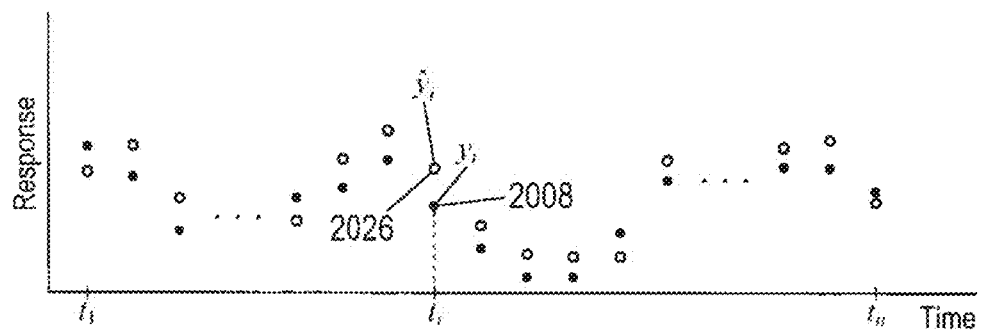
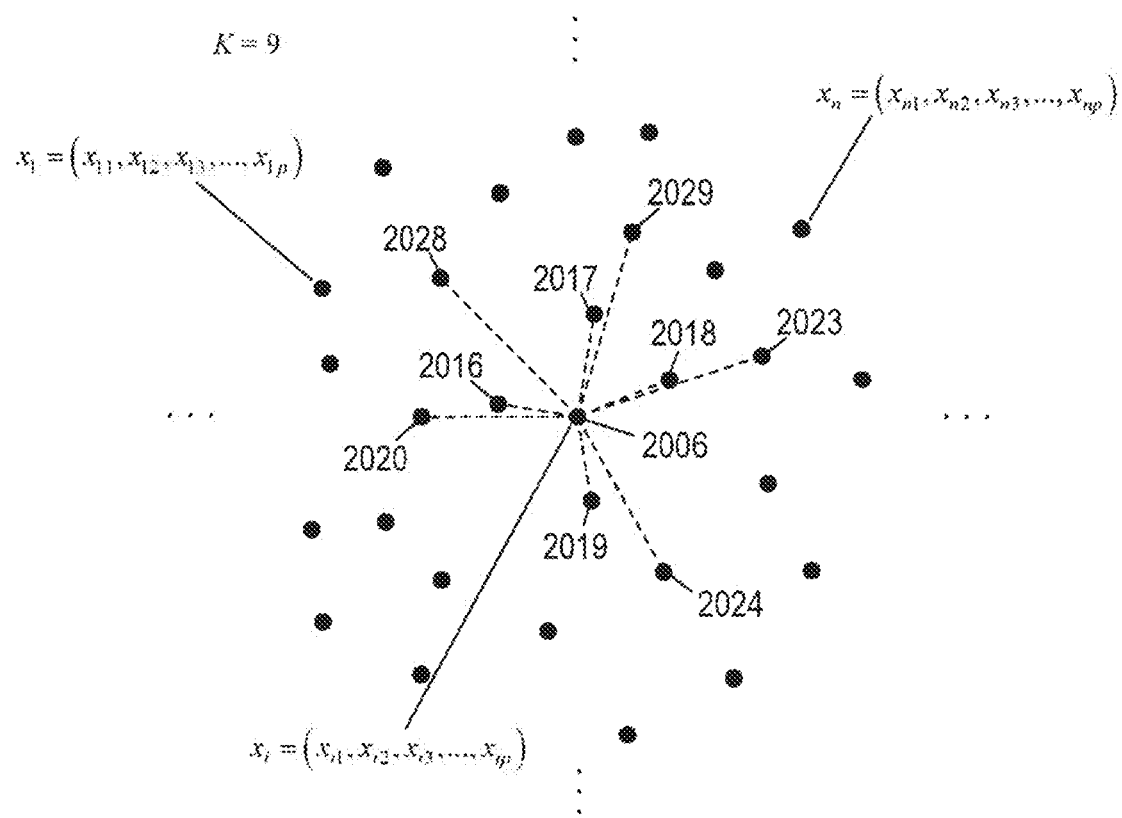
FIG. 20D

| Rank | Score | Metric description |
|---|---|---|
| 1 | 100.00 | System attribute change index |
| 2 | 100.00 | System attribute health |
| 3 | 92.34 | Badge anomaly |
| 4 | 72.85 | Memory host usage |
| 5 | 72.65 | Memory guest usage |
| 6 | 72.65 | Memory consumed average |
| 7 | 72.02 | Memory host dynamic entitlement |
| 8 | 67.98 | Memory shared average |
| 9 | 64.51 | Memory overhead average |
| 10 | 54.20 | CPU demand entitlement ratio |
| 11 | 51.11 | Memory reservation used |
| 12 | 51.11 | Memory overheadMax average |
| 13 | 51.11 | Memory guest demand |
| 14 | 51.11 | Memory non-pageable memory |
| 15 | 37.91 | Guest needed memory |
| 16 | 30.04 | Guest free memory |
| 17 | 30.04 | CPU vCPU usage disparity |
| 18 | 29.24 | CPU peak vCPU usage |
| 19 | 28.72 | Datastore outstanding IO request |
| ⋮ | ⋮ | ⋮ |

Rows 1–14: Inadequate memory allocated to VMs of Application

FIG. 22A

| Rank | Score | Metric description |
|---|---|---|
| 1 | 100.00 | CPU Wait |
| 2 | 97.51 | CPU Contention |
| 3 | 96.37 | CPU Reservation used |
| 4 | 90.64 | CPU Demand |
| 5 | 89.19 | CPU Usage |
| 6 | 85.75 | CPU Latency |
| 7 | 81.63 | vCPU Usage disparity |
| 8 | 80.35 | CPU demand entitlement ratio |
| 9 | 78.51 | CPU vCPU usage disparity |
| 10 | 73.58 | CPU demand entitlement ratio |
| 11 | 69.23 | CPU Throttled (%) |
| 12 | 65.71 | CPU Active (%) |
| 13 | 62.95 | CPU Running (%) |
| 14 | 60.50 | Memory non-pageable memory |
| 15 | 43.71 | Guest needed memory |
| 16 | 41.82 | Guest free memory |
| 17 | 39.27 | CPU vCPU usage disparity |
| 18 | 36.84 | CPU peak vCPU usage |
| 19 | 32.74 | Datastore outstanding IO request |
| ⋮ | ⋮ | ⋮ |

Rows 1–14: Inadequate CPU allocated VMs of Application

FIG. 22B

| Rank | Score  | Metric description                        |
|------|--------|-------------------------------------------|
| 1    | 100.00 | Datastore outstanding IO request          |
| 2    | 98.37  | Datastore number of outstanding IO requests |
| 3    | 95.59  | Datastore total latency                   |
| 4    | 91.94  | Datastore total throughput                |
| 5    | 87.31  | Datastore used space                      |
| 6    | 87.67  | Diskspace provisional space               |
| 7    | 85.11  | Datastore write IOPs                      |
| 8    | 79.53  | Datastore read IOPs                       |
| 9    | 75.12  | Datastore read latency                    |
| 10   | 75.10  | Datastore write latency                   |
| 11   | 72.76  | Datastore total latency max               |
| 12   | 53.51  | Datastore outstanding IO request          |
| 13   | 50.15  | CPU Running (%)                           |
| 14   | 43.22  | CPU demand entitlement ratio              |
| 15   | 41.71  | Memory non-pageable memory                |
| 16   | 37.28  | Guest needed memory                       |
| 17   | 34.32  | Guest free memory                         |
| 18   | 29.19  | CPU peak vCPU usage                       |
| 19   | 21.83  | Guest filed system utilization            |
| ⋮    | ⋮      | ⋮                                         |

Rows 1–13: Inadequate data store allocated for Application

FIG. 22C

| Rank | Score | Metric description | |
|---|---|---|---|
| 1 | 100.00 | Network total throughput | ⎫ |
| 2 | 100.00 | Network packets per second | ⎪ |
| 3 | 96.91 | Network data receive rate | ⎪ |
| 4 | 92.36 | Network received packets dropped | ⎪ |
| 5 | 84.28 | Network packets transmitted per second | ⎬ Inadequate network bandwidth allocated for Application |
| 6 | 83.21 | Network packets dropped | ⎪ |
| 7 | 85.11 | Network multicast packets transmitted | ⎪ |
| 8 | 79.53 | Network VM to host data transmit rate | ⎪ |
| 9 | 75.12 | Network host usage rate | ⎪ |
| 10 | 75.10 | Network packets received | ⎪ |
| 11 | 72.76 | Network VM to host data receive rate | ⎪ |
| 12 | 53.51 | Datastore total latency | ⎪ |
| 13 | 50.15 | Network broadcast packets transmitted | ⎭ |
| 14 | 43.22 | Network multicast packets transmitted | |
| 15 | 41.71 | CPU contention | |
| 16 | 37.28 | Memory balloon (%) | |
| 17 | 34.32 | CPU throttled (%) | |
| 18 | 29.19 | Guest needed memory | |
| 19 | 21.83 | Diskspace VM used | |
| ⋮ | ⋮ | ⋮ | |

FIG. 22D

| List of ranked metrics /2401 | Performance problem /2402 | Recommendation /2403 |
|---|---|---|
| List of ranked metrics_1 | Insufficient vCPU allocated to $VM_1$ | Increase CPU allocation to $VM_1$ |
| List of ranked metrics_2 | Insufficient vCPU allocated to $VM_2$ | Increase CPU allocation to $VM_2$ |
| ⋮ | ⋮ | ⋮ |
| List of ranked metrics_21 | Insufficient vmemory allocated to $VM_1$ | Increase vmemory allocation to $VM_1$ |
| List of ranked metrics_22 | Insufficient vmemory allocated to $VM_2$ | Increase vmemory allocation to $VM_2$ |
| ⋮ | ⋮ | ⋮ |
| List of ranked metrics_45 | Insufficient network throughput to host | Migrate VMs to another host |
| List of ranked metrics_46 | Insufficient network throughput to $VM_1$ | Increase vNIC to $VM_1$ |
| ⋮ 2404 | ⋮ 2405 | ⋮ 2406 |
| List of ranked metrics_61 | Error in service pack for the application | Backout service pack correction |
| ⋮ | ⋮ | ⋮ |

FIG. 24

| Sets of metrics /2501 | Performance problem /2502 | Recommendation /2503 |
|---|---|---|
| $\{v_1\}$ | Insufficient vCPU allocated to $VM_1$ | Increase CPU allocation to $VM_1$ |
| $\{v_3\}$ | Insufficient vCPU allocated to $VM_2$ | Increase CPU allocation to $VM_2$ |
| ⋮ | ⋮ | ⋮ |
| $\{v_1,v_2\}$ | Insufficient vmemory allocated to $VM_1$ | Increase vmemory allocation to $VM_1$ |
| $\{v_2,v_4\}$ | Insufficient vmemory allocated to $VM_2$ | Increase vmemory allocation to $VM_2$ |
| ⋮ 2504 | ⋮ 2505 | ⋮ 2506 |
| $\{v_8,v_{16},v_{22},v_{21},v_{35}\}$ | Insufficient network throughput to host | Migrate VMs to another host |
| $\{v_9,v_{12},v_{21}\}$ | Insufficient network throughput to $VM_1$ | Increase vNIC to $VM_1$ |
| ⋮ | ⋮ | ⋮ |
| $\{v_{27},v_{35},v_{36},v_{46},v_{49},v_{52}\}$ | Error in service pack for the application | Backout service pack correction |
| ⋮ | ⋮ | ⋮ |

FIG. 25

AUTOMATED METHODS AND SYSTEMS FOR TROUBLESHOOTING AND OPTIMIZING PERFORMANCE OF APPLICATIONS RUNNING IN A DISTRIBUTED COMPUTING SYSTEM

TECHNICAL FIELD

This disclosure is directed to troubleshooting and optimizing applications running in a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems, are networked together with large-capacity data-storage devices and other electronic devices to produce geographically distributed computing systems, called data centers, that provide enormous computational bandwidths and data-storage capacities. These large, distributed computing systems and are made possible by advancements in computer networking, data-storage appliances, computer hardware and advancements in virtualization, distributed operating systems and applications, and other software technologies. Businesses, governments, and other organizations increasingly conduct commerce, provide services over the Internet, and process and store large volumes of data using distributed applications executed in data centers. As a result, the number, size, and complexity of data centers have continued to grow to meet the increasing demand for information technology ("IT") services.

Although advancements in virtualization and software technologies provide many advantages for development and deployment of applications in data centers, troubleshooting applications running in large, distributed computing systems has become increasingly more complicated. System administrators and software engineers are aided by management tools that collect hundreds of thousands of streams of metric data called "metrics." A metric is a time-dependent quantitative measure of a property of a software system or hardware process. Categories of metrics include CPU usage, memory usage, number of datastores, network throughput, amount of disk space, and summary metrics of the various virtual and physical objects of a data center. With the aid of current management tools, teams of software engineers troubleshoot performance problems with applications based on manual workflows and domain experience to identify a root cause of a problem. However, even with the aid of current management tools, this troubleshooting process performed by software engineers is error prone and can take weeks and, in some cases, months. Long periods spent by engineers troubleshooting an application performance problem increases costs for organizations and can result in errors in processing transactions and denying people access to services provided by an organization for long periods. As a result, current approaches to finding root causes of performance problems with applications running in large, distributed computing systems are time-consuming, costly, error prone, and are challenging problems for organizations and data-center administrators to solve. Software engineers, administrators, and organizations seek automated methods and systems that reduce the time and increase the accuracy in identifying root causes of performance problems in applications running in distributed computing systems.

SUMMARY

Automated processes and systems described herein troubleshoot and optimize performance of applications running in distributed computing systems. In one aspect, an automated computer-implemented process for troubleshooting performance problem of an application trains an inference model for the application based on historical metrics associated with the application and a key performance indicator ("KPI") of the application. In response to detecting a run-time performance problem in run-time KPI values of the KPI, the trained inference model is applied to run-time metrics and run-time KPI values to identify relevant run-time metrics that can be used to identify the root cause of the performance problem. The root cause of the performance problem can be used to generate a recommendation for correcting the performance problem. An alert identifying the root cause of the performance problem and the recommendation for correcting the performance problem are displayed on an interface of a display, thereby providing immediate notification of the run-time performance problem and optimization of the application.

DESCRIPTION OF THE DRAWINGS

FIG. 15A shows plots of examples of unsynchronized metrics recorded in the same time interval.

FIG. 15B shows a plot of metric values synchronized to a general set of uniformly spaced time stamps.

FIG. 17 shows matrix representations of a linear parametric model.

FIGS. 20A-20E show an example of determining a K-nearest neighbor regression model.

FIGS. 22A-22D show examples of highest ranked metrics associated with different types of performance problems.

FIG. 24 shows a table of example rules stored in a data storage device and is accessed by the operations manager to report performance problems and recommendations for correcting the performance problem.

FIG. 25 shows a table of example rules stored in a data storage device and is accessed by the operations manager to report performance problems and recommendations for correcting the performance problem.

DETAILED DESCRIPTION

This disclosure is directed to automated computational processes and systems that troubleshoot and optimize performance of applications running in a distributed computing system. Computer hardware, complex computational systems, and virtualization are described in a first subsection. Automated computer-implemented processes and systems for troubleshooting and optimizing performance of applications running in a distributed computing system are described below in a second subsection.

Computer Hardware, Computational Systems, and Virtualization

The term "abstraction" is not, in any way, intended to mean or suggest an abstract idea or concept. Computational abstractions are tangible, physical interfaces that are implemented using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that "software implemented" functionality is provided. The digitally encoded computer instructions are a physical control component of processor-controlled machines and devices. Multi-cloud aggregations, cloud-computing services, virtual-machine containers and virtual machines, containers, communications interfaces, and many of the other topics discussed below are tangible, physical components of physical, electro-optical-mechanical computer systems.

Figure 1:
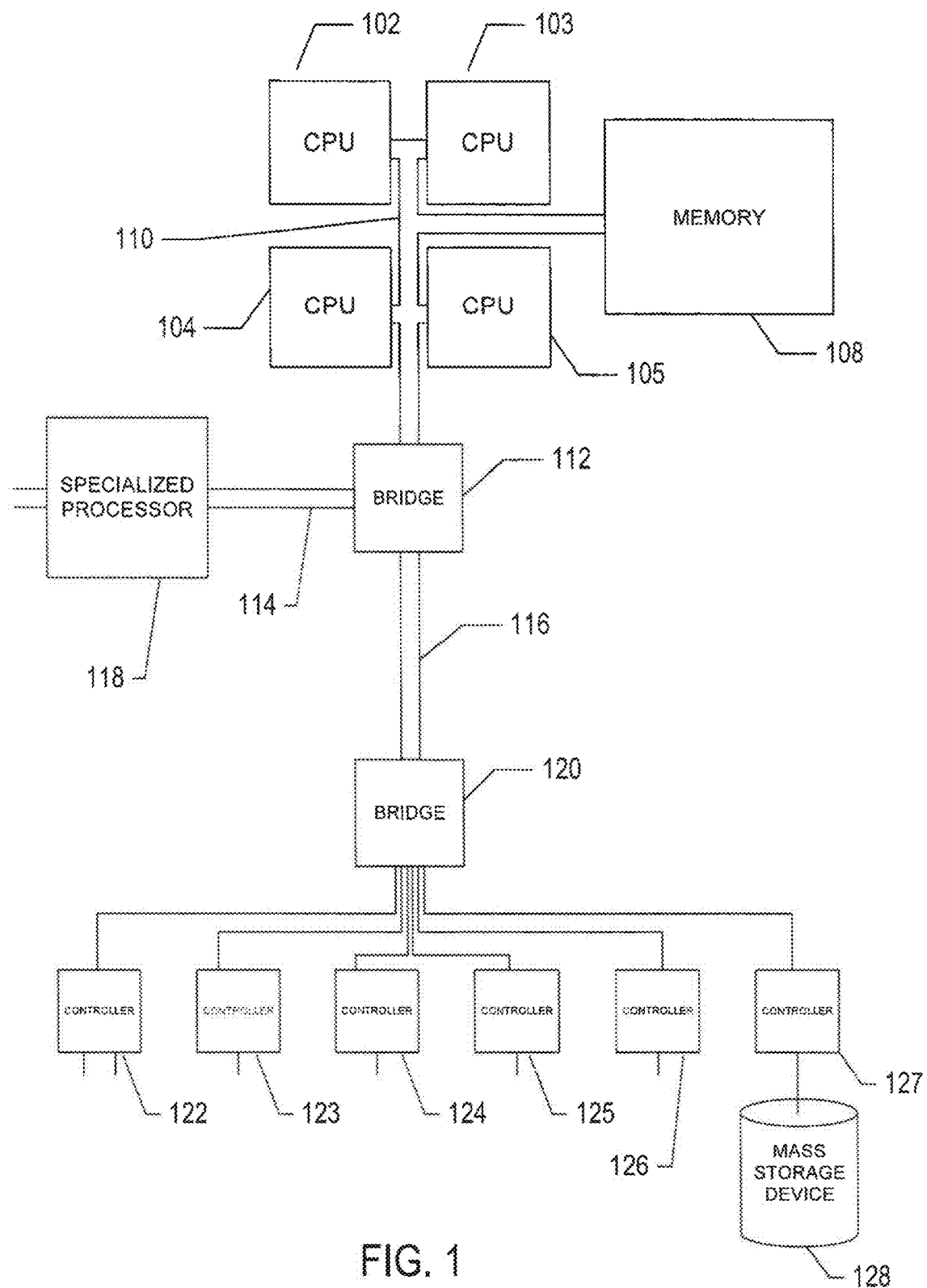
FIG. 1 shows an architectural diagram for various types of computers.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
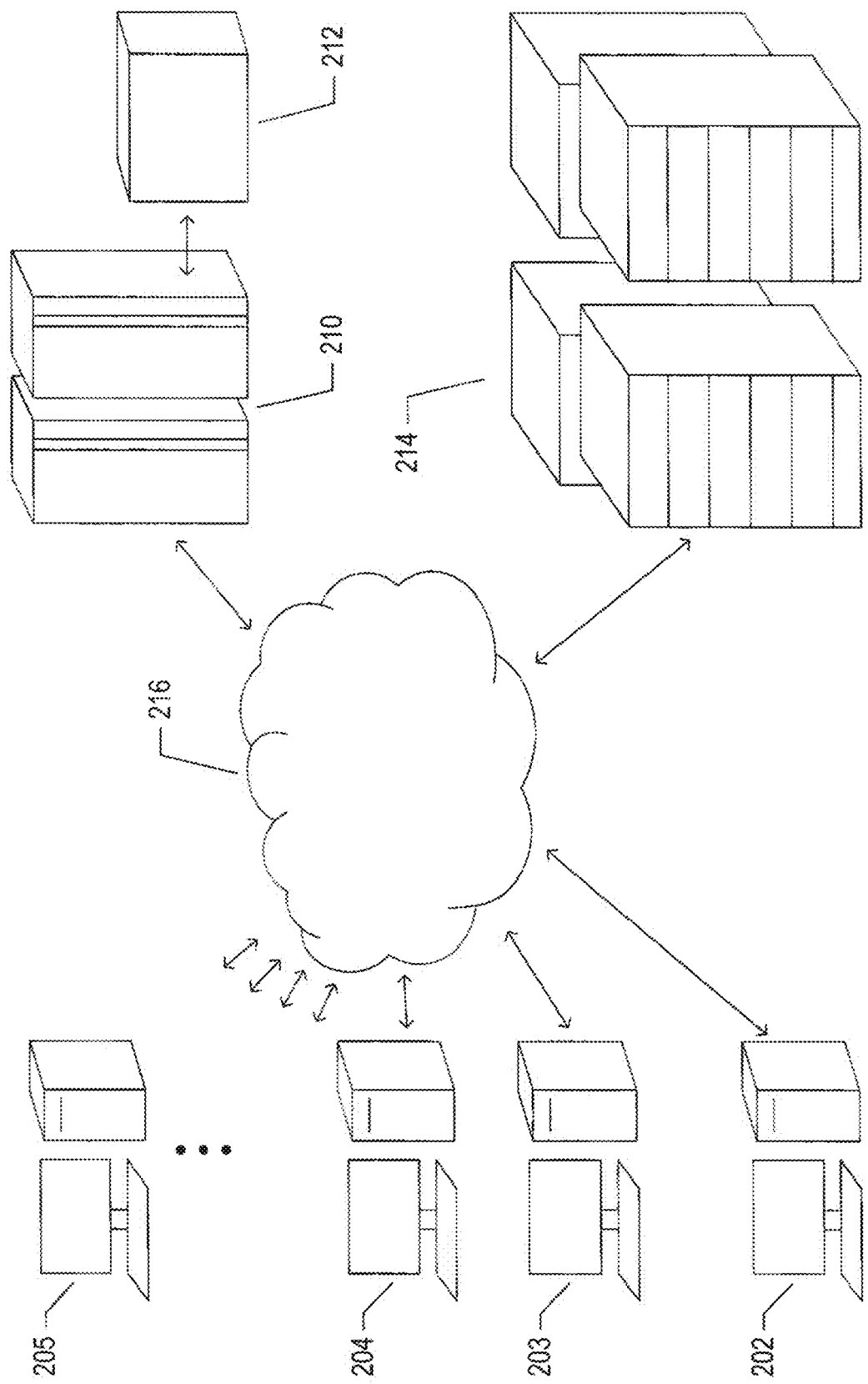
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which many PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
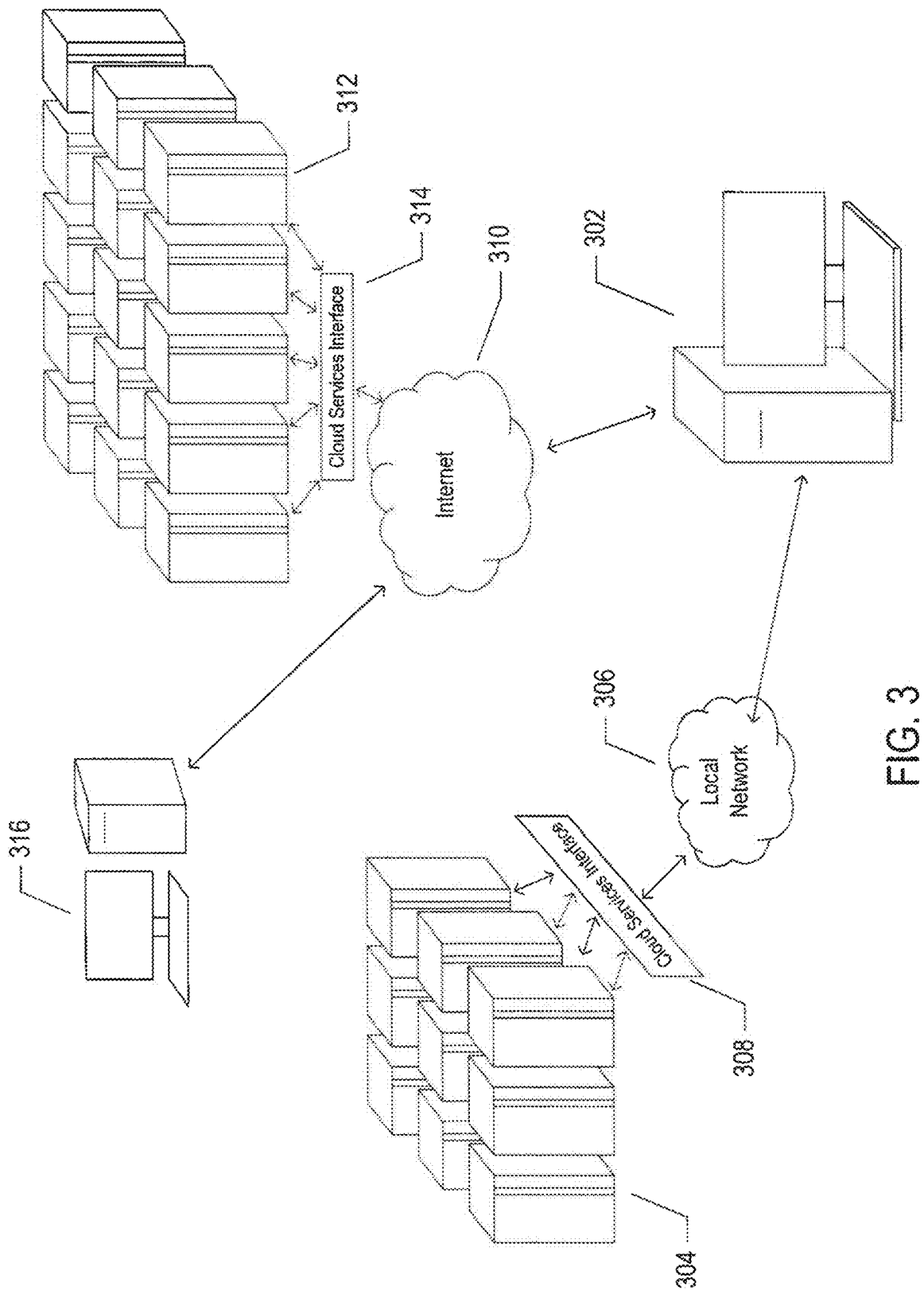
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
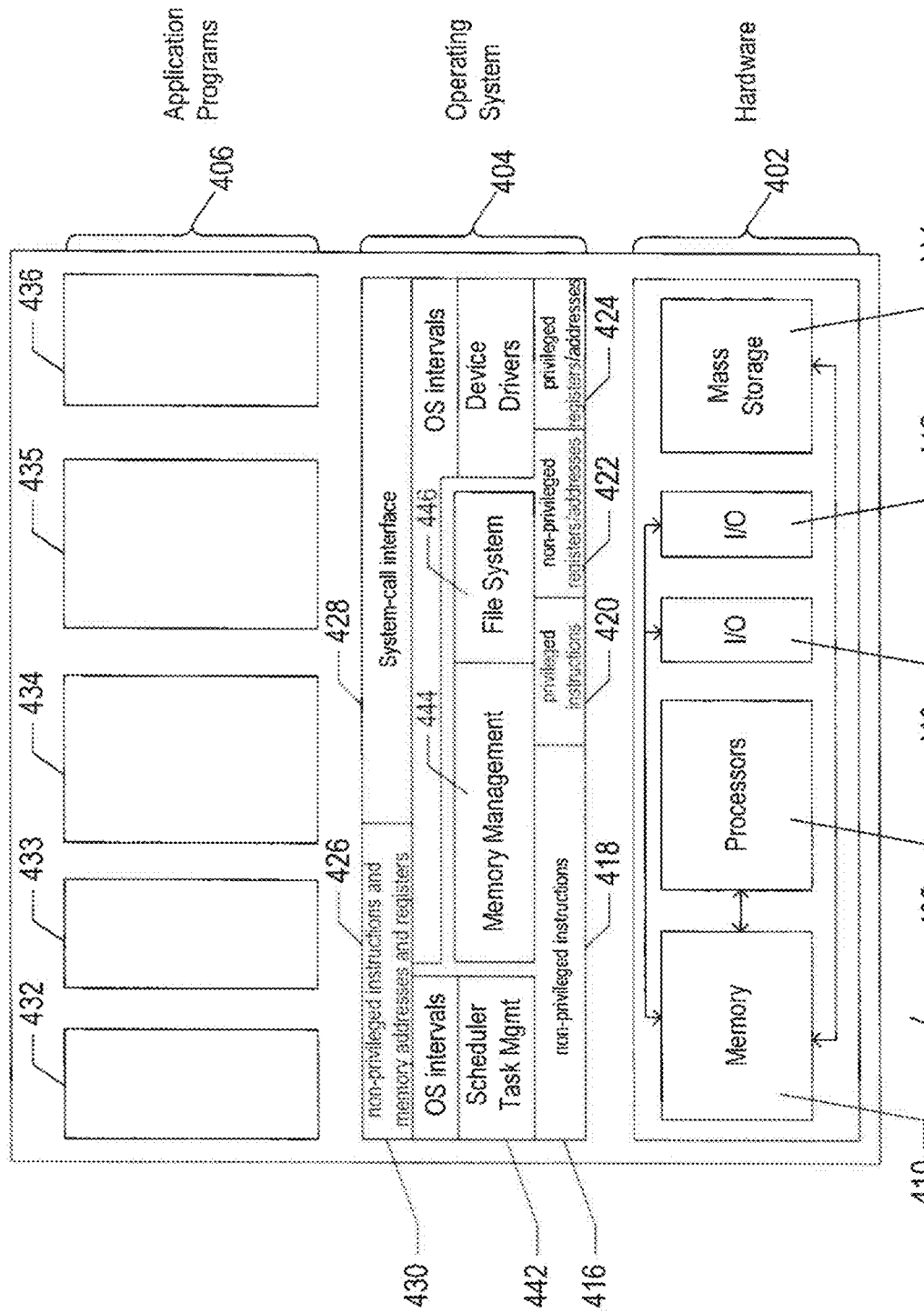
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
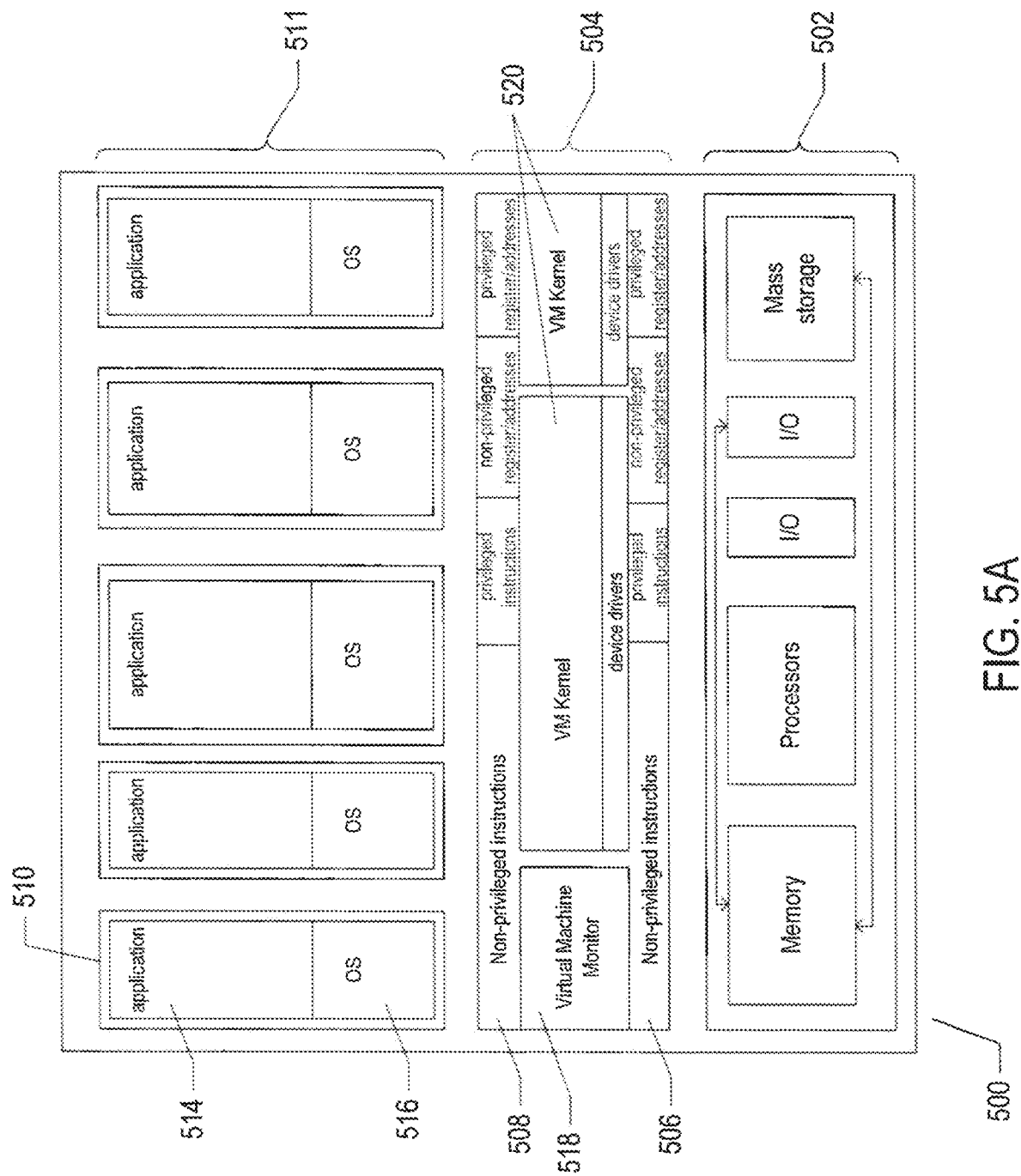
FIGS. 5A-5B show two types of virtual machine ("VM") and VM execution environments.
Figure 5B:
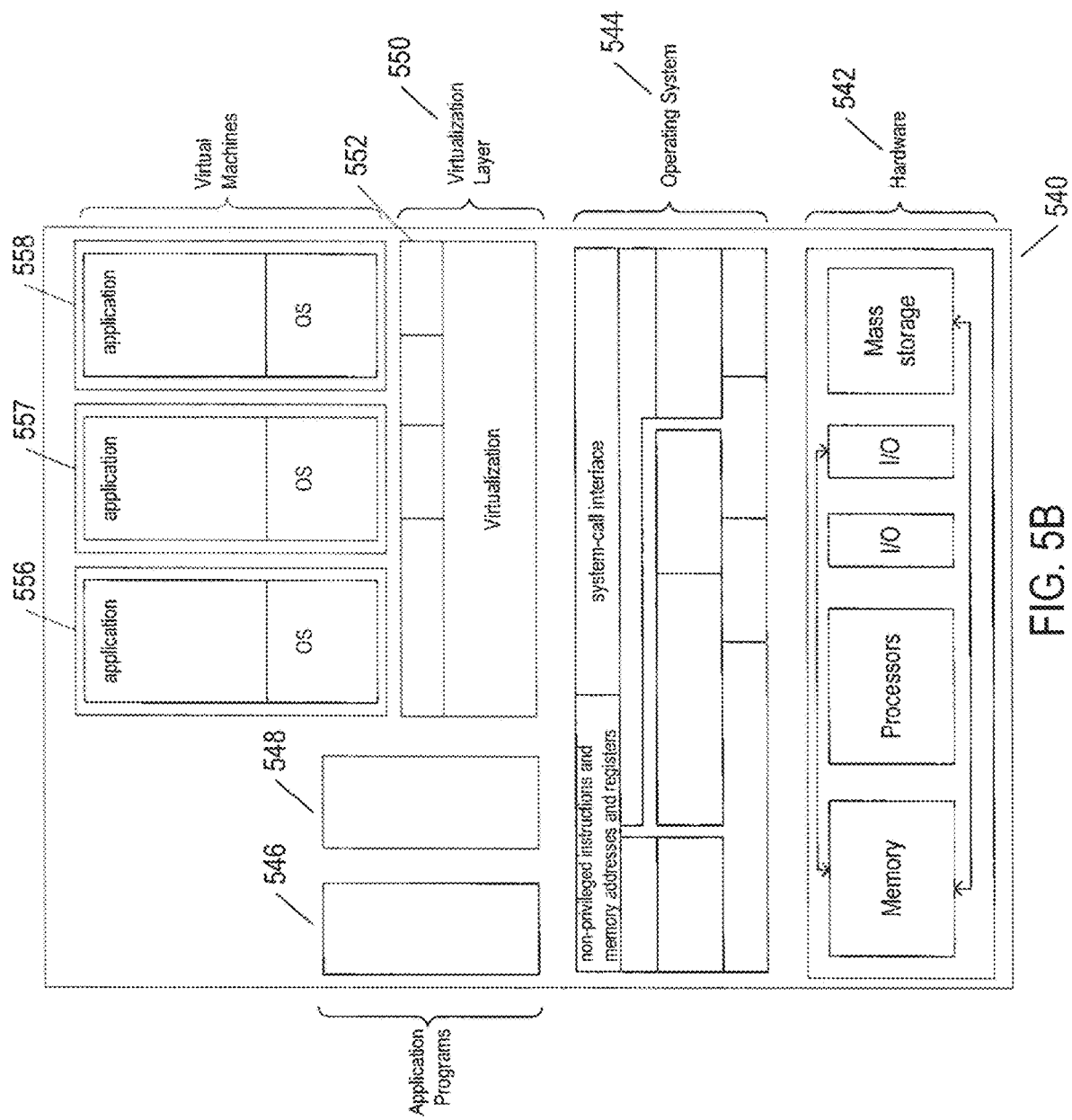

For the above reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. Figure 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
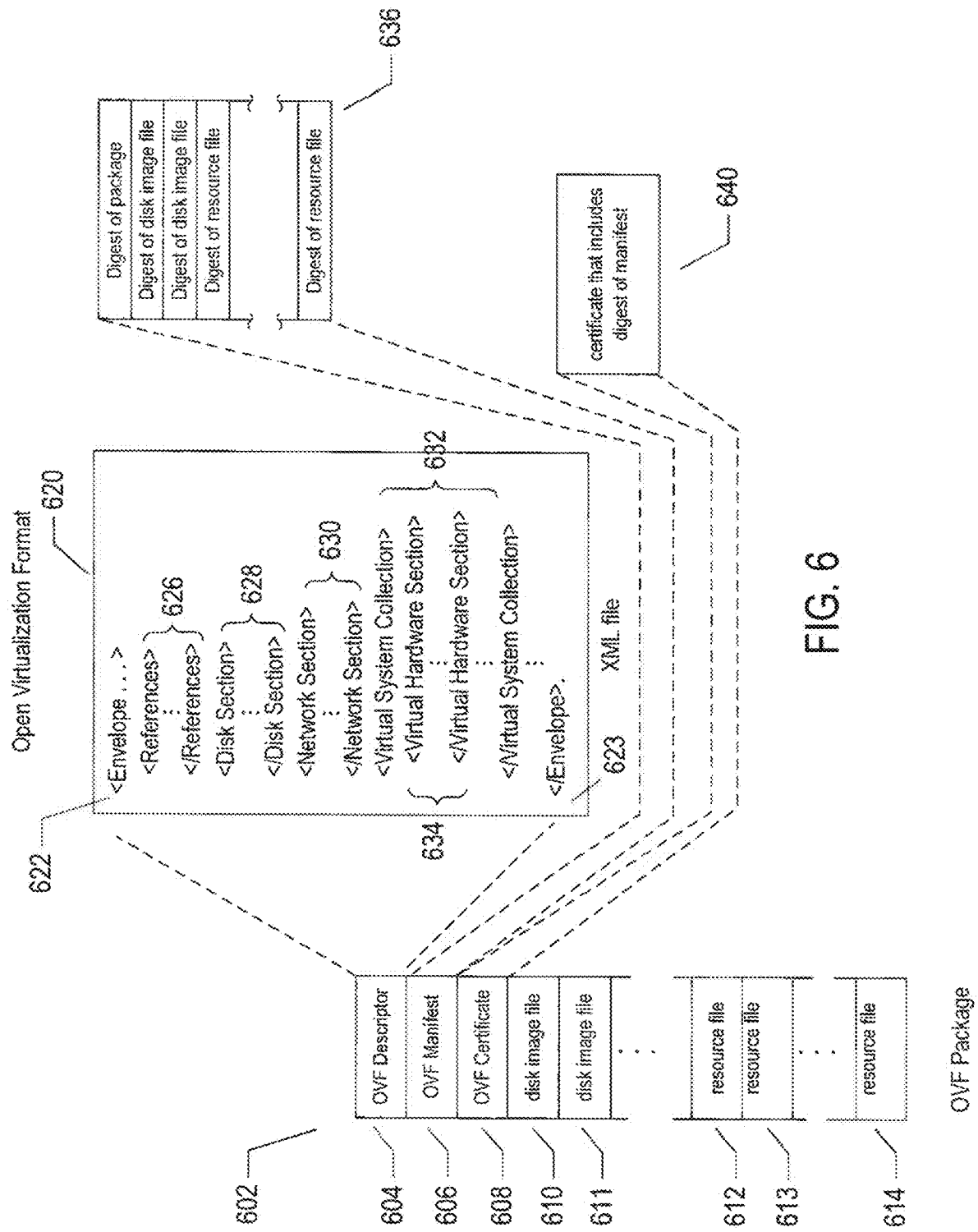
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
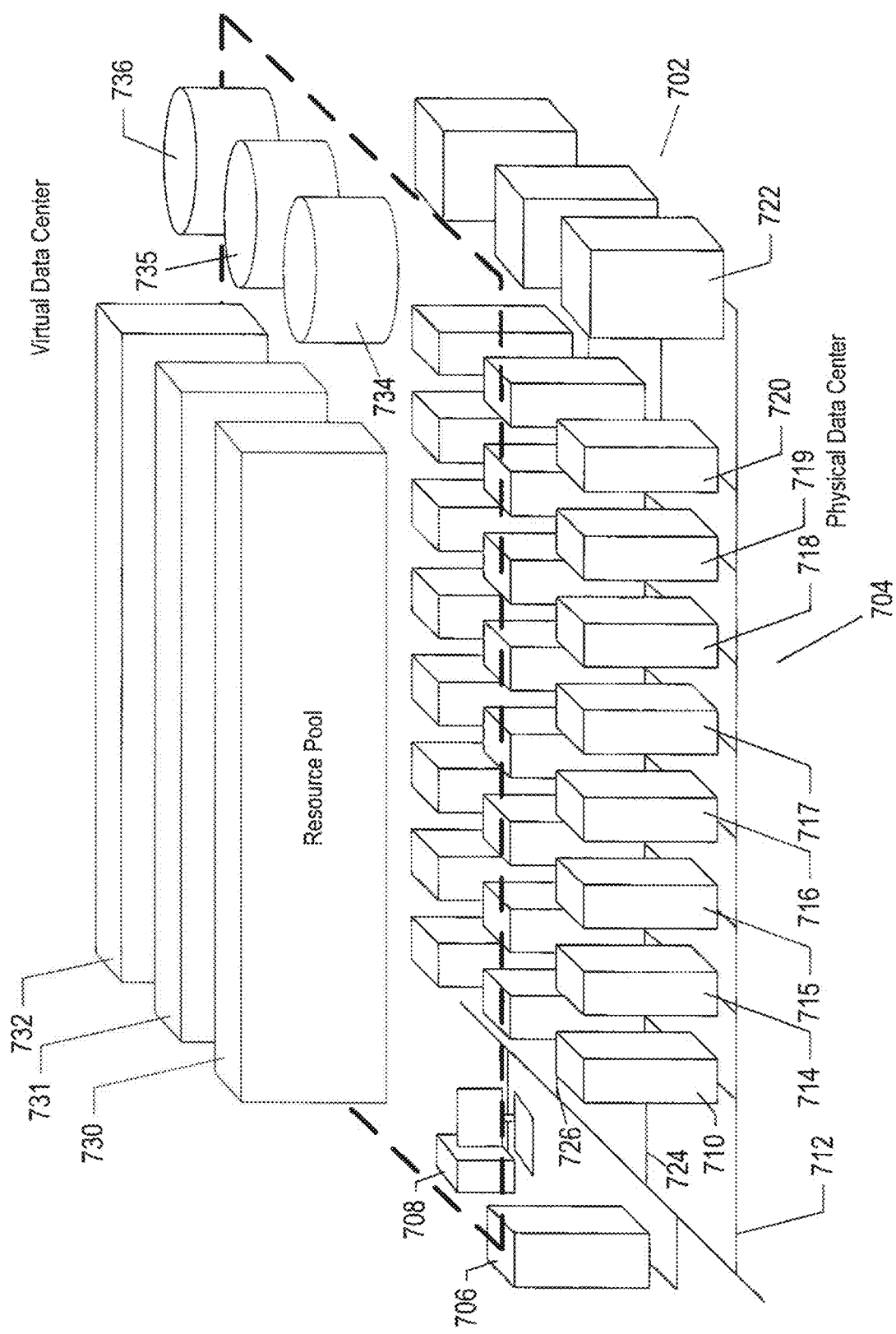
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
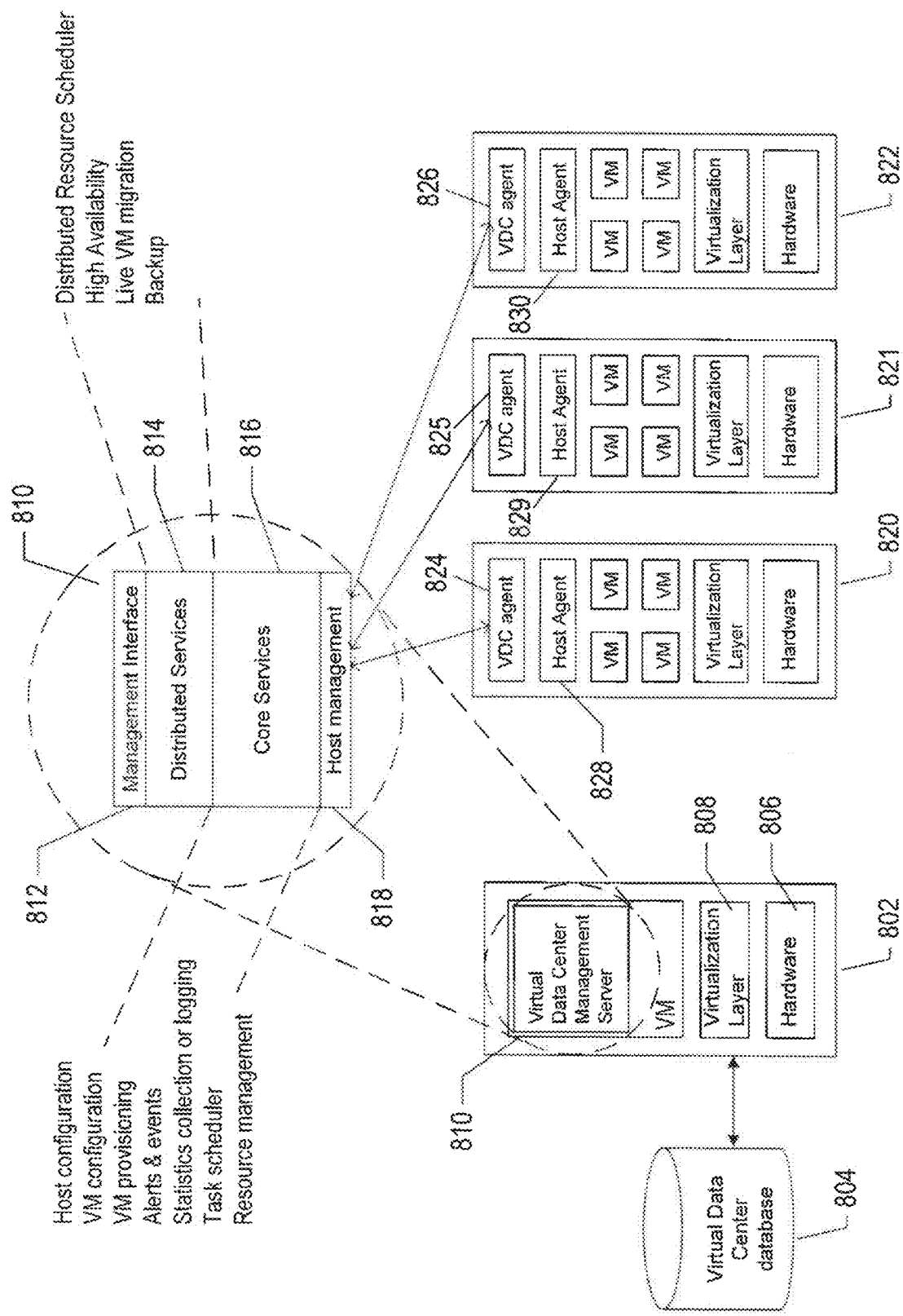
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
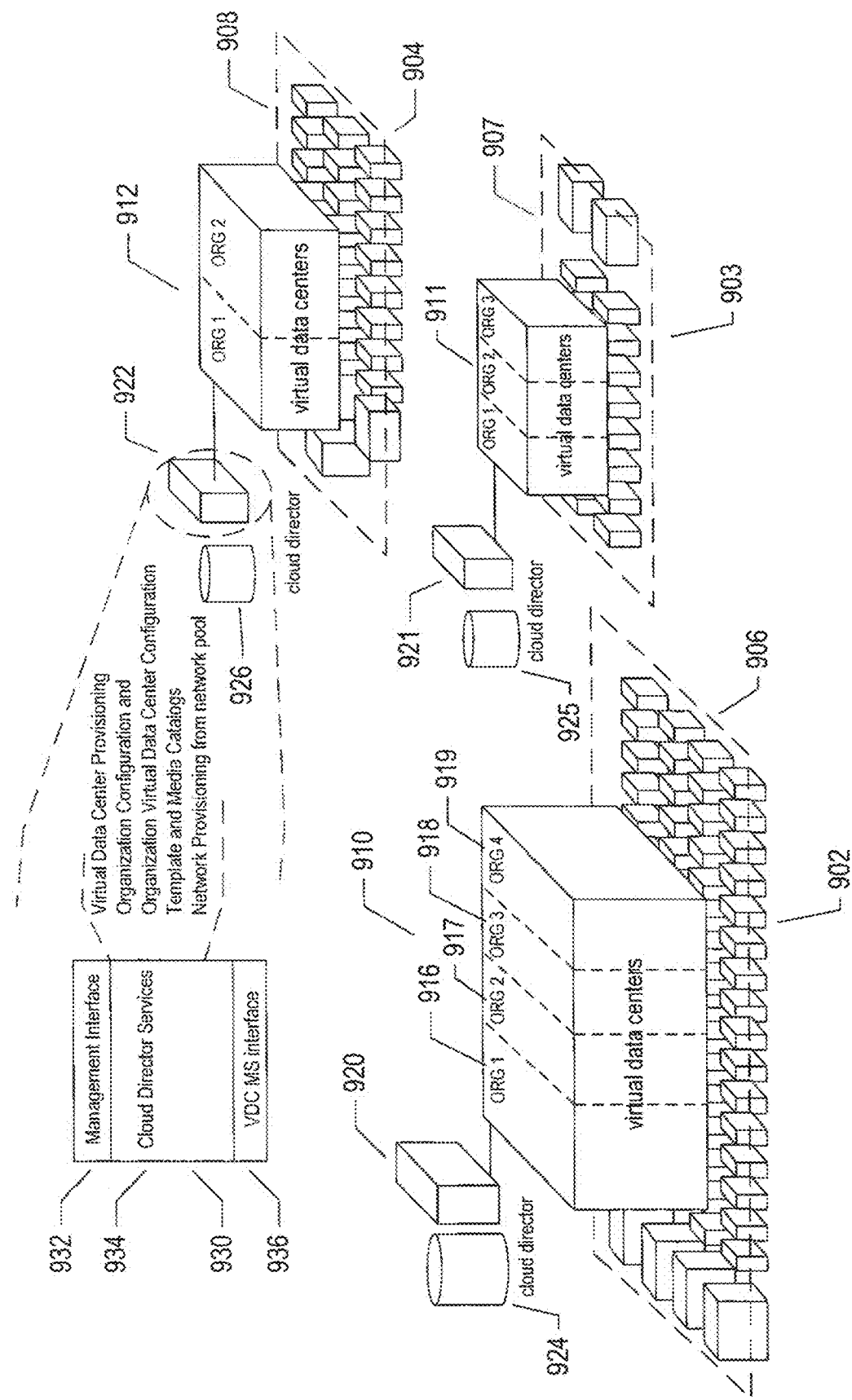
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
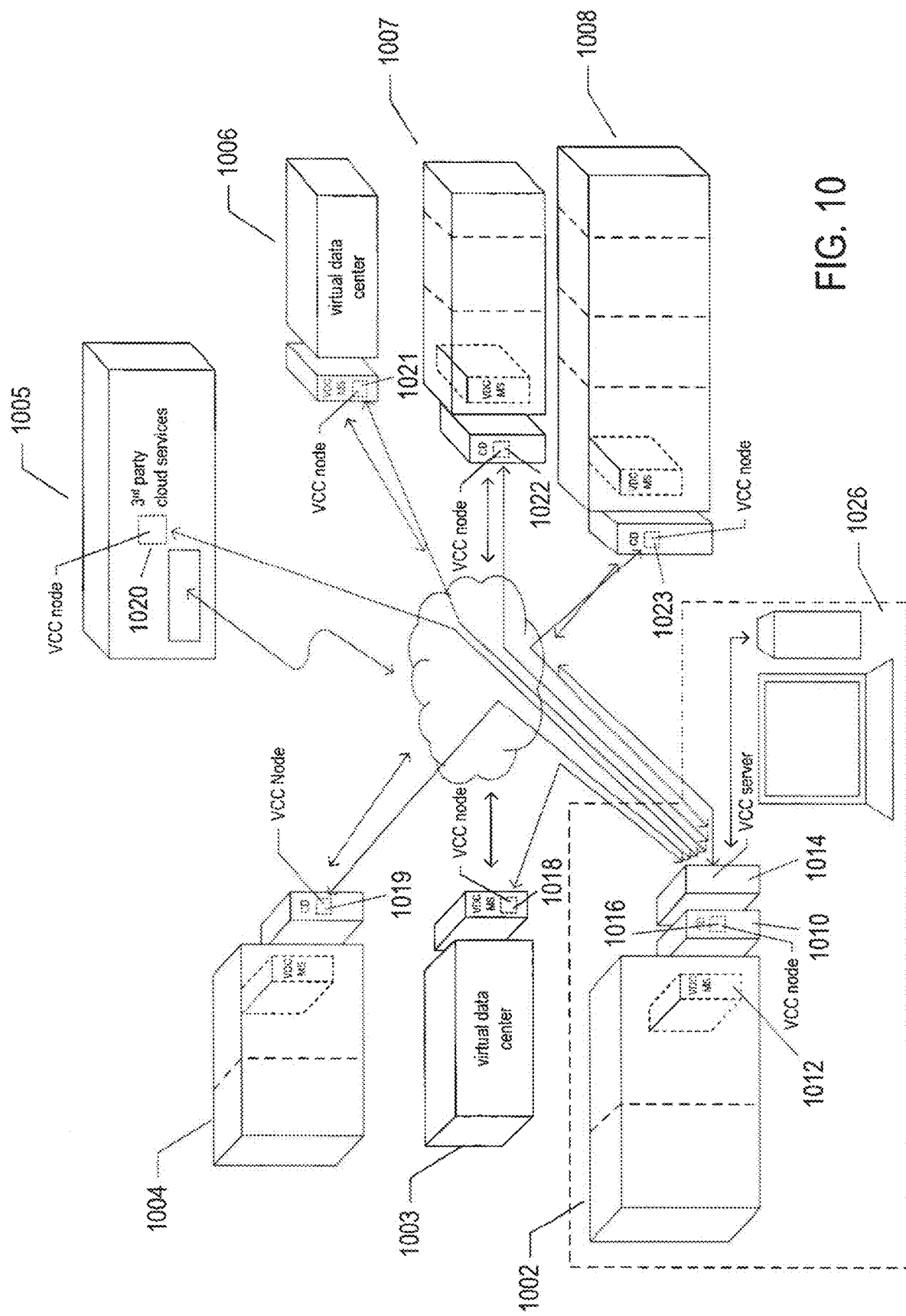
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system for use by containers. A container is a software package that uses virtual isolation to deploy and run one or more applications that access a shared operating system kernel. Containers isolate components of the host used to run the one or more applications. The components include files, environment variables, dependencies, and libraries. The host OS constrains container access to physical resources, such as CPU, memory and data storage, preventing a single container from using all of a host's physical resources. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
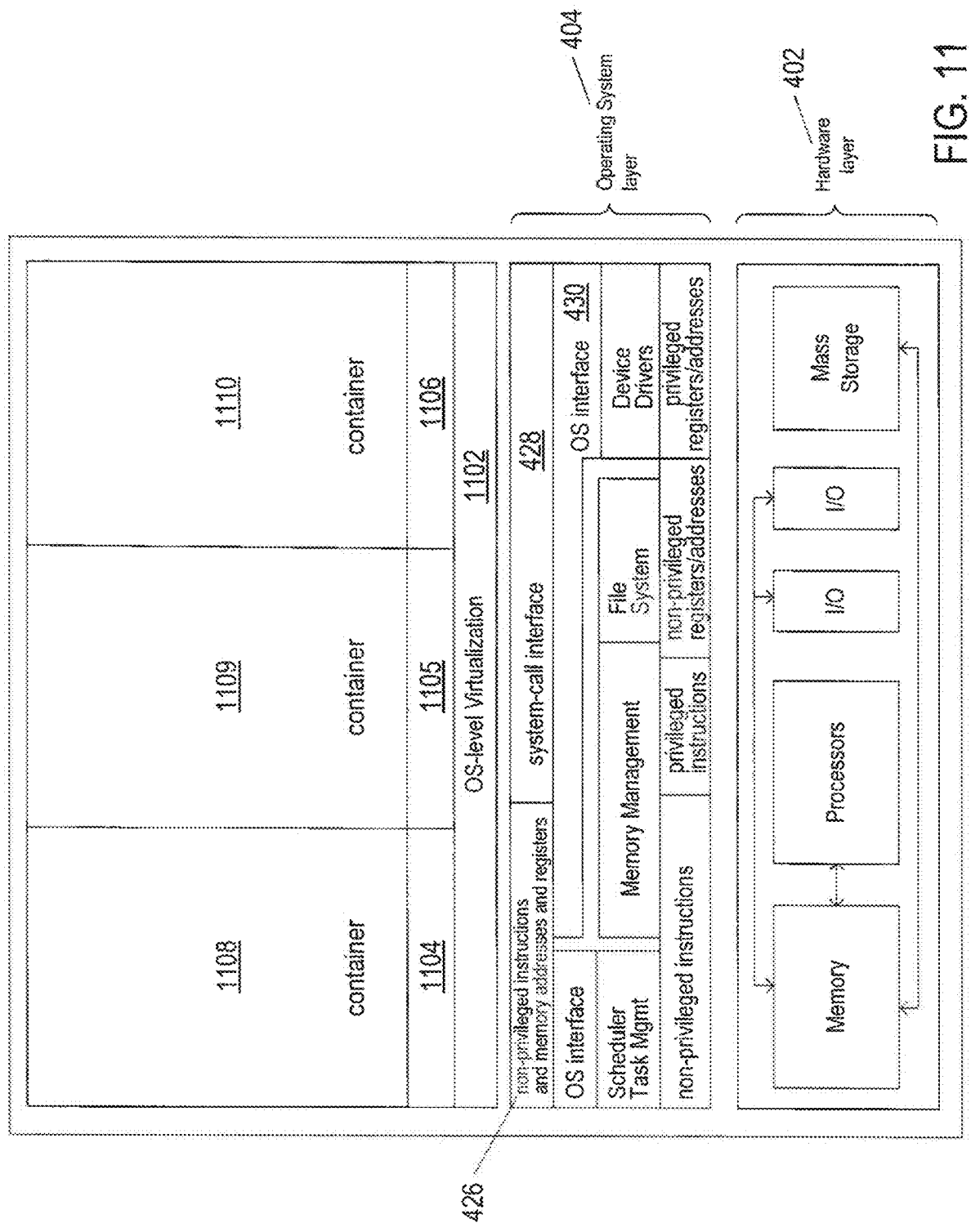
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
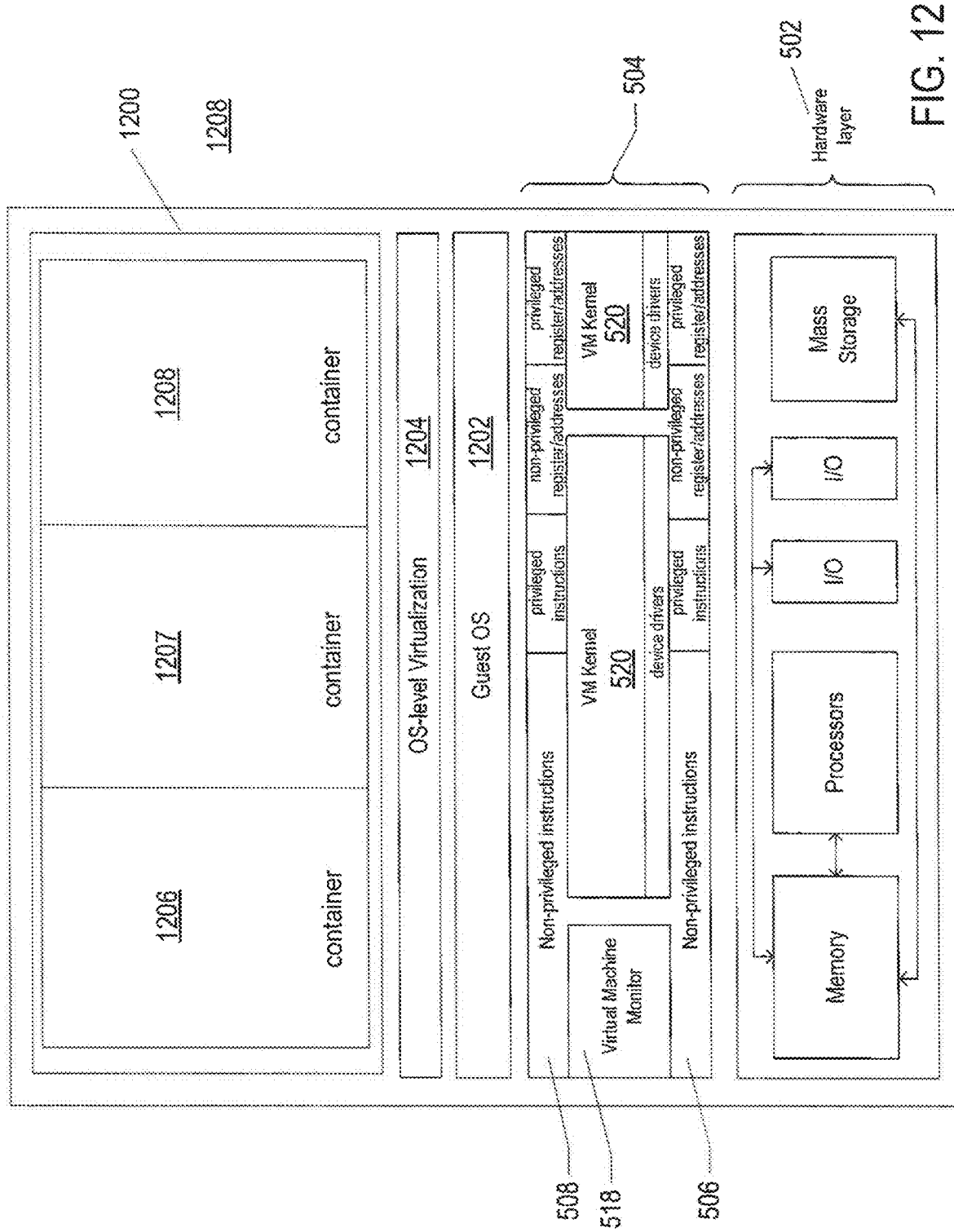
FIG. 12 shows an approach to implementing containers on a VM.

FIG. 12 shows an approach to implementing the containers on a VM. FIG. 12 shows a host computer similar to the host computer shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large, distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
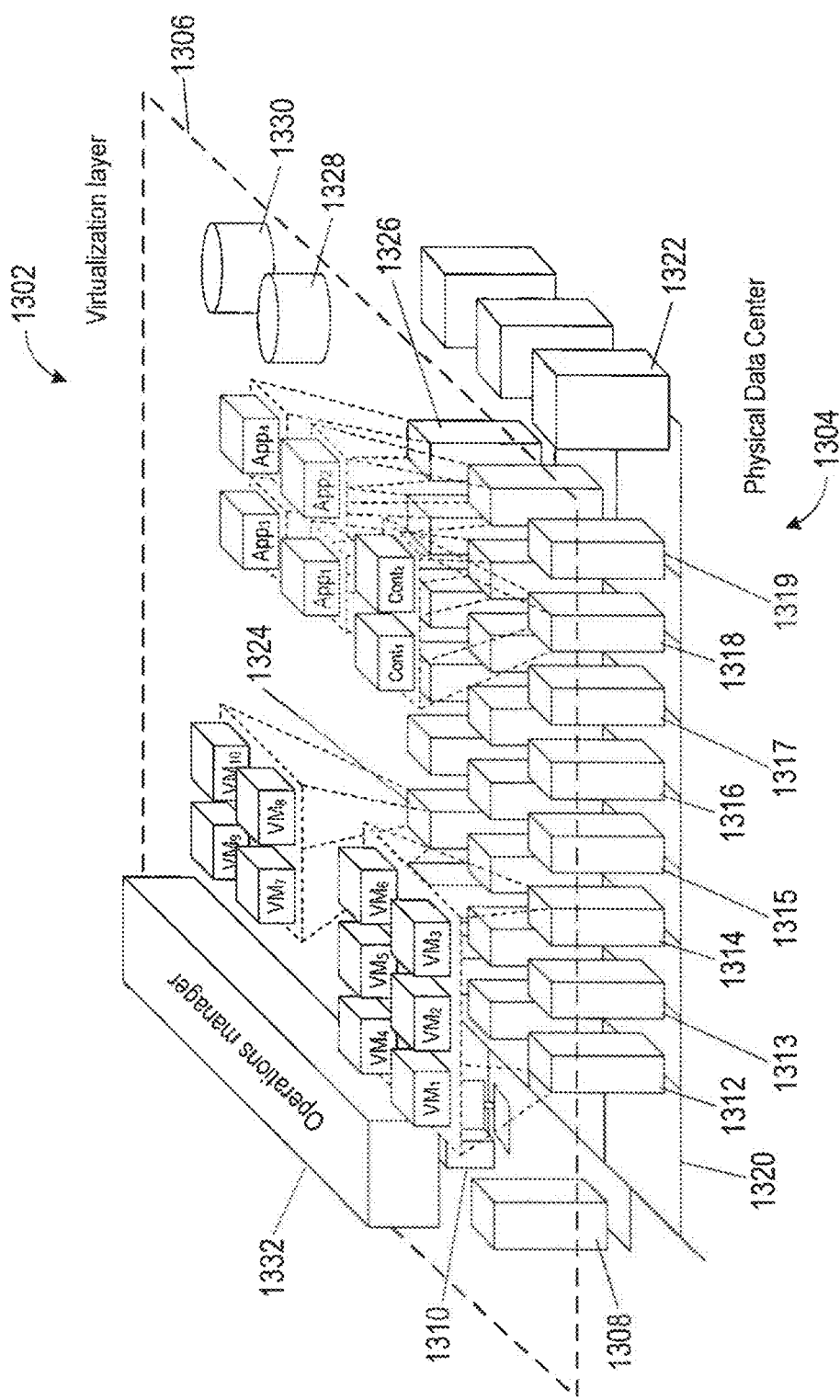
FIG. 13 shows an example of a virtualization layer located above a physical data center.

Automated Computer-Implemented Methods and Systems for Troubleshooting and Optimizing Performance of Applications Running in a Distributed Computing System Computer-implemented methods and systems described herein are directed to troubleshooting and optimizing performance of an application running in a distributed computing system. FIG. 13 shows an example of a virtualization layer 1302 located above a physical data center 1304. For the sake of illustration, the virtualization layer 1302 is separated from the physical data center 1304 by a virtual-interface plane 1306. The physical data center 1304 is an example of a distributed computing system. The physical data center 1304 comprises physical objects, including an administration computer system 1308, any of various computers, such as PC 1310, on which a virtual data center ("VDC") management interface may be displayed to system administrators and other users, server computers, such as server computers 1312-1319, data-storage devices, and network devices. Each server computer may have multiple network interface cards ("NICs") to provide high bandwidth and networking to other server computers and data storage devices. The server computers may be networked together to form server-computer groups within the data center 1304. The example physical data center 1304 includes three server-computer groups each of which have eight server computers. For example, server-computer group 1320 comprises interconnected server computers 1312-1319 that are connected to a mass-storage array 1322. Within each server-computer group, certain server computers are grouped together to form a cluster that provides an aggregate set of resources (i.e., resource pool) to objects in the virtualization layer 1302. Different physical data centers may include many different types of computers, networks, data-storage systems, and devices connected according to many different types of connection topologies.

The virtual-interface plane 1306 abstracts the resources of the physical data center 1304 to one or more VDCs comprising the virtual objects and one or more virtual data stores, such as virtual data stores 1328 and 1330. For example, one VDC may comprise the VMs running on server computer 1324 and virtual data store 1328. The virtualization layer 1302 includes virtual objects, such as VMs, applications, and containers, hosted by the server computers in the physical data center 1304. The virtualization layer 1302 may also include a virtual network (not illustrated) of virtual switches, routers, load balancers, and NICs formed from the physical switches, routers, and NICs of the physical data center 1304. Certain server computers host VMs and containers as described above. For example, server computer 1318 hosts two containers identified as $Cont_1$ and $Cont_2$; cluster of server computers 1312-1314 host six VMs identified as $VM_1$, $VM_2$, $VM_3$, $VM_4$, $VM_5$, and $VM_6$; server computer 1324 hosts four VMs identified as $VM_7$, $VM_8$, $VM_9$, $VM_{10}$. Other server computers may host applications as described above with reference to FIG. 4. For example, server computer 1326 hosts applications identified as $App_4$.

Computer-implemented methods and systems described herein are executed by an operations manager 1332 in one or more VMs on the administration computer system 1308. The operations manager 1332 provides several interfaces, such as graphical user interfaces, for data center management, system administrators, and application owners. The operations manager 1332 receives and collects streams of metrics from objects of the data center. In the following discussion, the term "object" refers to a physical object or a virtual object for which metric data can be collected to detect performance problems with an application running a data center. A physical object may be a server computer, network device, a workstation, a PC or any other physical object of a distributed computed system. A virtual object may be an application, a VM, a virtual network device, a container, or any other virtual object of a distributed computing system. The term "resource" refers to a physical resource of a distributed computing system, such as, but are not limited to, a processor, a core, memory, a network connection, network interface, data-storage device, a mass-storage device, a switch, a router, and other any other component of the physical data center 1304. Resources of a server computer and clusters of server computers may form a resource pool for creating virtual resources of a virtual infrastructure used to run virtual objects. The term "resource" may also refer to a virtual resource, which may have been formed from a physical resources used by a virtual object. For example, a resource may be a virtual processor formed from one or more cores of a multicore processor, virtual memory formed from a portion of physical memory, virtual storage formed from a sector or image of a hard disk drive, a virtual switch, and a virtual router. A distributed application comprises multiple software components that are executed on one or more server computers. Software components may be executed separately in VMs or containers. For example, software components of a distributed application may be run in $VM_1$, $VM_2$, $VM_3$, $VM_4$, $VM_5$, and $VM_6$. The software components communicate and coordinate actions to appear as a single coherent application to an end user. Consider, for example, a distributed application that provides banking services to users via a bank website or a mobile application ("mobile app") executed on a mobile device. One component provides front-end services that enable users to input banking requests and receive responses to requests via the website or the mobile app. Each user only sees the features provided by the website or mobile app. Other components of the distributed application provide back-end services that are executed in the distributed computing system. These services include processing user banking requests, maintaining data storage, and retrieving user information from data storage.

Automated methods and systems described herein are performed by an operations manager, such as the operations manager 1332. The operations manager 1332 receives numerous streams of time-dependent metric data sent from numerous physical and virtual objects and stores the metric data is a data-storage device. Each stream of metric data is time series data generated by a metric source of a physical or virtual object. The metric source may be an operating system of an object, guest operating system of a VM, an object itself, an application, or a software component of a distributed application. A stream of metric data comprises a sequence of time-ordered metric values that are recorded at spaced points in time called "time stamps." A stream of metric data is simply called a "metric" and is denoted by $$v=(\bar{x}_i)_{i=1}^{N_v}=(\bar{x}(t_i))_{i=1}^{N_v} \quad (1)$$

where $N_v$ is the number of metric values in the sequence;

$\bar{x}_i=\bar{x}(t_i)$ is a metric value;

$t_i$ is a time stamp indicating when the metric value was recorded in a data-storage device; and subscript i is a time stamp index i=1, . . . , $N_v$.

Figure 14A:
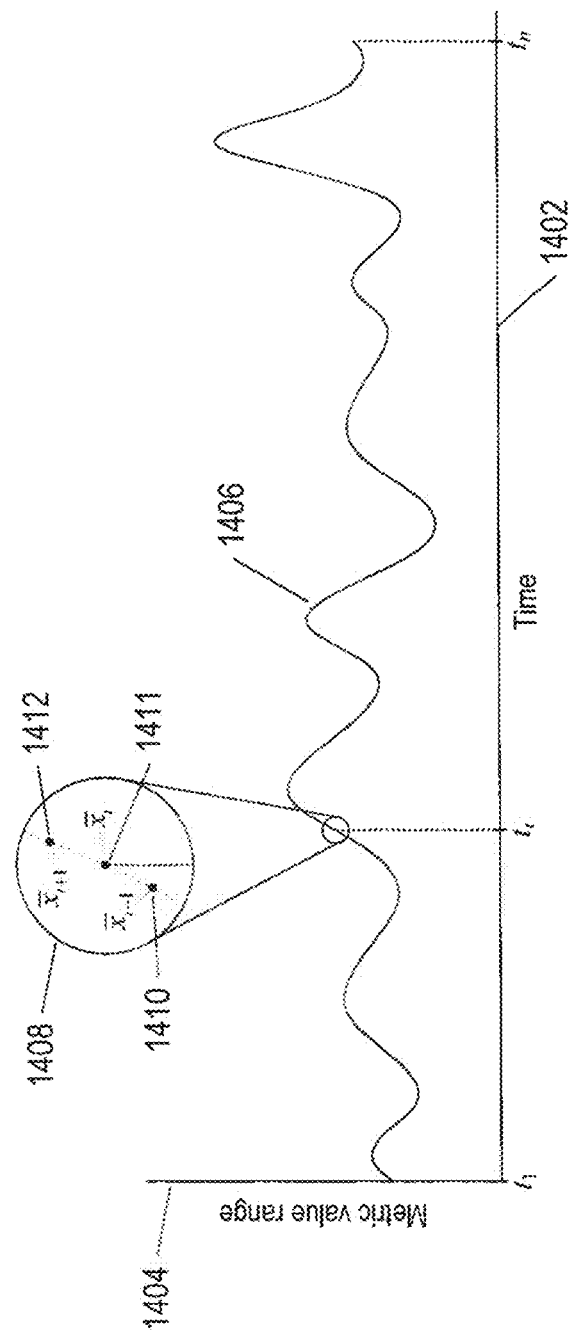
FIG. 14A shows a plot of an example metric.

FIG. 14A shows a plot of an example metric associated with a resource. Horizontal axis 1402 represents time. Vertical axis 1404 represents a range of metric value amplitudes. Curve 1406 represents a metric as time series data. In practice, a metric comprises a sequence of discrete metric values in which each metric value is recorded in a data-storage device. FIG. 14A includes a magnified view 1408 of three consecutive metric values represented by points. Each point represents an amplitude of the metric at a corresponding time stamp. For example, points 1410-1412 represent three consecutive metric values (i.e., amplitudes) $\bar{x}_{i-1}$, $\bar{x}_i$, and $\bar{x}_{i+1}$ recorded in a data-storage device at corresponding time stamps $t_{i-1}$, $t_i$, and $t_{i+1}$. The example metric may represent usage of a physical or virtual resource. For example, the metric may represent CPU usage of a core in a multicore processor of a server computer over time. The metric may represent the amount of virtual CPU usage, or virtual memory used, by a VM over time. The metric may represent network throughput for a vNIC or a server computer. The metric may represent network traffic for a VM or a server computer.

Figure 14B:
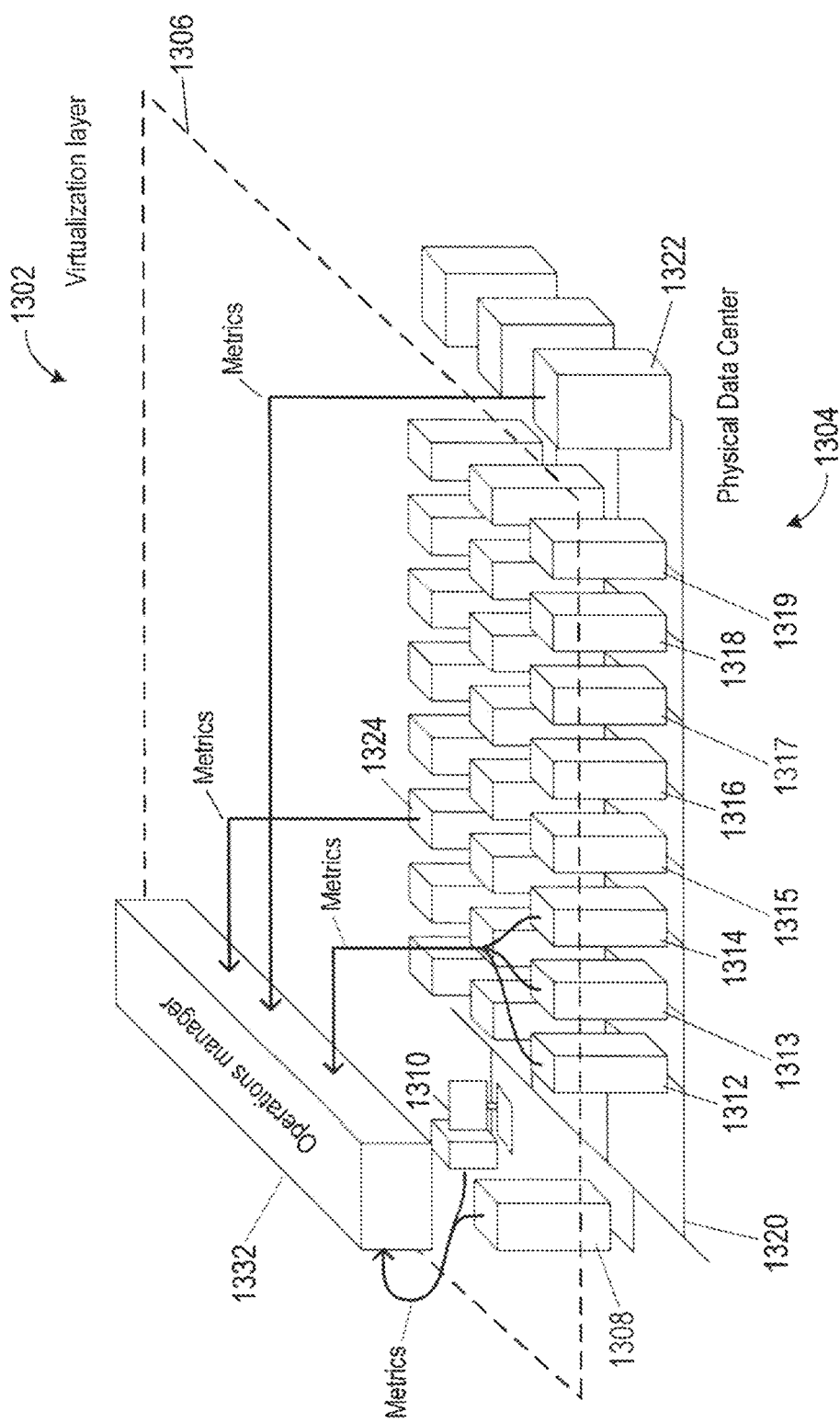
FIGS. 14B-14C show examples of metrics transmitted from physical and virtual objects of a distributed computing system to an operations manager executed in a monitoring server.
Figure 14C:
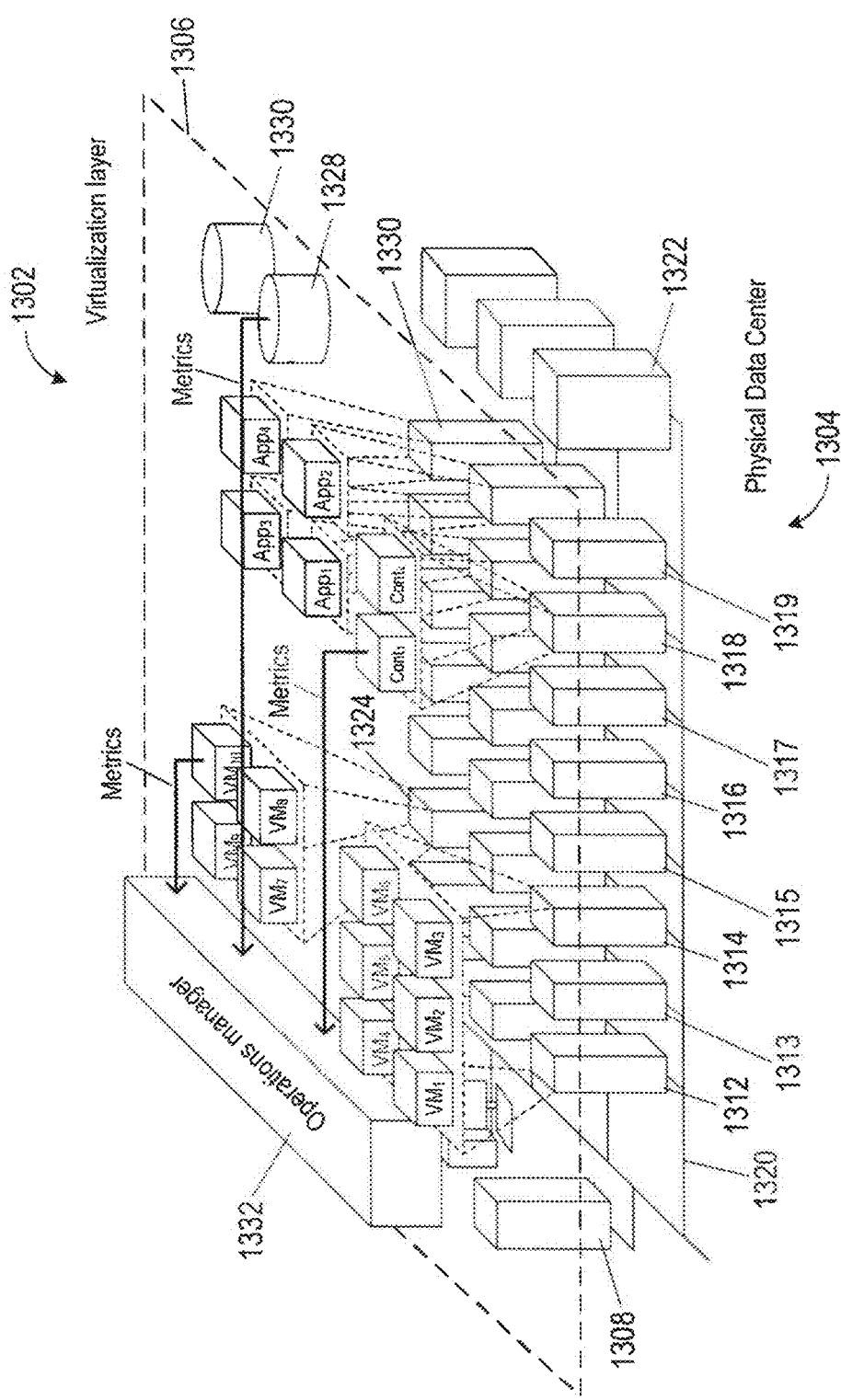

In FIGS. 14B-14C, the operations manager 1332 receives numerous metrics associated with numerous physical and virtual resources. The operations manager 1332 may be implemented as a standalone application or in one or more VMs that collect and process the metrics as described below. As shown in FIGS. 14B-14C, directional arrows represent metrics sent from physical and virtual resources to the operations manager 1332. In FIG. 14B, PC 1310, server computers 1308 and 1312-1315, and mass-storage array 1322 send metrics to the operations manager 1332. In FIG. 14C, the operating systems, VMs, containers, applications, and virtual storage independently send metrics to the operations manager 1332, depending on when the metrics are generated. For example, certain objects may send metric values as metric data is generated by a metric source while other objects may only send metric data at certain times or in response to a request from the operations manager 1332.

Physical and/or virtual objects may have tens, hundreds, and thousands of metrics that are sent to the operations manager 1332. For example, a server computer alone may have hundreds of metrics that represent usage of each core of a multicore core processor, memory usage, storage usage, network throughput, error rates, number of data stores, disk usage, average response times, peak response times, thread counts, and power usage, just to name a few. A single virtual object, such as a VM, may have hundreds of associated metrics that monitor both physical and virtual resource usage, such as virtual CPU usage, virtual memory usage, virtual disk usage, virtual storage space, number of data stores, average and peak response times for various physical and virtual resources of the VM, network throughput, and power usage, just to name a few.

The operations manager also collects key performance indicators ("Traffic") for the applications. A KPI is a metric that represents the state, or health, of an application or service provided by the application over time, such as the normal or abnormal behavior of the application. Examples of KPIs include latency, traffic, errors, and saturation. Application latency is the time delay between a time when a client submits a request for an application to perform an operation, or provide a service, and a later time when the application responds to the request. Traffic is the number of requests processed by an application per unit time. Errors are the number of application errors per unit time because of the application processing client requests or accessing resources. Saturation is the percentage, or number, of resources used by the application per unit time.

The operations manager trains inference models for applications running in a distributed computing system. For selected applications, the operations manager collects metrics and KPIs associated with the selected application for a historical time window from a data-storage device. The duration of the historical time window may be preset to an hour, two hours, twelve hours, a day, a week, or a month or even longer. The metrics associated with the selected application are retrieved from the data-storage device and denoted by:

$$\{v_j\}_{j=1}^p = \left\{ (\bar{x}_{ij})_{i=1}^{N_{v,j}} \right\}_{j=1}^p = \left\{ (\bar{x}_j(t_i))_{i=1}^{N_{v,j}} \right\}_{j=1}^p \quad (2)$$

where j is a metric index j=1, . . . , p;

$N_{v_j}$ is the number of the metric values of the j-th metric in the historical time window; and p denotes an integer number of metrics associated with the selected application.

For a distributed application, the metrics retrieved by the operations manager include metrics for each VM, or container, that runs a software component of the selected application and metrics associated with one or more server computers (i.e., hosts) that run the VMs or containers. For example, each VM, or container, has metrics for virtual CPU usage, virtual memory usage, number of data stores, disk usage, guest file system, and network performance. Each server computer has metrics for physical CPU usage, memory usage, datastore usage, disk usage, and network performance. For a standalone application running on a single server computer, the metrics collected by the operations manager include metrics generated by the operating system of the server computer, metrics generated by the application itself, metrics generated by metric sources of the server computer.

Metric values of the KPI recorded in the time historical time window are retrieved from a data-storage device. The KPI is denoted by $$(\overline{y}_i)_{i=1}^{N_u} = (\overline{y}(t_i))_{i=1}^{N_u} \quad (3)$$

where $N_u$ is the number of metric values recorded in the historical time window.

The operations manager normalizes the metrics and the KPI to prevent metrics with large values from dominating the model building process described below. In one implementation, metric values of each metric $v_j$ are normalized to the interval [0,1] by $$\tilde{x}_{ij} = \frac{\overline{x}_{ij} - \min(v_j)}{\max(v_j) - \min(v_j)} \quad (4a)$$

where $\min(v_j)$ is the minimum metric value of the metric $v_j$; and $\max(v_j)$ is the maximum metric value of the metric $v_j$.

In another implementation, metric values of each metric $v_j$ are normalized by $$\tilde{x}_{ij} = \frac{\overline{x}_{ij} - \overline{\mu}_j}{\overline{\sigma}_j} \quad (4b)$$

where the mean of the j-th metric is given by $$\overline{\mu}_j = \frac{1}{N_{v,j}} \sum_{i=1}^{N_{v,j}} \overline{x}_{ij}$$

and the standard deviation of the j-th metric is given by $$\overline{\sigma}_j = \sqrt{\frac{1}{N_{v,j}} \sum_{i=1}^{N_{v,j}} (\overline{x}_{ij} - \overline{\mu}_j)^2}$$

The metrics collected by the operations manager are typically not synchronized to the same time stamps. For example, metric values of a metric may be generated by a metric source at periodic intervals, but the periodic intervals may vary between time stamps. On the other hand, metric values of another metric may be generated at nonperiodic intervals and are not synchronized with the time stamps of other metrics. In certain cases, the operations manager may request metric data from metric sources at regular intervals while in other cases, the metric sources may actively send metric data to the operations manager at periodic intervals or whenever metric data becomes available.

FIG. 15A shows plots of three examples of unsynchronized metrics for CPU usage 1502, memory usage 1503, and network throughput 1506 recorded in the same time interval. Horizontal axes, such as horizontal axis 1508, represent the length of the time interval. Vertical axes, such as vertical axis 1510, represent ranges of metric values for the CPU, memory, and network throughput. Dots represent metric values recorded at different time stamps in the time interval. CPU metric values are recorded at different periodic intervals than the memory and network throughput metric values. Dashed lines 1512-1514 mark the same time stamp, $t_j$, in the time interval. A metric value 1516 represents CPU usage recorded at time stamp $t_j$. However, memory usage and network throughput metrics do not have metric values recorded at the time stamp $t_j$. As a result, the CPU usage, memory usage, and network throughput are not synchronized.

For the types of processing carried out by the currently disclosed processes and systems, the metric values of the metrics and the KPI are synchronized to a general set of uniformly spaced time stamps. Metric values may be synchronized by computing a run-time average of metric values in a sliding time window centered at each time stamp of the general set of uniformly spaced time stamps. In an alternative implementation, the metric values with time stamps in the sliding time window may be smoothed by computing a run-time median of metric values in the sliding time window centered at each time stamp of the general set of uniformly spaced time stamps. Processes and systems may also synchronize the metrics by deleting time stamps of missing metric values and/or interpolating missing metric data at time stamps of the general set of uniformly spaced time stamps using a running average, linear interpolation, quadratic interpolation, or spline interpolation.

FIG. 15B shows a plot of metric values synchronized to a general set of uniformly spaced time stamps. Horizontal axis 1520 represents time. Vertical axis 1522 represents a range of metric values. Solid dots represent metric values recorded at irregularly spaced time stamps. Marks located along time axis 1520 represent time stamps of a general set of uniformly spaced time stamps. Note that the metric values are not aligned with the time stamps of the general set of uniformly spaced time stamps. Open dots represent metric values aligned with the time stamps of the general set of uniformly spaced time stamps. Bracket 1524 represents a sliding time window centered at a time stamp $t_3$ of the general set. The metric values $x_1$, $x_2$, $x_3$, $x_4$, and $x_5$ have time stamps within the sliding time window 1524 and are averaged 1526 to obtain synchronized metric value 1528 at the time stamp $t_3$ of the general set of uniformly spaced time stamps. A synchronized metric value 1530 is interpolated for a missing metric value at the time stamp is by computing an average 1532 of the metric values in the time window 1534.

The set of normalized and synchronized metrics associated with the selected application are denoted by $$\{X_j\}_{j=1}^p = \{(x_{ij})_{i=1}^n\}_{j=1}^p = \{(x_j(t_i))_{i=1}^n\}_{j=1}^p \quad (5)$$

where
the historical time window comprises the time stamps $t_i$ with indices $i=1, \ldots, n$; and
n is the number of time stamps in the historical time window.

The normalized and synchronized metric values form a p-tuple for each time stamp in the historical time window given by $$x_i = (x_{i1}, x_{i2}, x_{i3}, \ldots, x_{ip})^T \quad (6)$$

where superscript T denotes matrix transpose.
The normalized and synchronized metric values of the KPI are given by $$Y = (y_1, y_2, y_3, \ldots, y_n)^T \quad (7)$$

where subscript i denotes the i-th time stamp.

Figure 16A:
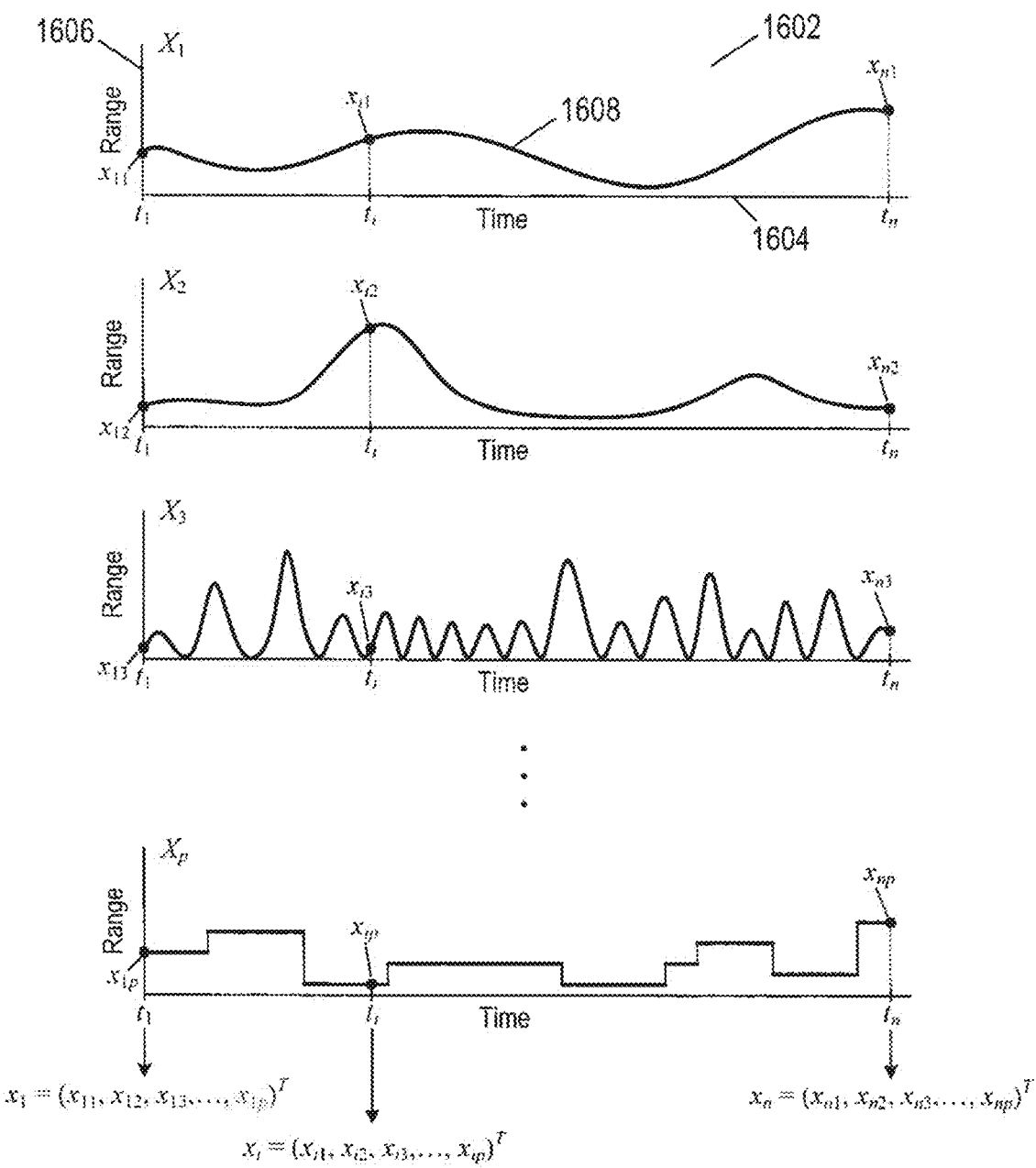
FIG. 16A shows example plots of normalized and synchronized metrics.
Figure 16B:
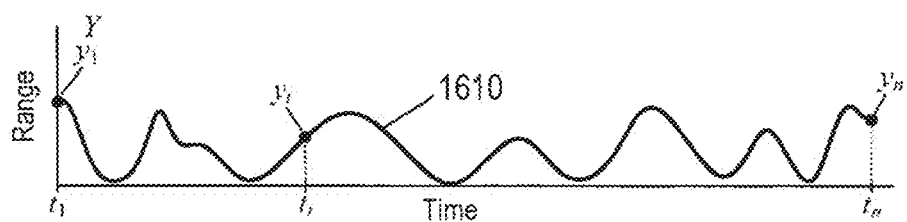
FIG. 16B shows a plot of an example key performance indicator ("KPI") that has been normalized and synchronized to the time stamps in the historical time window of the metrics in FIG. 17.

FIG. 16A shows four example plots of p normalized and synchronized metrics $X_1, \ldots, X_p$. Each plot includes a time axis that represents the historical time window between time stamps $t_1$ and $t_n$ and a vertical axis that represents a range of normalized metric values. Curves represent the normalized and synchronized metrics. For example, plot 1602 contains a time axis 1604 with beginning and ending time stamps $t_1$ and $t_n$, respectively, of the historical time window and a vertical axis 1606 that represents a range of metric values for the metric $X_1$. Curve 1608 represents metric values of the metric $X_1$. The metric values in the metrics $X_1, \ldots, X_p$ are synchronized to the time stamps $t_1, \ldots, t_n$, such as synchronized metric values $x_{i1}, x_{i2}, x_{i3}$, and $x_{ip}$. The operations manager normalizes the KPI as described above with reference to Equations (4a) and (4b) and synchronizes the KPI to the same general set of time stamps as described above with reference to FIG. 15B. FIG. 16B shows a plot of an example KPI Y that has been normalized and synchronized to the time stamps in the historical time window of the metrics in FIG. 16A. For example, the KPI is represented by curve 1610 with KPI value $y_i$ at time stamp $t_i$ corresponding to metric values in the p-tuple $x_i$.

The operations manager uses the p metrics, $\{X_j\}_{j=1}^p$, and the KPI, Y, to train an inference model for the application. The inference model can be a parametric inference model or a non-parametric inference model. The inference model is used to determine a root cause of a performance problem recorded in run-time KPI values of the application, predict the health of the application, and generate recommendations for optimizing performance of the application in a distributed computing system. Based on the recommendations, the operations manager executes remedial measures that correct the performance problem, which optimizes performance of the application.

Parametric Inference Model

The operations manager trains a parametric inference model for the application with the metrics $\{X_j\}_{j=1}^p$ as inputs, called "predictors," and the KPI Y as an output, called the "response." The relationship between the metrics, $\{X_j\}_{j=1}^p$, and the KPI, Y, is represented by $$Y = f(\{X_j\}_{j=1}^p) + \varepsilon \quad (8)$$

where $\varepsilon$ represents a random error that is independent of X and has a mean zero and is normally distributed.

Here f is denotes an unknown model of the relationship between the metrics and the KPI and represents systematic information about Y.

In one implementation, it is assumed that there is a linear relationship between the metrics $\{X_j\}_{j=1}^p$ and the KPI Y. In other words, the unknown function in Equation (8) is a linear parametric function of the metrics given by $$f(\{X_j\}_{j=1}^p) = \tilde{X}\beta = \beta_0 + \sum_{j=1}^p \beta_j X_j \quad (9)$$

where $\beta_0, \beta_1, \ldots, \beta_n$ are model coefficients.

FIG. 17 shows matrix representations of the elements of Equations (8) and (9) for the parametric model. Column matrix 1702 contains the KPI values of the KPI Y as described above with reference to FIG. 16B. Column matrix 1704 contains metric values of the j-th metric $X_j$ as described above with reference to FIG. 16A. Matrix X 1706 is a matrix formed from the p metrics. Matrix $\tilde{X}$ 1708 in Equation (9) is called a design matrix. The design matrix $\tilde{X}$ contains a first column 1710 of ones combined with the p metrics of the matrix X 1706. Column matrix $\beta$ 1712 contains the model coefficients. Column matrix $\varepsilon$ 1714 contains the random errors for each time stamp.

The operations manager uses the metrics $\{X_j\}_{j=1}^p$ and the KPI Y to train a parametric model $\hat{f}$ that estimates f for any (X,Y) and is given by $$\hat{Y} = \hat{f}(X) = \tilde{X}\hat{\beta} = \hat{\beta}_0 + \sum_{j=1}^p \hat{\beta}_j X_j \quad (10)$$

where the hat symbol, $\hat{\ }$, denotes an estimated value.

Column matrix $\hat{\beta}$ contains estimated model coefficients $\hat{\beta}_0, \hat{\beta}_1, \ldots, \hat{\beta}_p$, which are estimates of corresponding coefficients $\beta_0, \beta_1, \ldots, \beta_p$, and $\hat{Y}$ is an estimate of the KPI Y. The operations manager computes the estimated model coefficients based on least squares as follows:

$$\hat{\beta} = (\tilde{X}^T \tilde{X})^{-1} \tilde{X}^T Y \quad (11)$$

where superscript $-1$ denotes matrix inverse.
Substituting Equation (11) into Equation (10) gives the following transformation between the KPI Y and the estimated KPI $\hat{Y}$:

$$\hat{Y} = \tilde{X}\hat{\beta} = \tilde{X}(\tilde{X}^T \tilde{X})^{-1} \tilde{X}^T Y = HY \quad (12)$$

In one implementation, the operations manager determines whether there is a linear relationship between the parametric model obtained in Equation (10) and the KPI and whether at least one of the metrics is useful in predicting the KPI based on hypothesis testing. The null hypothesis is $$H_0: \beta_1 = \beta_2 = \ldots = \beta_p = 0$$

versus the alternative hypothesis $$H_a: \text{at least one } \beta_j \neq 0$$

A test for the null hypothesis is performed using the F-statistic given by:

$$F_0 = \frac{MS_R}{MS_E} \quad (13a)$$

where $$MS_R = \frac{SS_R}{p}$$

is the regression mean square, and $$MS_E = \frac{SS_E}{n-p-1}$$

is the error mean square. The numerator of the regression mean square is given by $$SS_R = Y^T\left(H - \left(\frac{1}{n}\right)J\right)Y$$

where H is the matrix given in Equation (12) and the matrix J is an n×n square matrix of ones. The numerator of the error mean square is given by $$SS_E = Y^T(I_{n \times n} - H)Y$$

where $I_{n \times n}$ is the n×n identity matrix. The operations manager rejects the null hypothesis when the F-statistic is larger than a threshold, $Th_F$, represented by the condition:

$$F_0 > Th_F \quad (13b)$$

In other words, when the condition in Equation (13b) is satisfied, at least one of the metrics is related to the KPI. The threshold $Th_F$ may be preselected by a user. Alternatively, the threshold may be set to the f-distribution:

$$Th_F = f_{\alpha,p,n-p-1} \quad (13c)$$

The subscript α is a non-zero probability that may be set to a value less than or equal to 0.10 (i.e., 0<α<1 and α is the area of the tail of the f-distribution computed with degrees of freedom p and n−p−1).

If it is determined that the null hypothesis for the estimated model coefficients is rejected, it may still be the case that one or more of the metrics are irrelevant and not associated with the KPI Y. Including irrelevant metrics in the computation of the estimate KPI Ŷ leads to unnecessary complexity in the final parametric model. The operations manager removes irrelevant metrics (i.e., setting corresponding estimated model coefficients to zero in the model) to obtain a model based on metrics that more accurately relate to the KPI Y.

In one implementation, when the operations manager has determined that at least one of the metrics is relevant, the operations manager separately assesses the significance of the estimated model coefficients in the parametric model based on hypothesis testing. The null hypothesis for each estimated model coefficient is $$H_0: \beta_j = 0$$

versus the alternative hypothesis $$H_\alpha: \beta_j \neq 0$$

The t-test is the test statistic based on the t-distribution. For each estimated model coefficient, the t-test is computed as follows:

$$T_j = \frac{\hat{\beta}_j}{SE(\hat{\beta}_j)} \quad (14a)$$

where $SE(\hat{\beta}_j)$ is the estimated standard error of the estimated coefficient $\hat{\beta}_j$.

The estimated standard error for the j-th estimated model coefficient, $\hat{\beta}_j$, may be computed from the symmetric matrix $$C = \hat{\sigma}^2 (X^T X)^{-1}$$

where $$\hat{\sigma}^2 = MS_E \quad (14b)$$

The estimated standard error $SE(\hat{\beta}_j) = \sqrt{C_{jj}}$, where $C_{jj}$ the j-th diagonal element of the matrix C. The null hypothesis is rejected when the t-test satisfies the following condition:

$$-Th_T < T_j < Th_T \quad (14c)$$

In other words, when the condition in Equation (14c) is satisfied, the metric $X_j$ is related to the KPI Y. The threshold $Th_T$ may be preselected by a user. Alternatively, the threshold may be set to the t-distribution:

$$Th_T = t_{\gamma, n-2} \quad (14d)$$

The subscript γ is a non-zero probability that may be set to a value less than or equal to 0.10 (i.e., 0<γ<1 and γ is the area of the tails of the t-distribution computed with degrees of freedom n−2). Alternatively, when the following condition is satisfied $$T_j \leq -Th_T \text{ or } Th_T \leq T_j \quad (14e)$$

the metric $X_j$ is not related to the KPI Y (i.e., is irrelevant) and the estimated model coefficient $\hat{\beta}_j$ is set to zero in the parametric model. When one or more metrics have been identified as being unrelated to the KPI Y, the model coefficients may be recalculated according to Equation (13) with the irrelevant metrics omitted from the design matrix X̃ and corresponding model coefficients omitted from the process. The resulting parametric model is the trained parametric inference model.

In another implementation, rather than eliminating metrics based on hypothesis testing, the operations manager may use a backward stepwise selection process to train a parametric model that contains only relevant metrics. The backward stepwise process employs a step-by-step process of eliminating irrelevant metrics from the set of metrics and thereby produces a parametric model that has been trained with relevant metrics. The process begins by partitioning metrics and the KPI recorded in a historical time window into a training set and a validating set.

Figure 18A:
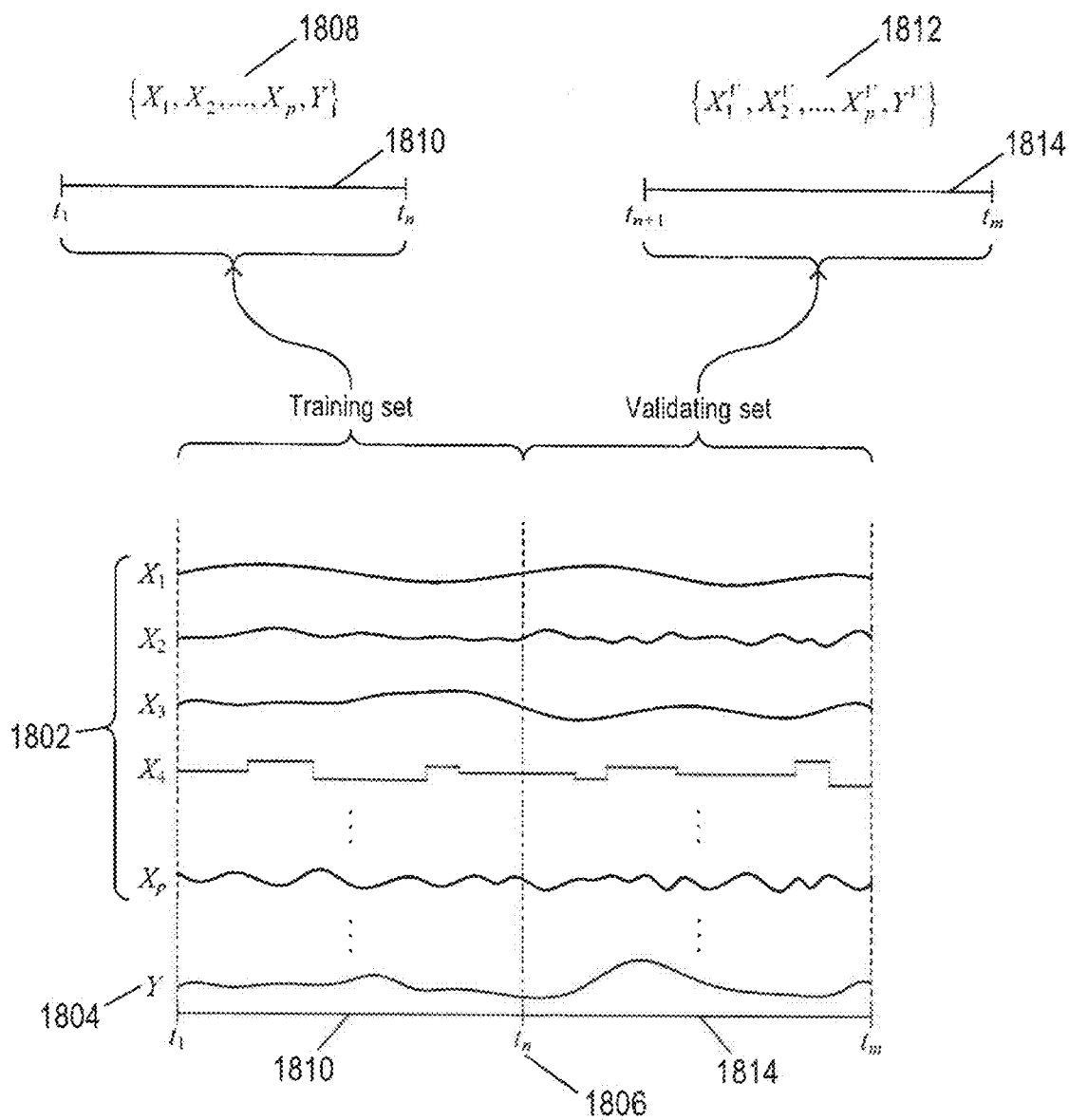
FIG. 18A shows an example set of metrics and a KPI recorded in a historical time window.

FIG. 18A shows an example of a set of metrics 1802 and a KPI 1804 recorded in a historical time window $[t_1, t_m]$ 1806. The set of metrics 1802 and KPI 1904 are partitioned to form a training set 1808 from metrics and KPI recorded in a subinterval $[t_1, t_n]$ 1810 and form a validating set 1812 from metrics and KPI recorded in a subinterval $[t_{n+1}, t_m]$ 1814, where a superscript V is added to the validating set 1812 to distinguish the training set 1808 from the validating set 1812.

A full model $\hat{M}^{(0)}$ is initially computed with the full training set 1808 using least squares as described about with reference to Equations (10) and (11), where superscript (0) indicates that none of the p metrics have been omitted from the training set 1908 in determining the model $\hat{M}^{(0)}$ (i.e., $\hat{M}^{(0)} = \hat{f}$). For each step q=p, p−1, . . . , Q, a set of models denoted by $\{\hat{f}_1^{(\gamma)}, \hat{f}_2^{(\gamma)}, \ldots, \hat{f}_q^{(\gamma)}\}$ is computed using least squares as described above with reference to Equations (10) and (11) but with a different metric omitted from the training set for each model, where γ=1, 2, . . . , p−Q+1 represents the number of metrics that have been omitted from the training set 1808 and Q is a user selected positive integer less than p (e.g., Q=1). At each step q, an estimated KPI, $\hat{f}_j^{(\gamma)}(X^V) = \hat{Y}_j^{(\gamma)}$, is computed using the metrics of the validating set for each of the q models to obtain a set of estimated KPIs $\{\hat{Y}_1^{(\gamma)}, \hat{Y}_2^{(\gamma)}, \ldots, \hat{Y}_q^{(\gamma)}\}$. A sum of squared residuals ("SSR") is computed for each estimated KPI and the KPI of the validating set as follows:

$$SSR(Y^V, \hat{Y}_j^{(\gamma)}) = \sum_{i=1}^{n} (y_i^V - \hat{y}_{ij}^{(\gamma)})^2 \qquad (15)$$

where
  $y_i^V$ is the i-th KPI value in the KPI $Y^V$;
  $\hat{y}_i^{(\gamma)}$ is the i-th KPI value in the estimated KPI $\hat{Y}_j^{(\gamma)}$; and
  j=1, ..., q.
Let $\hat{M}^{(\gamma)}$ denote the model, such as model $\hat{f}_j^{(\gamma)}(X^V)$, with the smallest corresponding SSR denoted by $$SSR(\gamma) = \min\{SSR(Y^V, \hat{Y}_1^{(\gamma)}), \ldots, SSR(Y^V, \hat{Y}_q^{(\gamma)})\}$$

The stepwise process terminates when q=Q. For each step q, the resultant model $\hat{M}^{(\gamma)}$ has been determined for q–γ metrics that produce the smallest errors. The final model $\hat{M}^{(p-Q+1)}$ has been determined with Q–1 metrics that have the smallest SSRs. The stepwise process produces a set of models denoted by $M = \{\hat{M}^{(0)}, \hat{M}^{(1)}, \ldots, \hat{M}^{(p-Q+1)}\}$. Except for the full model $\hat{M}^{(0)}$, each of the models in the set M has been computed by omitting one or more irrelevant metrics. The model in the set M with the best fit to the validating set is determined by computing a $C_p$-statistic for each model in the set M as follows:

$$C_p^{(\gamma)} = \frac{1}{n}(SSR(\gamma) + 2d\hat{\sigma}^2) \qquad (16)$$

where
  d is the number of metrics in the corresponding model $\hat{M}^{(\gamma)}$;
  $\hat{\sigma}^2$ is the variance of the full model $\hat{M}^{(0)}$ given by Equation (14b); and
  j=1, ..., p–Q+1.
The $C_p$-statistic for the full model $\hat{M}^{(0)}$ is given by $SSR(Y^V, \hat{Y}_1^{(0)})$. The parametric model with the smallest corresponding $C_p$-statistic is the resulting trained parametric model.

Figure 18B:
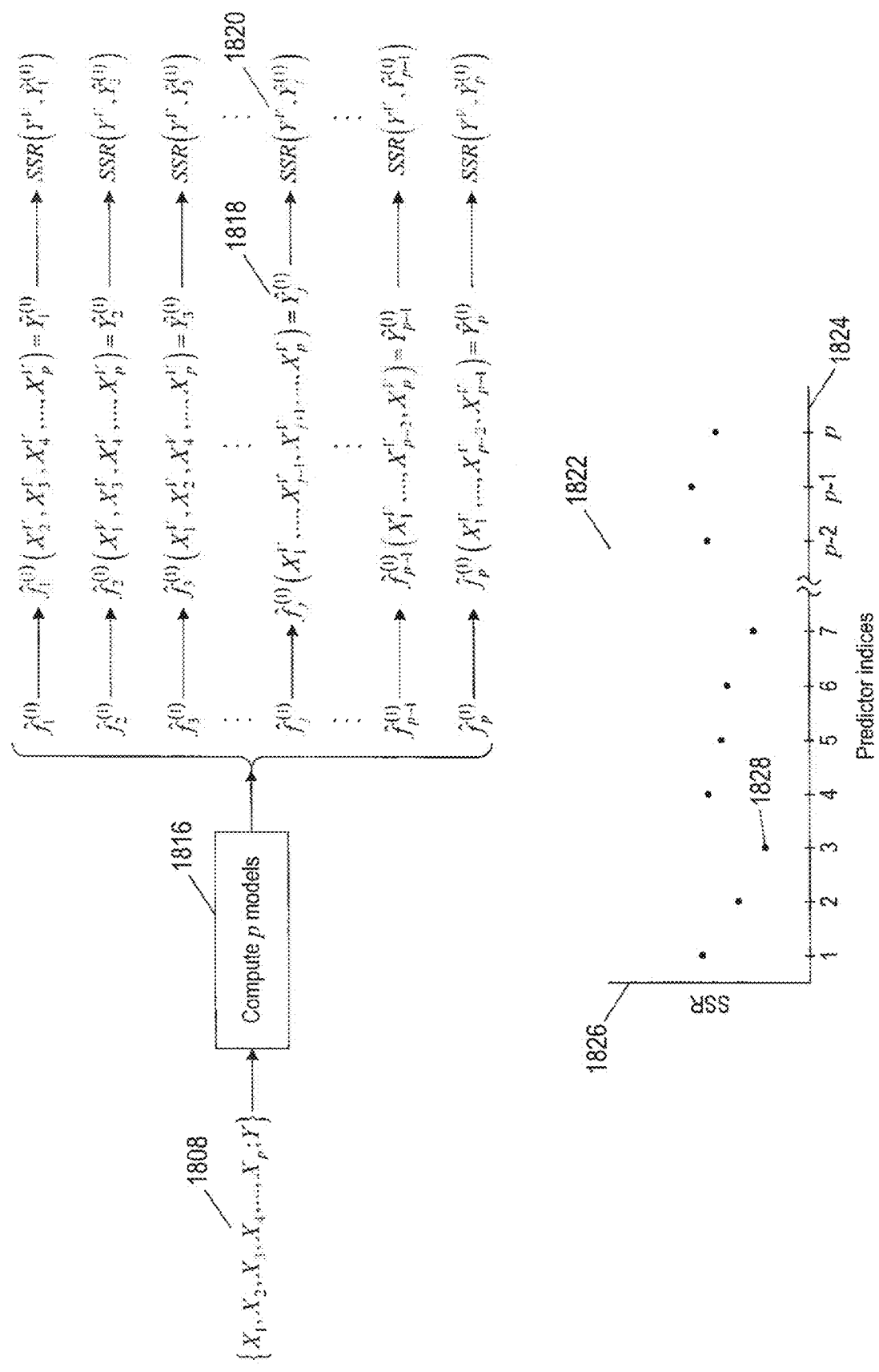
FIGS. 18B-18E show an example of training a model using the backward stepwise process described above.

FIGS. 18B-18E show an example of training a model using the backward stepwise process described above. In FIG. 18B, for a first step q=p, block 1816 represents computing a set of p models, $\{\hat{f}_1^{(1)}, \hat{f}_2^{(1)}, \ldots, \hat{f}_p^{(1)}\}$. Model $\hat{f}_j^{(1)}$ is computed using least squares as described above with reference to Equations (10) and (11) with the metric $X_j$ omitted from the training set 1808 for j=1, ..., p. Estimated KPIs are computed for each of the p models $\{\hat{Y}_1^{(1)}, \hat{Y}_2^{(1)}, \ldots, \hat{Y}_p^{(1)}\}$, where $\hat{Y}_j^{(1)}$ 1818 is computed for $\hat{f}_j^{(1)}$ using least squares as described above with reference to Equations (10) and (11) with the metric $X_j^V$ omitted from the validating set 1812. An SSR is computed for each of the models according to Equation (15). For example, $SSR(Y^V, \hat{Y}_j^{(1)})$ 1820 is computed for the model $\hat{f}_j^{(1)}$ in accordance with Equation (15). FIG. 18B includes a plot 1822 of example SSR values for the p models. Horizontal axis 1824 represents the metric indices. Vertical axis 1826 represents a range of SSR values. Points represent the SSR values for the p models. In this example plot, point 1828 is the minimum SSR that corresponds to the model $\hat{f}_3^{(1)}$, where the metric $X_3$ has been omitted from the training set 1808. The resulting model for the first step is $\hat{M}^{(1)} = \hat{f}_3^{(1)}$. As a result, the metric $X_3$ is regarded as irrelevant and discarded from the training set 2008 prior to proceeding to the next step with q=p–1.

Figure 18C:
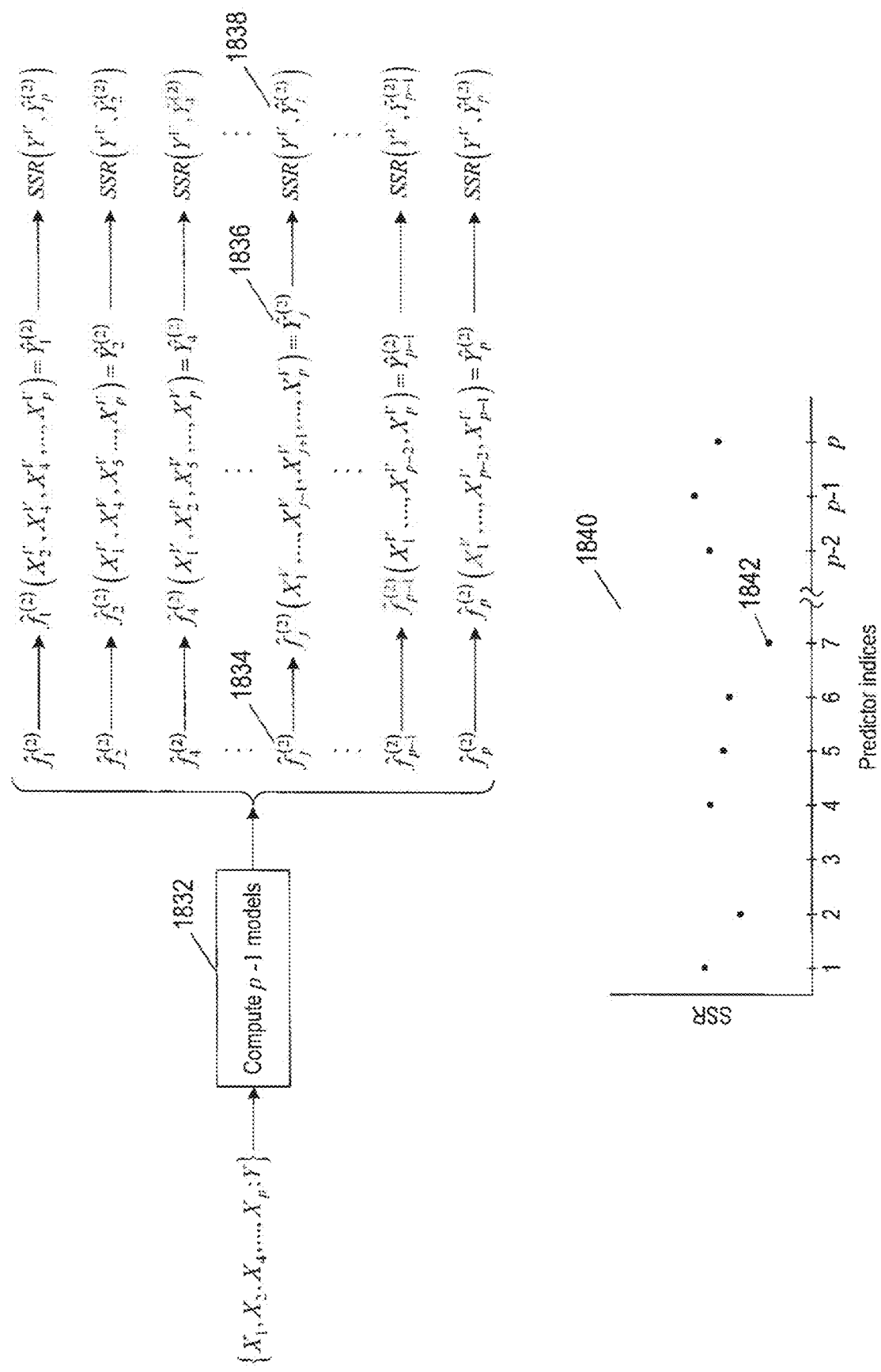

In FIG. 18C, for a second step q=p–1, block 1832 represents computing a set of p–1 models, $\{\hat{f}_1^{(2)}, \hat{f}_2^{(2)}, \hat{f}_4^{(2)}, \ldots, \hat{f}_p^{(2)}\}$, where the model coefficient, $\hat{\beta}_3$, associated with irrelevant metric $X_3$ has been omitted. Model $\hat{f}_j^{(2)}$ 1834 is computed using least squares as described above with reference to Equations (10) and (11) with the metrics $X_3$ and $X_j$ omitted from the training set 1808. Estimated KPIs are computed for each of the p–1 models $\{\hat{Y}_1^{(2)}, \hat{Y}_2^{(2)}, \hat{Y}_4^{(2)}, \ldots, \hat{Y}_p^{(2)}\}$, where $\hat{Y}_j^{(2)}$ 1836 is computed using $\hat{f}_j^{(2)}$ with the metrics $X_3^V$ and $X_j^V$ omitted from the validating set 1810. An SSR is computed for each of the models according to Equation (15). For example, $SSR(Y^V, \hat{Y}_j^{(2)})$ 1839 is computed for the model $\hat{f}_j^{(2)}$ in accordance with Equation (15). FIG. 18C includes a plot 1840 of example SSR values for the p–1 models. In this example plot, point 1842 is the minimum SSR that corresponds to the model $\hat{f}_7^{(2)}$. The resulting model for the second step is $\hat{M}^{(2)} = \hat{f}_7^{(2)}$. As a result, the metric $X_7$ is regarded as irrelevant and discarded from the training set 1808 prior to proceeding to the next step with q=p–2.

Figures 18D, 18E:
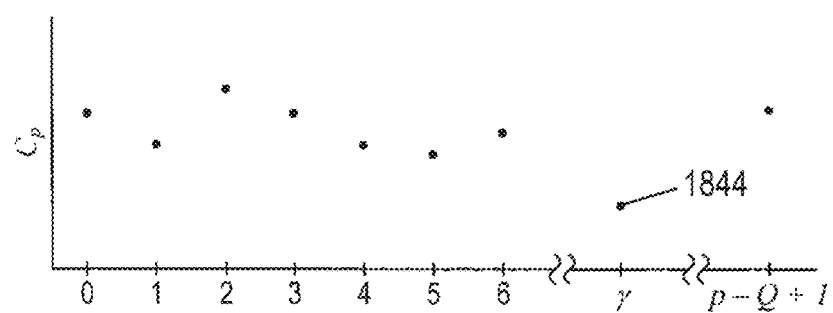

The stepwise process of removing irrelevant metrics is repeated for q=p–2, ..., Q to obtain a set of candidate models $M = \{\hat{M}^{(0)}, \hat{M}^{(1)}, \ldots, \hat{M}^{(p-Q+1)}\}$. A $C_p$-statistic is computed for each of the models in the set M as described above with reference to Equation (16). FIG. 18D shows an example of $C_p$-statistics obtained for each of the models. FIG. 18E shows a plot of an example $C_p$-statistics. The parametric model associated with the minimum of the $C_p$-statistics is the trained parametric inference model. In this example, point 1844 represents the minimum $C_p$-statistics, indicating that corresponding parametric model $\hat{M}^{(\gamma)}$ is the trained parametric inference model.

In another implementation, the operations manager performs k-fold cross validation to obtain a trained parametric inference model. With k-fold cross validation, a set of metrics X and corresponding KPI Y recorded over a historical time window are randomized and divided into k groups called "folds" of approximately equal size. A fold is denoted by $(\overline{X}_l, \overline{Y}_l)$, where $\overline{X}_l \subset X$, $\overline{Y}_l \subset Y$, the overbar denotes a subset of metrics $\overline{X}_l$ and corresponding KPI $\overline{Y}_l$ and subscript l is a fold index with l=1, ..., k. For each fold l, $(\overline{X}_l, \overline{Y}_l)$ is treated as a validating set, and a parametric model denoted by A is fit to the remaining k–1 folds using least squares described above Equations (10) and (11). For the l-th fold, an estimated KPI is computed with $\hat{f}_l(\overline{X}_l) = \hat{\overline{Y}}_l$. A mean squared error ("MSE") is computed for the estimated KPI and the KPI of the validating set as follows:

$$MSE(\hat{Y}_l, \overline{Y}_l) = \frac{1}{n}\sum_{i=1}^{n}(\overline{y}_{il} - \hat{y}_{il})^2 \qquad (17a)$$

where
  $\overline{y}_{il}$ is the i-th KPI value of the validating KPI $\overline{Y}_l$; and
  $\hat{y}_{il}$ is the i-th KPI value of the estimated KPI $\hat{Y}_l$.
The mean square errors are used to compute a k-fold cross-validation estimate:

$$CV_k = \frac{1}{k}\sum_{l=1}^{k} MSE(\hat{Y}_l, \overline{Y}_l) \qquad (17b)$$

When the k-fold cross validation estimate satisfies the condition $$CV_k < Th_{CV} \qquad (17c)$$

where $Th_{CV}$ is a user-defined threshold (e.g., $Th_{CV}=0.10$ or 0.15), for each of the parametric models $\{\hat{f}_1, \ldots, \hat{f}_k\}$, model coefficients of a trained parametric model are obtained by averaging the model coefficients of the k models as follows:

$$\hat{\beta}_j = \frac{1}{k}\sum_{l=1}^{k}\hat{\beta}_{jl} \qquad (17d)$$

for $j=0, 1, \ldots, p$

Figure 19A:
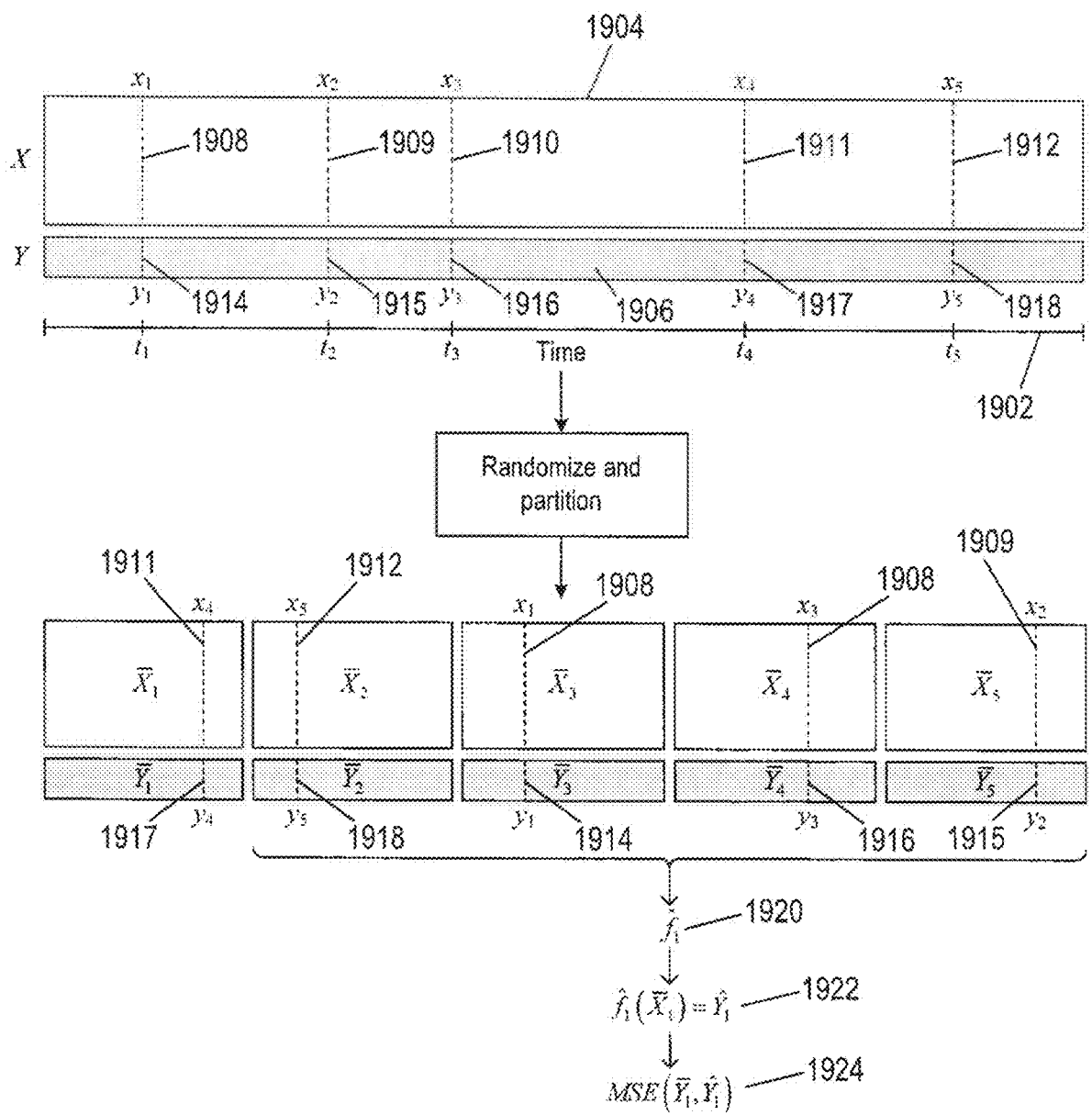
FIG. 19A-19E shows of an example of k-fold cross validation applied.
Figure 19B:
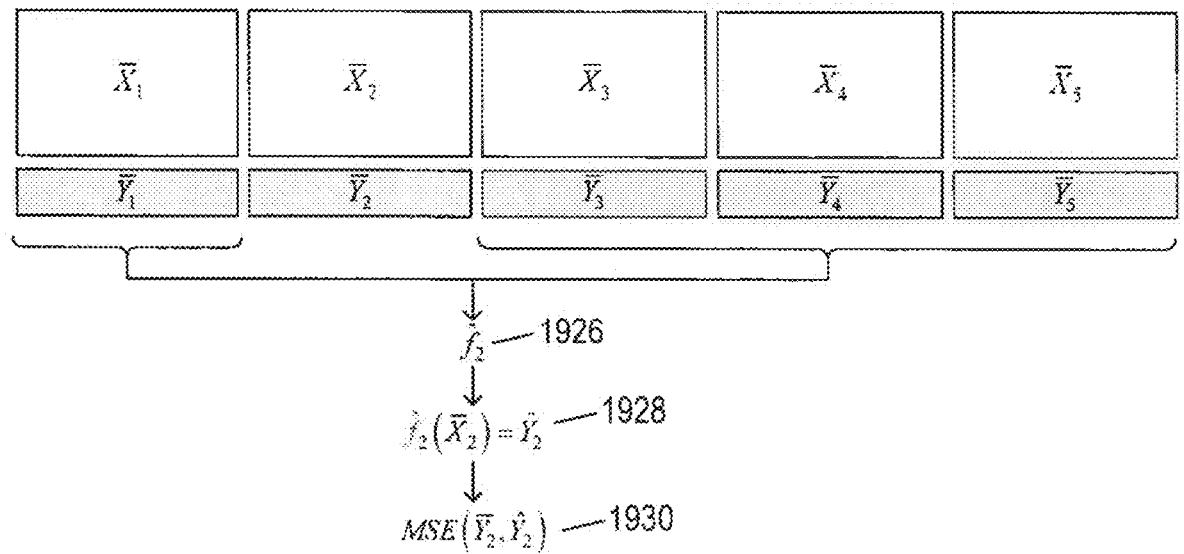
Figure 19C:
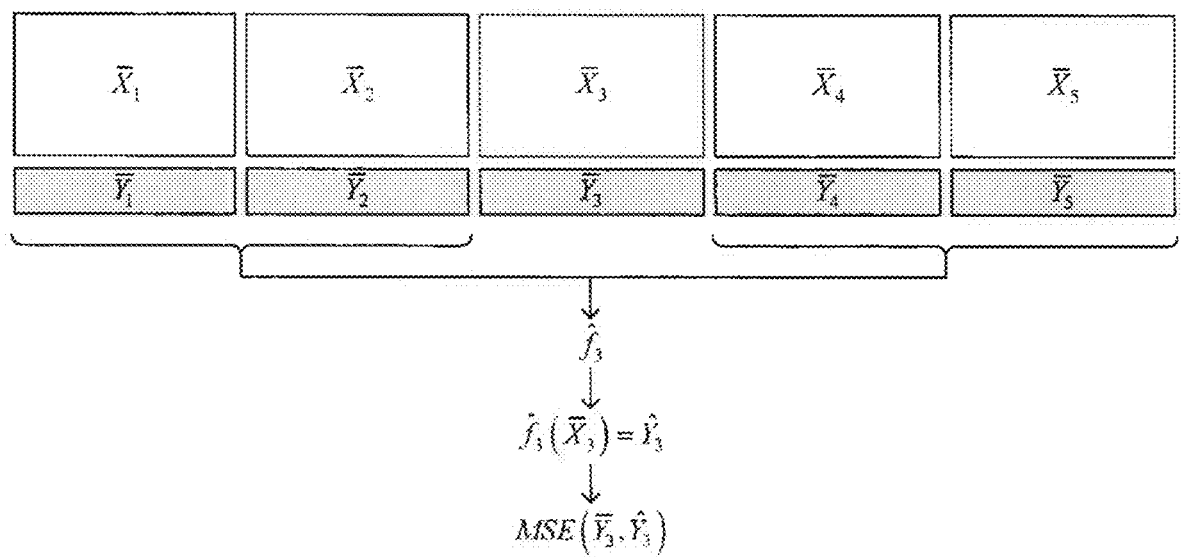
Figure 19D:
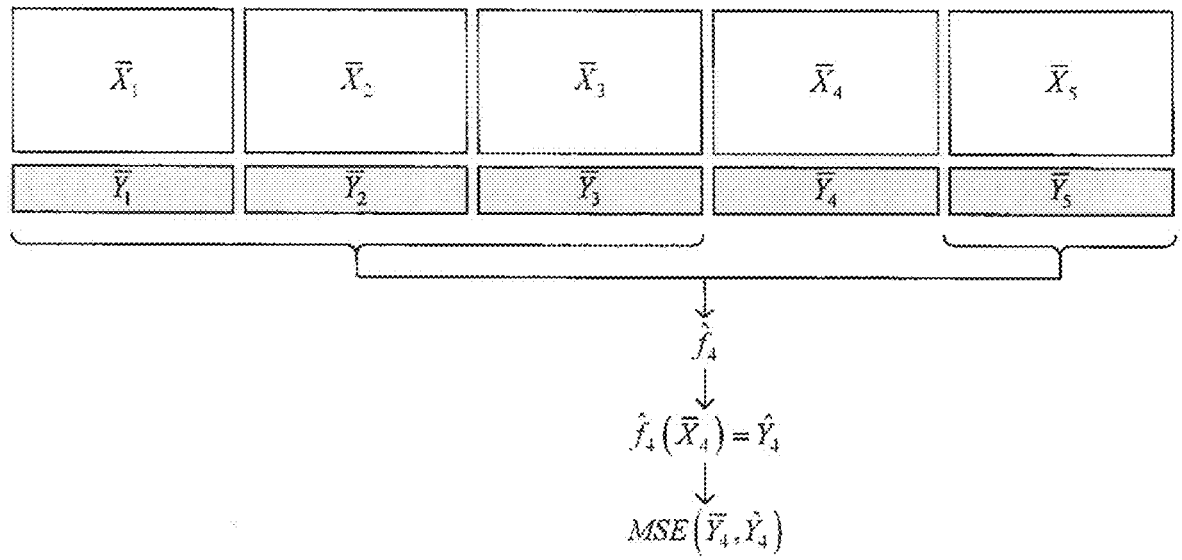
Figure 19E:
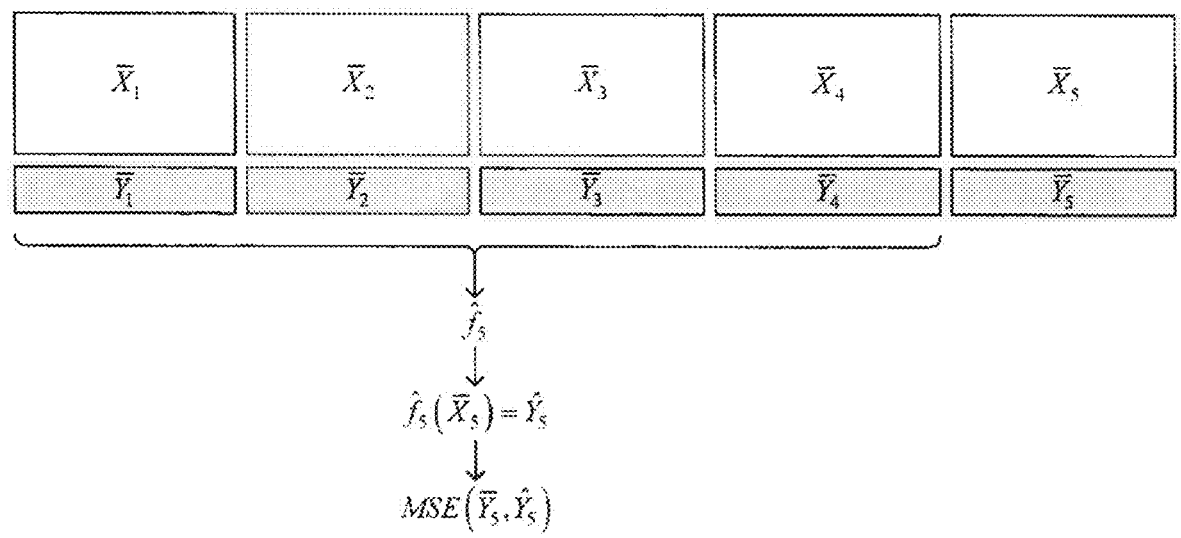

FIGS. 19A-19E show of an example of k-fold cross validation applied to an example set of metrics and KPI for k=5. In FIG. 19A, line 1902 represents a historical time window. Block 1904 represents a set of p metrics X recorded in the historical time window 1902. Shaded block 1906 represents KPI values for a KPI recorded in the historical time window 1902. The metrics X and KPI Y have been normalized and synchronized as described above. Dashed lines 1908-1912 denote metric values of five p-tuples $x_1$, $x_2$, $x_3$, $x_4$, and $x_5$ of the metrics with time stamps $t_1$, $t_2$, $t_3$, $t_4$, and $t_5$. Dashed lines 1914-1918 represent KPI values $y_1$, $y_2$, $y_3$, $y_4$, and $y_5$ with the time stamps $t_1$, $t_2$, $t_3$, $t_4$, and $t_5$. In this example, the metrics and corresponding KPI values at the same time stamps are randomized and partitioned into 5-folds. The metrics of the 5-folds are denoted by $\overline{X}_1$, $\overline{X}_2$, $\overline{X}_3$, $\overline{X}_4$, and $\overline{X}_5$ (i.e., $\overline{X}_1 \cup \overline{X}_2 \cup \overline{X}_3 \cup \overline{X}_4 \cup \overline{X}_5 = X$) and the corresponding KPIs are denoted by $\overline{Y}_1$, $\overline{Y}_2$, $\overline{Y}_3$, $\overline{Y}_4$, and $\overline{Y}_5$ (i.e., $\overline{Y}_1 \cup \overline{Y}_2 \cup \overline{Y}_3 \cup \overline{Y}_4 \cup \overline{Y}_5 = Y$). Randomization scrambles the p-tuples and corresponding KPI values. For example, randomization places the p-tuples $x_1$ 1908 and corresponding KPI value $y_1$ 1914 in the third fold $(\overline{X}_3, \overline{Y}_3)$. For the first iteration in FIG. 19A, the first fold $(\overline{X}_1, \overline{Y}_1)$ is the validating set and a parametric model $\hat{f}_1$ 1920 is obtained as described above with reference to Equations (10) and (11) using the folds $(\overline{X}_2, \overline{Y}_2)$, $(\overline{X}_3, \overline{Y}_3)$, $(\overline{X}_4, \overline{Y}_4)$, and $(\overline{X}_5, \overline{Y}_5)$ as a training set. The trained model $\hat{f}_1$ is applied to the metric $\overline{X}_1$ to obtain an estimated KPI $\hat{Y}_1$ 1922. A mean square error $MSE(\hat{Y}_1, \overline{Y}_1)$ 1924 is computed for the estimated KPI $\hat{Y}_1$ and the KPI $\overline{Y}_1$ of the first fold. For the second iteration in FIG. 19B, the second fold $(\overline{X}_2, \overline{Y}_2)$ is the validating set and a model $\hat{f}_2$ 1926 is trained as described above with reference to Equations (10) and (11) using the folds $(\overline{X}_1, \overline{Y}_1)$, $(\overline{X}_3, \overline{Y}_3)$, $(\overline{X}_4, \overline{Y}_4)$, and $(\overline{X}_5, \overline{Y}_5)$ as a training set. The trained model $\hat{f}_2$ is applied to the metric $\overline{X}_2$ to obtain an estimated KPI $\hat{Y}_2$ 1928. A mean square error $MSE(\hat{Y}_2, \overline{Y}_2)$ 1930 is computed for the estimated KPI $\hat{Y}_2$ and the KPI $\overline{Y}_2$ of the second fold. In FIGS. 19C-19E, the same process is repeated where each of the folds $(\overline{X}_3, \overline{Y}_3)$, $(\overline{X}_4, \overline{Y}_4)$, and $(\overline{Y}_5, \overline{Y}_5)$ is used separately as a validating set to obtain corresponding parametric models $\hat{f}_3$, $\hat{f}_4$, and $\hat{f}_5$ and corresponding mean square errors $MSE(\hat{Y}_3, \overline{Y}_3)$, $MSE(\hat{Y}_4, \overline{Y}_4)$, and $MSE(\hat{Y}_5, \overline{Y}_5)$. A 5-fold cross-validation estimate, $CV_5$, is computed as described above with reference Equation (17b). If the 5-fold cross-validation estimate satisfies the condition in Equation (17c), a trained parametric model is computed with estimated model coefficients computed as described above with reference to Equation (17d).

In another implementation, ridge regression may be used to compute estimated model coefficients $\{\hat{\beta}_j^R\}_{j=1}^p$ that minimizes $$\{\hat{\beta}_j^R\}_{j=1}^p = \sum_{i=1}^{n}\left(y_i - \beta_0 - \sum_{j=1}^{p}\beta_j x_{ij}\right)^2 \qquad (18a)$$

subject to the constraint that $$\sum_{j=1}^{p}\beta_j^2 \leq \lambda \qquad (18b)$$

where $\lambda \geq 0$ is a tuning parameter that controls the relative impact of the coefficients. The estimated model coefficients are computed using least squares with $$\beta^R = (X^T X + \lambda I_{p \times p})^{-1} X^T Y \qquad (19)$$

where $I_{p \times p}$ is the pxp identity matrix for different values of the tuning parameter $\lambda$. A set of metrics and a KPI recorded over a historical time window are partitioned to form a training set and a validating set as described above with reference to FIG. 19A. A set of models. (f(A), are computed for different tuning parameters according to Equation (18a)-(18b). The models are used to compute a set of corresponding estimated KPIs $\{\hat{Y}^{(\lambda)}\}$ for each of the tuning parameters. The parametric model that gives the smallest SSR value computed according to Equation (15) is the trained parametric inference model.

In still another implementation, lasso regression may be used to compute estimated model coefficients $\{\hat{\beta}_j^L\}_{j=1}^p$ that minimizes $$\{\hat{\beta}_j^L\}_{j=1}^p = \mathrm{argmin}\left\{\sum_{i=1}^{n}\left(y_i - \beta_0 - \sum_{j=1}^{p}\beta_j x_{ij}\right)^2\right\} \qquad (20a)$$

subject to the constraint that $$\sum_{j=1}^{p}|\beta_j| \leq s \qquad (20b)$$

where $s \geq 0$ is a tuning parameter. Computation of the estimated model coefficients $\{\hat{\beta}_j^L\}_{j=1}^p$ is a quadratic programming problem with linear inequality constraints as described in "Regression Shrinkage and Selection via the Lasso," by Robert Tibshirani, J. R. Statist. Soc. B (1996) vol. 58, no. 1, pp. 267-288.

The parametric inference models described above are computed based on an assumed linear relationship between metrics and a KPI. However, in certain cases, the relationship between metrics and a KPI is not linear. A cross-validation error estimate, denoted by $CV_{error}$, may be used to determine whether a parametric inference model is suitable or a non-parametric inference model should be used instead. When the cross-validation error estimate satisfies the condition $CV_{error} < Th_{error}$, where $Th_{error}$ is an error threshold (e.g., $Th_{error} = 0.1$ or 0.2), the parametric inference model is used. Otherwise, when the cross-validation error estimate satisfies the condition $CV_{error} \geq Th_{error}$, a non-parametric inference model is computed as described below. For the k-fold cross validation, the $CV_{error} = CV_k$, described above with reference to Equation (17b). For the other parametric inference models described above, the $CV_{error} = MSE(\hat{Y}, Y^V)$, where $\hat{Y}$ is the estimated KPI computed for a validating set of metrics $X^V$ and validating KPI $Y^V$.

Non-Parametric Inference Model

In cases where there is no linear relationship between metrics and a KPI, the operations manager trains a non-parametric inference model based on K-nearest neighbor regression. K-nearest neighbor regression is performed by first determining an optimum positive integer number, K, of nearest neighbors for the metrics and the KPI. The optimum K is then used to predict, or forecast, a KPI value for prospective changes to metric values of the metrics and troubleshoot a root cause of an application performance problem.

Figure 20A:
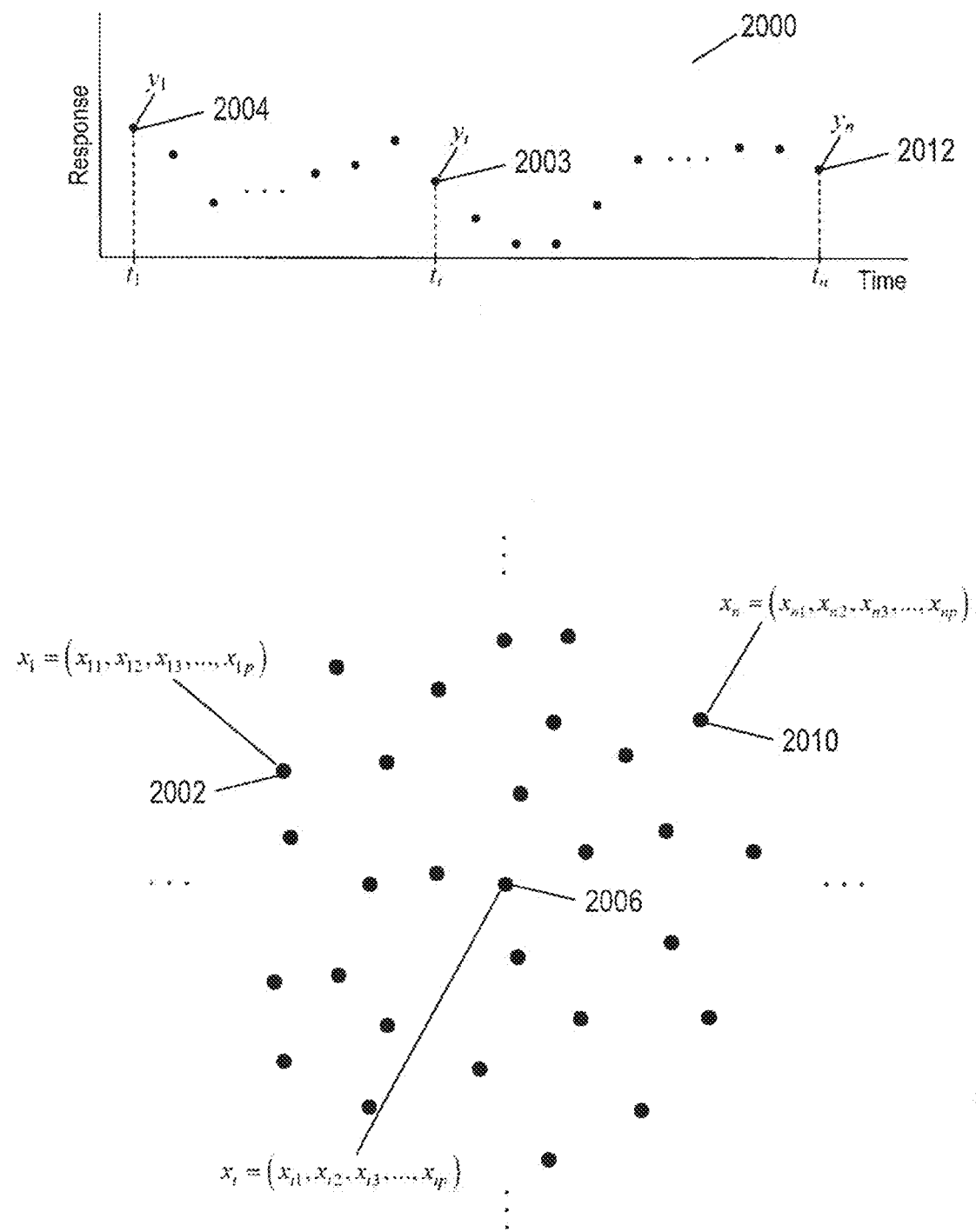

FIGS. 20A-20E show an example of determining a K-nearest neighbor regression model. FIG. 20A shows an example of p-tuples of p metrics represented by points in a p-dimensional space and a plot 2000 of corresponding KPI values of KPI. Each p-tuple of the p metrics is represented by a point in a p-dimensional space and has a corresponding KPI value in the plot 2000 at the same time stamp. For example, point 2002 comprises metrics values of p metrics and corresponds to KPI value 2004 at a time stamp $t_1$. Point 2006 comprises metrics values of the p metrics and corresponds to KPI value 2008 at a time stamp $t_i$. Point 2010 comprises metrics values of the p metrics and corresponds to KPI value 2012 at a time stamp $t_n$.

A distance is computed between each pair of the p-tuples in the p-dimensional space using a Euclidean distance:

$$d(x_\alpha, x_i) = \sqrt{(x_{\alpha 1} - x_{i1})^2 + \ldots + (x_{\alpha p} - x_{ip})^2}$$

where $i = 1, \ldots, n$ with $i \neq \alpha$.

Let $N_K$ denote a set of K nearest-neighbor p-tuples to a p-tuple $x_i$. For an initial value K (e.g., K=2), an estimated KPI is computed by averaging KPI values of K nearest-neighbor p-tuples to the p-tuple $x_1$ of each time stamp $t_i$ in the historical time window:

$$\hat{y}_i = \frac{1}{K} \sum_{x_\alpha \in N_K} y_\alpha \quad (21)$$

The process is repeated for different values of K. An MSE is computed for each K as follows:

$$MSE(K) = \frac{1}{n} \sum_{i=1}^{n} (y_i - \hat{y}_i)^2 \quad (22)$$

The value of K with the minimum MSE is the optimum K that relates the metrics to the KPI. Let $N_0$ be the K p-tuples that are closest to a p-tuple $x_0$. The estimate KPI is given by:

$$\hat{y}_0 = \hat{f}(x_0) = \frac{1}{K} \sum_{x_\alpha \in N_0} y_\alpha$$

FIG. 20B shows an example of computing an estimated KPI for K=5 nearest neighbors to each p-tuple. The estimated KPI values computed for five nearest neighbors of the p-tuples are represented by open dots in the plot 2000. For example, estimated KPI value $\hat{y}_i$ 2014 is computed by averaging the KPI values of the five nearest p-tuples 2016-2020 of the p-tuple 2006 according to Equation (21). An MSE, MSE(5), is computed for the estimated KPI values and KPI values according to Equation (22).

FIG. 20C shows an example of computing estimated KPI for K=7 nearest neighbors to each p-tuple. The estimated KPI values computed for seven nearest neighbors of the p-tuples are represented by open dots in the plot 2000. For example, estimated KPI value $\hat{y}_i$ 2022 is computed by averaging the KPI values of the seven nearest p-tuples 2016-2020 and 2023-2024 of the p-tuple 2006 according to Equation (21). An MSE, MSE(7), is computed for the estimated KPI values and KPI values according to Equation (22).

FIG. 20D shows an example of computing estimated KPI for K=9 nearest neighbors to each p-tuple. The estimated KPI values computed for nine nearest neighbors of the p-tuples are represented by open dots in the plot 2000. For example, estimated KPI value 912026 is computed by averaging the KPI values of the nine nearest p-tuples 2116-2020, 2023, 2024, 2028, and 2029 of the p-tuple 2006 according to Equation (21). An MSE, MSE(9), is computed for the estimated KPI values and KPI values according to Equation (22).

Figure 20E:
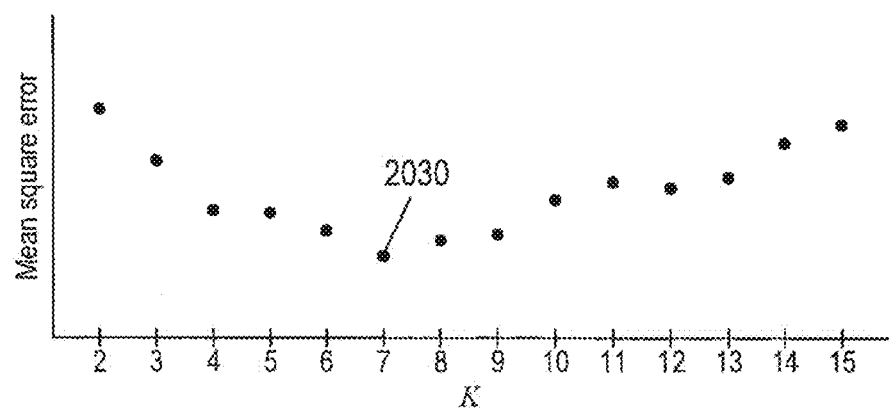

FIG. 20E shows a plot of MSE values versus values of K. Dots represent MSE values for K ranging from 2 to 15. In this example, the minimum MSE 2030 occurs at K=7. As a result, the optimum K that relates the metrics and KPI shown in FIG. 20A is K=7. In this example, a predicted KPI for an unknown p-tuple is computed by averaging seven KPI values of the seven metrics located closest to the unknown p-tuple in p-dimensional space.

An application service degradation or non-optimal performance of an application can originate from the infrastructure and/or the application itself and can be discovered in an application key performance indicator ("KPI"). For example, an application with a KPI that violates a performance threshold can be selected for troubleshooting. After an inference model has been trained for the application, the computer-implemented processes and systems described below use the trained inference model and rules to identify the performance problem and generate a recommendation for correcting the performance problem. The processes and systems eliminate human errors in detecting application performance problems and significantly reduce the time for detecting the performance problem from days and weeks to minutes and seconds. The processes and systems provide immediate notification of a performance problem, provide a recommendation for correcting the performance problem, and enable rapid execution of remedial measures that correct the performance problem.

Figure 21:
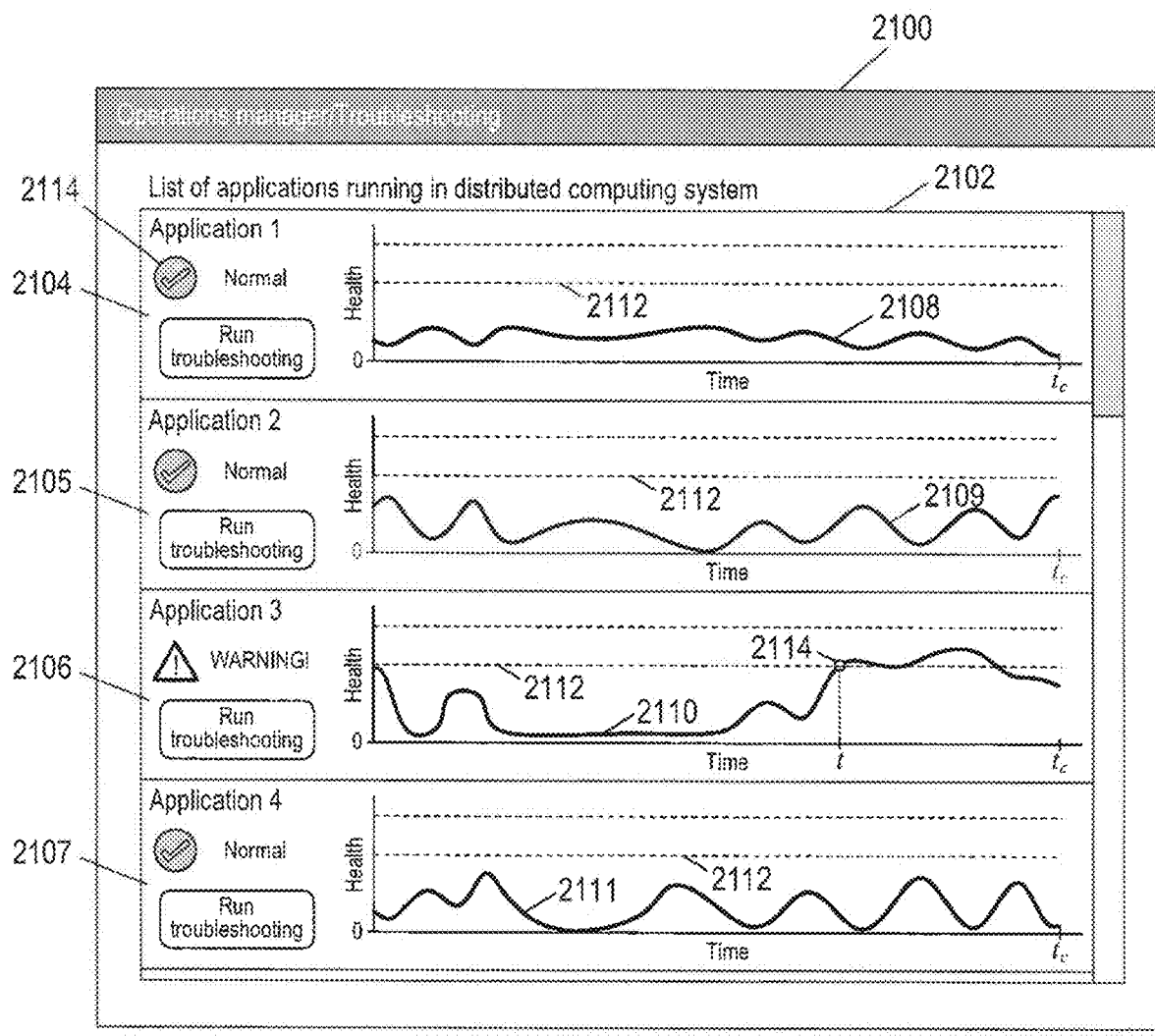
FIG. 21 shows an example graphical user interface ("GUI") that displays key performance indicators ("KPIs") associated with different applications running in a distributed computing system.

FIG. 21 shows an example graphical user interface ("GUI") 2100 that displays KPIs associated with different applications running in a distributed computing system. The GUI 2100 includes a window 2102 that displays four entries 2104-2107 that list applications identified as Application 1, Application 2, Application 3, and Application 4 and show plots of curves 2108-2111 that represent corresponding KPIs plotted over the same recent run-time interval that ends at the current time denoted by $t_c$. Horizontal dashed lines represent thresholds between normal and abnormal behavior of the applications. For example, KPI values of Applications 1, 2, and 4 are below a threshold 2112, which indicates the applications are performing normally as represented by normal icons, such as normal icon 2114. On the other hand, KPI values of the Application 3 exceed the threshold 2112, such as KPI value 2114, triggering a warning alert 2116. Threshold 2116 indicates the application exhibits critical behavior that triggers a critical alert icon that is not shown. A user may select "run troubleshooting" by clicking on the button 2118, which begins the automated computer-implemented process of troubleshooting Application 3 described below.

When troubleshooting is executed for an application running in a distributed computing system, the operations manager uses a trained inference model, $\hat{f}^t$, to troubleshoot a performance problem with the selected application. The operations manager receives run-time metrics, $\{v_j^r\}_{j=1}^P$, produced by the same metric sources used to train the inference model in a run-time interval denoted by $[t_b, t_c]$, where superscript r denotes run time, $t_b$ denotes the beginning of the run-time interval, and $t_c$ denotes the end of the run-time interval. For example, the run-time interval may contain time stamps for the last 30 seconds, 1 minute, or 2 minutes. The run-time metrics $\{v_j^r\}_{j=1}^P$ are normalized and synchronized to the general set of regularly spaced time stamps as described above with reference to FIG. 15B to obtain normalized and synchronized run-time metrics denoted by $\{X_j^r\}_{j=1}^P$. The operations manager receives a set of run-time KPIs for the application in the run-time interval. The run-time KPIs are normalized and synchronized to the same general set of time stamps as the metrics and is denoted by $Y^r$.

The operations manager uses the trained inference model (i.e., parametric inference model or non-parametric inference model) to identify the metrics that are associated with the performance problem identified in the KPI. In one implementation, a run-time estimated KPI, $\hat{Y}_m^r$, is computed for each metric $X_m^r$ by omitting the metric $X_m^r$ from the parametric model. For example, for each m=1, . . . , p, the operations manager computes a run-time estimated KPI using the trained parametric model:

$$\hat{f}^t(\{X_j^r\}_{j=1}^P - X_m^r) = \hat{Y}_m^r \qquad (23)$$

where the minus symbol "–" denotes subtraction, or omission, of the metric $X_m^r$ from the set of run-time metrics $\{X_j^r\}_{j=1}^P$ to obtain a set of expected run-time KPIs $\{\hat{Y}_j^r\}_{j=1}^P$; and $\hat{f}^t(\bullet)$ denotes the trained inference model.

The operations manager computes an MSE, $MSE(\hat{Y}_m^r, Y^r)$, for each of the expected run-time KPIs. Each MSE indicates the degrees to which the KPI depends on a metric. An omitted metric with a large associated MSE indicates that the KPI depends on the omitted metric more than an omitted metric with a smaller MSE. The operations manager computes an importance score for each metric based on the associated MSE. The importance score is a measure of how much the KPI depends on the metric. The operations manager computes the importance score for each metric by first determining the largest MSE of the p run-time metrics:

$$MSE_{max} = \max\{MSE(\hat{Y}_1^r, Y^r), \ldots, MSE(\hat{Y}_p^r, Y^r)\} \qquad (24)$$

The operations manager then computes an importance score for each j=1, . . . , p as follows:

$$I_j^{score} = \frac{SE(\hat{Y}_j^r, Y^r)}{MSE_{max}} \times 100 \qquad (25)$$

A threshold for identifying the highest ranked metrics is given by the condition:

$$I_j^{score} > Th_{score} \qquad (26)$$

where $Th_{score}$ is a user defined threshold. For example, the user-defined threshold may be set to 70%, 60%, 50% or 40%. The importance score computed in Equation (25) is assigned to each corresponding metric. The metrics are rank ordered based on the corresponding importance scores to identify the highest ranked metrics that directly impact the KPI. For example, the highest ranked metrics are metrics with importance scores above the user-defined threshold $Th_{score}$. The combination of highest ranked metrics associated with a KPI that indicates a performance problem with an application identify the root cause of the performance problem with the application.

In another implementation, importance scores of the metrics are determined based on magnitudes of estimated model coefficients of a parametric inference model. The magnitudes of the estimated model coefficients are given by $|\hat{\beta}_j|$, where $|\bullet|$ denotes the absolute value and j=1, . . . , p. The operations manager computes the importance score for each metric by first determining the largest magnitude estimated model coefficient:

$$\hat{\beta}_{max} = \max\{|\hat{\beta}_1|, \ldots, |\hat{\beta}_p|\} \qquad (27)$$

The operations manager then computes an importance score for each j=1, . . . , p as follows:

$$I_j^{score} = \frac{|\hat{\beta}_j|}{\hat{\beta}_{max}} \times 100 \qquad (28)$$

An importance score is assigned to each corresponding metric. The metrics are rank ordered based on the corresponding importance scores to identify the highest ranked metrics that may affect the KPI using the condition in Equation (26).

FIGS. 22A-22D show examples of highest ranked metrics associated with different types of performance problems. FIG. 22A shows an example of metrics, importance scores and ranks of metrics with importance scores above 50. The combination of metrics with importance scores greater than 50 are associated with inadequate memory allocated to VMs of an application. FIG. 22B shows an example of metrics, importance scores and ranks of metrics with importance scores above 50 and are associated with inadequate CPU allocated to VMs of an application. FIG. 22C shows an example of metrics, importance scores and ranks of metrics with importance scores above 50 and are associated with inadequate data storage allocated to files and databases used by an application. FIG. 22D shows an example of metrics, importance scores and ranks of metrics with importance scores above 50 and are associated with inadequate network bandwidth allocated to an application. Other types of combinations of metrics (not shown) that are used to identify the root cause of a performance problem include metrics of the host used to run the VMs of an application and metrics of disk space of data-storage devices used to store files and data used and generated by an application.

In one implementation, the operations manager compares the highest ranked metrics with different lists of ranked metrics. Each list of ranked metrics corresponds to a particular performance problem and has an associated rule for correcting the corresponding performance problem. When a match between the highest ranked metrics and a list of ranked metrics is determined, the performance problem that corresponds to the list of ranked metrics is identified as the performance problem of the application.

Figure 23:
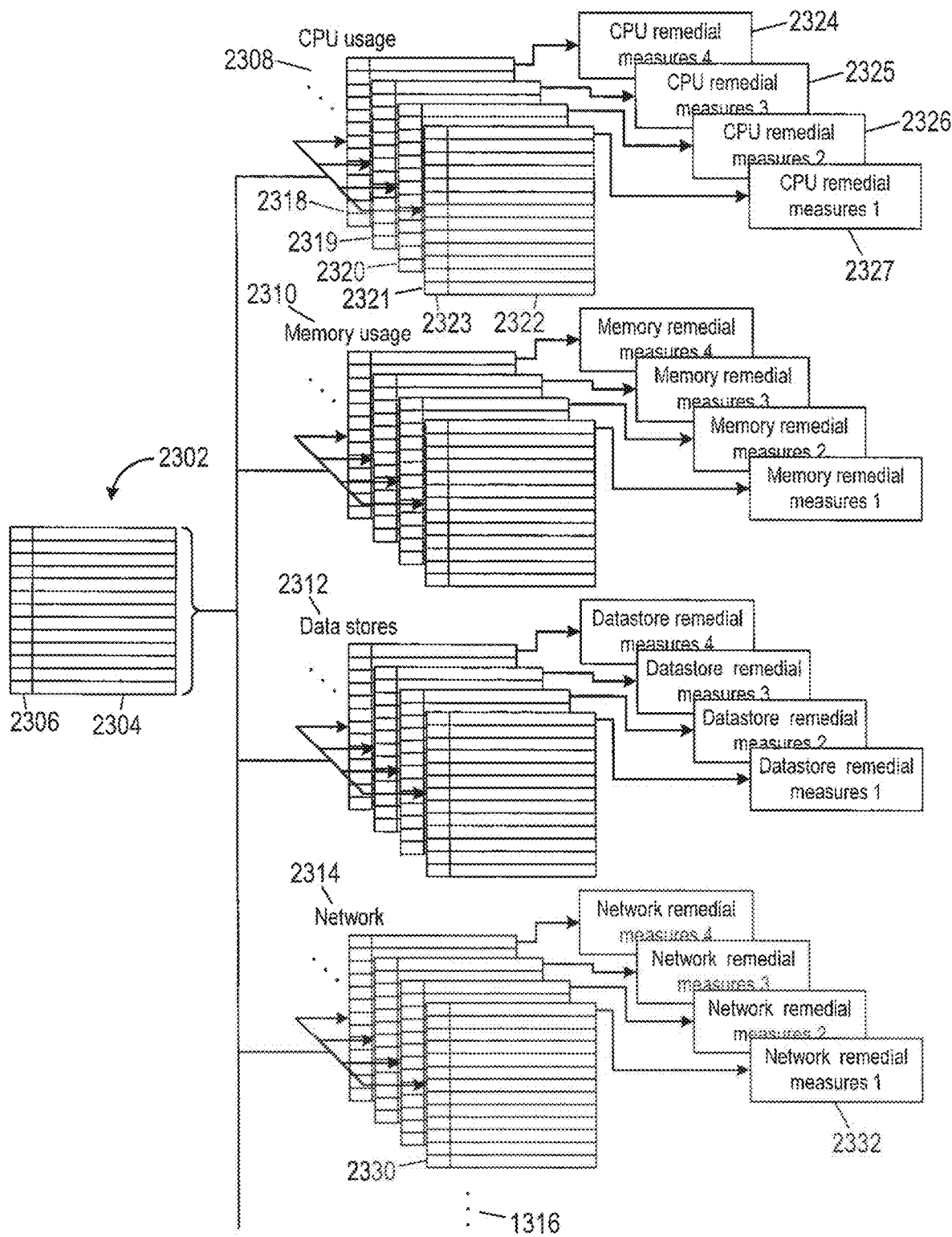
FIG. 23 shows an example of highest ranked metrics and corresponding recommendations.

FIG. 23 shows an example of highest ranked run-time metrics 2302, such as one of the highest ranked run-time metrics shown in FIGS. 22A-22D. The highest ranked metric 2302 includes a column 2304 of metrics and a column 2306 of associated ranks, such as the columns of metrics and associated ranks described above with reference to FIGS. 22A-22D. The operations manager maintains in a data-storage device lists of ranked metrics associated with CPU usage 2308, memory usage 2310, data stores 2312, network throughput 2314, and other lists of ranked metrics represented by ellipsis 1316, such as traffic rate, traffic drop rate, and flow rate. For example, CPU usage performance problems has lists of ranked metrics 1318-1321. Each listing contains a different combination of metrics and associated ranks and is associated with a particular application performance problem. For example, list of ranked metrics 2321 includes a column 2322 of metrics and a column 2323 of associated ranks. Each list of ranked metrics has an associated rule that when executed by the operations manager identifies the performance problem associated with the list of ranked metrics. For example, lists of ranked metrics 1318-1321 have different corresponding rules 1324-1327 that identify the performance problem associated with the lists of ranked metrics 1318-1321. Examples of performance problems associated with different combinations of ranked metrics in the lists of ranked metrics maintained by the operations manager include, but are not limited to, CPU usage overload on VM of the application, CPU usage overload of host, memory overload on a host of application VMs, virtual CPU overload for a VM, virtual memory usage overload for a VM, virtual router overloaded, packet drops occurring at VM, packet drops occurring at a firewall, sudden traffic burst at VM, traffic rate at a VM suddenly drops, a data link between hosts has failed. The operations manager compares the highest ranked metrics 2302 with each list. When the ranked order of metrics in the highest ranked metrics 2302 matches the ranked order of metrics in one of the lists of ranked metrics, the corresponding rule reports the performance problem in a GUI in the form of an alert that identifies the performance problem and a recommendation for correcting the performance problem.

FIG. 24 shows a table of example rules stored in a data storage device and is accessed by the operations manager to report performance problems and recommendations for correcting the performance problem. When the highest ranked metrics 2302 matches list of metrics "List of ranked metrics_1" 2401, the operations manager displays the performance problem "insufficient vCPU allocated to VM$_1$" 2402 and a recommendation "increase CPU allocation to VM$_1$" 2403 in a GUI. When the highest ranked metrics 2302 matches list of metrics "List of ranked metrics_61" 2404, the operations manager displays the performance problem "error in service pack for the application" 2405 and a recommendation "backout service pack correction" 2406 in a GUI.

In another implementation, the operations manager resolves a run-time performance problem by generating recommendations for resolving the performance problem based on the highest ranked metrics that identify the run-time performance problem, such as one or more highest ranked metrics that also trigger corresponding run-time alerts. Let $\{v_j\}_{j \in C}$ denote a set of metrics that corresponds to a performance problem, where C denotes indices of metrics with run-time metric values that violate corresponding thresholds (i.e., $\{v_j\}_{j \in C} \subset \{v_j\}_{j=1}^P$). In other words, each metric $v_j$ in $\{v_j\}_{j \in C}$ has at least one time stamp $t_i \in [t_b, t_e]$ that satisfies the following condition:

$$\bar{x}_j(t_i) > Th_j \tag{29}$$

where $Th_j$ is a threshold associated with the metric $v_j$. The threshold $Th_j$ may be a dynamic threshold or a static threshold depending on the corresponding metric $v_j$. If each of the metrics $v_j$ also has an importance score $I_j^{score}$ that satisfies the condition in Equation (26), the operations manager identifies an associated performance problem and a recommendation that corrects the performance problem indicated by the set of metrics $\{v_j\}_{j \in C}$ from a set of rules and displays the performance problem and recommendation in a GUI. For example, suppose the metrics $\{v_{10}, v_{13}, v_{35}\}$ have run-time metric values that violate corresponding thresholds, as described above with reference to Equation (29), and have corresponding importance scores $\{I_{10}^{score}, I_{13}^{score}, I_{35}^{score}\}$, that satisfy the condition in Equation (26). The combination of metrics $\{v_{10}, v_{13}, v_{35}\}$ that violate corresponding thresholds are an indication of a particular performance problem with an application. The operations manager identifies the rule associated with the performance problem and a recommendation for correcting the performance problem and displays the performance problem and the recommendation in a GUI.

FIG. 25 shows a table of example rules stored in a data storage device and is accessed by the operations manager to report performance problems and recommendations for correcting the performance problem. When the only metric of the highest ranked metrics with run-time metric values that violate a corresponding threshold is "$\{v_1\}$" 2401, the operations manager displays the performance problem "insufficient vCPU allocated to VM$_1$" 2502 and a recommendation to "increase CPU allocation to VM$_1$" 2503 in a GUI. When the only metrics of the highest ranked metrics exhibiting run-time metric values that violate corresponding thresholds are "$\{v_8, v_{10}, v_{22}, v_{23}, v_{35}\}$" 2504, the operations manager displays the performance problem "insufficient network throughput to host" 2505 and a recommendation "migrate VMs to another host" 2506 in a GUI.

Rules may also include remedial measures in the form of script programs, sequences of computer-implemented instructions, or application programming interfaces ("APIs") that execute remedial measures in accordance with the recommendations. Suppose a rule recommends increasing CPU allocation to an application exhibiting insufficient CPU application to VMs. The rule includes a remedial measure that increases CPU allocation to VMs of the application. In another example, suppose a rule recommends increasing network bandwidth to the host of VMs of an application. The rule may include a remedial measure that increases network bandwidth to the VMs of the application. Remedial measures may include instructions for automatically reconfiguring a virtual network used by VMs of the application or migrating VMs, or containers, that execute software components of the application from one server computer to another server computer with more CPU, memory, and/or networking capabilities. Remedial measures may include powering down server computers, replacing VMs disabled by physical hardware problems and failures, spinning up cloned VMs on additional server computers to ensure that software components of the VMs are accessible to increasing demand for services.

Figure 26:
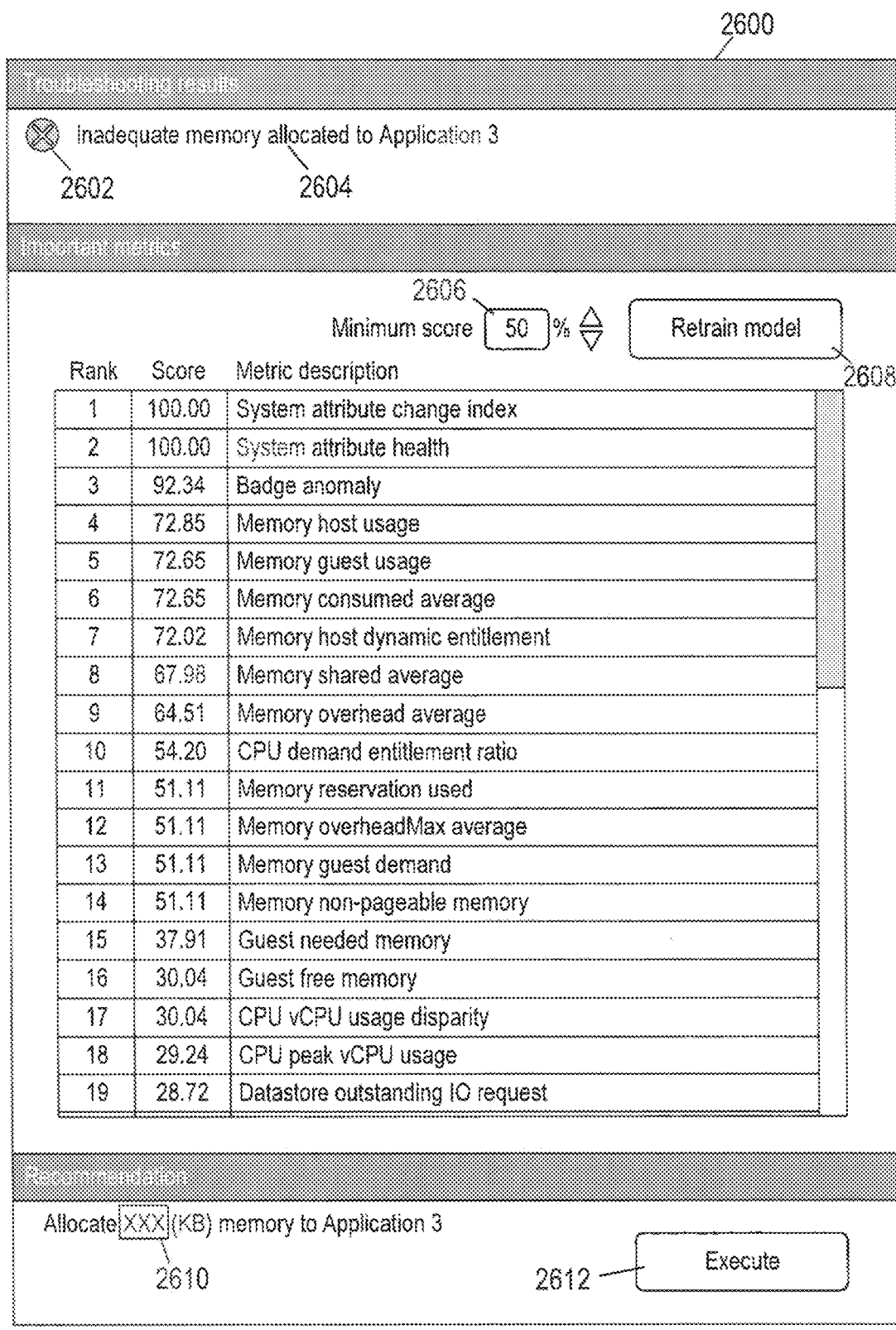
FIG. 26 shows an example GUI that displays example troubleshooting results for the selected application in FIG. 21.

FIG. 26 shows an example GUI 2600 that displays example troubleshooting results for the selected application in FIG. 21. The GUI 2600 displays an alert 2602 indicating that the root cause of the performance problem as inadequate memory allocation to Application 3. In this example, the GUI 2600 displays the rank order metrics in FIG. 22A. The GUI 2600 allows a user, such as a system administrator or software engineer, to perform automated retraining of the inference model with metrics above a minimum score enter in a field 2606 by clicking on button 2608. Based on the combination of ranked metrics, the GUI displays a recommended remedial measure and enables a user to input an additional memory allocation 2610 and cause the operations manager to execute the allocation by clicking on the button 2612.

When the button 2608 is clicked by a user, the operations manager retrains the model as described above with only the metrics having importance values that are greater than the minimum score selected by the user. When the button 2610 is clicked by a user, the operations manager executes instructions that allocate additional memory to one or more of the VMs of the application.

The operations manager also allows for a user to rate the individual metrics and retain the model with only the highest rated metrics. For example, a user may rate each metric used to train the model has high priority or low priority and then retrain the model with only the high priority metrics.

Figure 27:
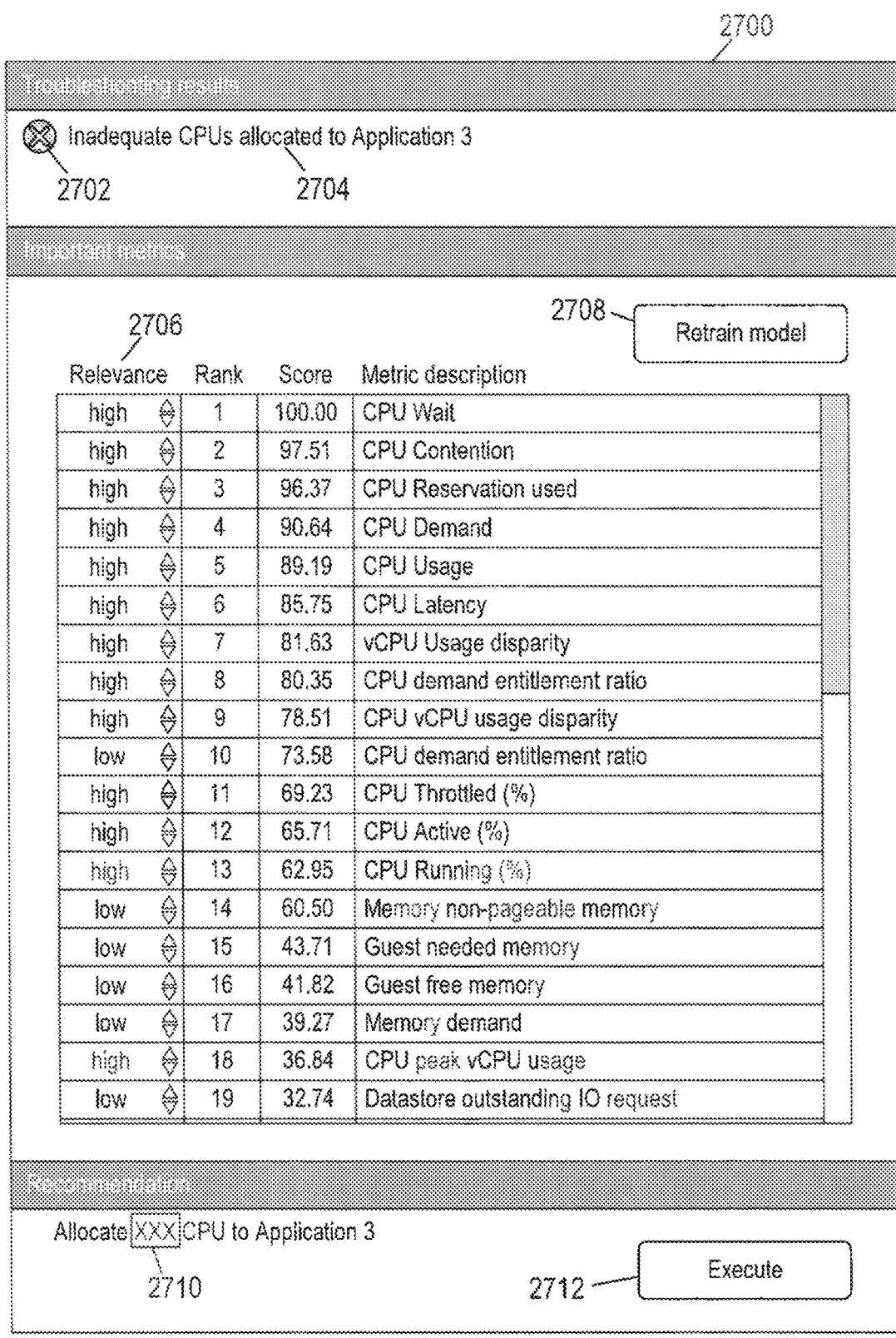
FIG. 27 shows an example GUI that displays example troubleshooting results for the selected application in FIG. 21.

FIG. 27 shows an example GUI 2700 that displays example troubleshooting results for the selected application in FIG. 21. The GUI 2700 displays an alert 2702 indicating that the root cause of the performance problem as inadequate CPU allocation to Application 3. In this example, the GUI 2700 displays the rank order metrics in FIG. 22B. The GUI 2700 allows a user, such as a system administrator or software engineer, to identify metrics high or low priority by clicking on arrows in column 2706. The user can then select automated retraining of the inference model with high priority metrics selected in column 2706 by clicking on button 2708. Based on the combination of ranked metrics, the GUI displays a recommended remedial measure that enables a user to input an additional CPU allocation 2710 and causes the operations manager to execute the allocation by clocking on the button 2712.

When the button 2708 is clicked by a user, the operations manager retrains the model as described above with only the high priority metrics selected by the user. When the button 2710 is clicked by a user, the operations manager executes instructions that allocate additional CPUs to the VMs of the application.

A trained model may be used to plan for optimal allocation of resources for an application, such as how much to scale certain resources up or down to meet changing demands. For example, software engineers of an online retail application may have observed that during previous holidays use of the retail application increases and latency and traffic KPIs associated with the application increase as a result. In order to plan for optimal allocation of resources, the run-time metrics described above are placed with metrics and a KPI recorded over a previously high customer volume time interval are input to the trained model. The output is displayed in a GUI, such as the GUIs 2600 and 2700, that enables a user to view the highest ranked metrics and recommendation for executing remedial measures that will correct the problem recorded in the KPI. A user can execute the remedial measures prior to the time of expecting increased use of the application.

The methods described below with reference to FIGS. 28-32 are stored in one or more data-storage devices as machine-readable instructions that when executed by one or more processors of a computer system, such as the computer system shown in FIG. 1, determine the state of a complex computational system of a distributed computing system. The computer-implemented process described below eliminate human errors in detecting application performance problems and significantly reduce the time for detecting a performance problem from days and weeks to minutes and seconds, thereby providing immediate notification of a performance problem, providing a recommendation for correcting the performance problem, and enabling rapid execution of remedial measures that correct the performance problem.

Figure 28:
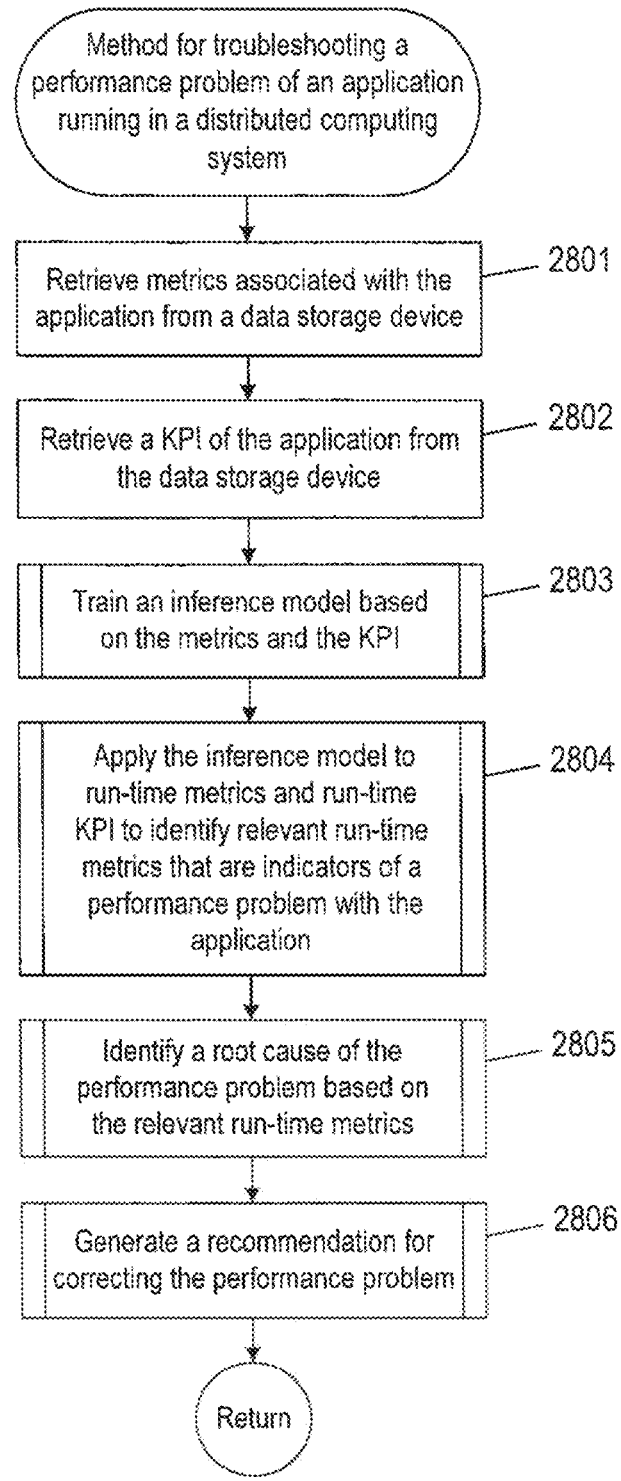
FIG. 28 is a flow diagram illustrating an example implementation of a method for troubling a performance problem of on application running in a distributed computing system.

FIG. 28 is a flow diagram illustrating an example implementation of a method for troubling a performance problem of an application running in a distributed computing system. In block 2801, metrics associated with the application exhibiting the performance problem are retrieved from a data-storage device. In block 2802, a KPI of the application is retrieved from the data-storage device. In block 2803, a "train an inference model based on the metrics and the KPI" procedure is performed. An example implementation of the "train an inference model based on the metrics and the KPI" procedure is described below with reference to FIG. 29. In block 2804, a "apply the inference model to run-time metrics and run-time KPI to identify relevant run-time metrics that are indicators of a performance problem with the application" procedure is performed. An example implementation of the "apply the inference model to run-time metrics and run-time KPI to identify relevant run-time metrics that are indicators of a performance problem with the application" procedure is described below with reference to FIG. 30. In block 2805, a "identify a root cause of the performance problem based on the relevant run-time metrics" procedure is performed. An example implementation of the "identify a root cause of the performance problem based on the relevant run-time metrics" procedure is described below with reference to FIG. 31. In block 2806, a "generate a recommendation for correcting the performance problem" procedure is performed in order to provide immediate notification of the run-time performance problem. An example implementation of the "generate a recommendation for correcting the performance problem" procedure is described below with reference to FIG. 32.

Figure 29:
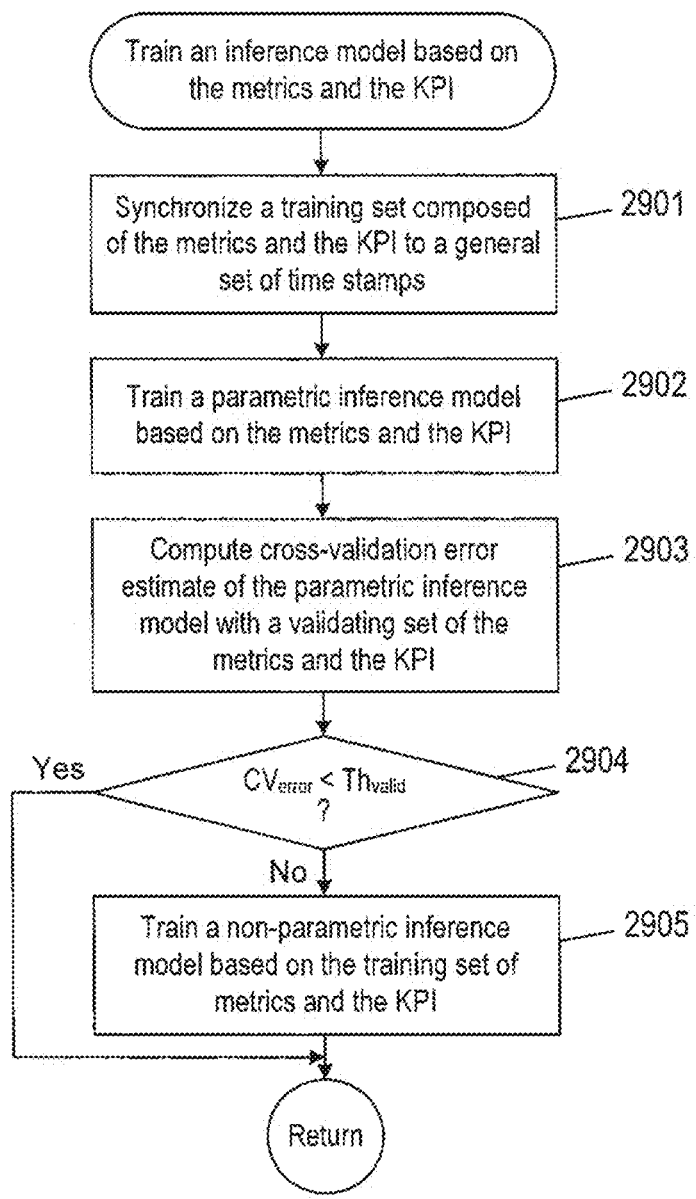
FIG. 29 is a flow diagram illustrating an example implementation of the "train an inference model based on the metrics and the KPI" procedure performed in FIG. 28.

FIG. 29 is a flow diagram illustrating an example implementation of the "train an inference model based on the metrics and the KPI" procedure performed in block 2803. In block 2901, the metrics and the KPI are a training set that is synchronized to the same set of regularly spaced time stamps as described above with reference FIG. 16B. In block 2902, a parametric inference model of the application is trained based on the metrics and the KPI as described above with reference FIGS. 17-19E. In block 2903, a cross-validation error estimate of the parametric inference model is computed with a validating set of metrics and the KPI. In decision block 2904, when the cross-validation error estimate is less than a validation threshold, the parametric inference model is used as the inference model. Otherwise, control flows to block 2905. In block 2905, a non-parametric inference model of the application is trained based on the metrics and the KPI as described above with reference FIGS. 20A-20E.

Figure 30:
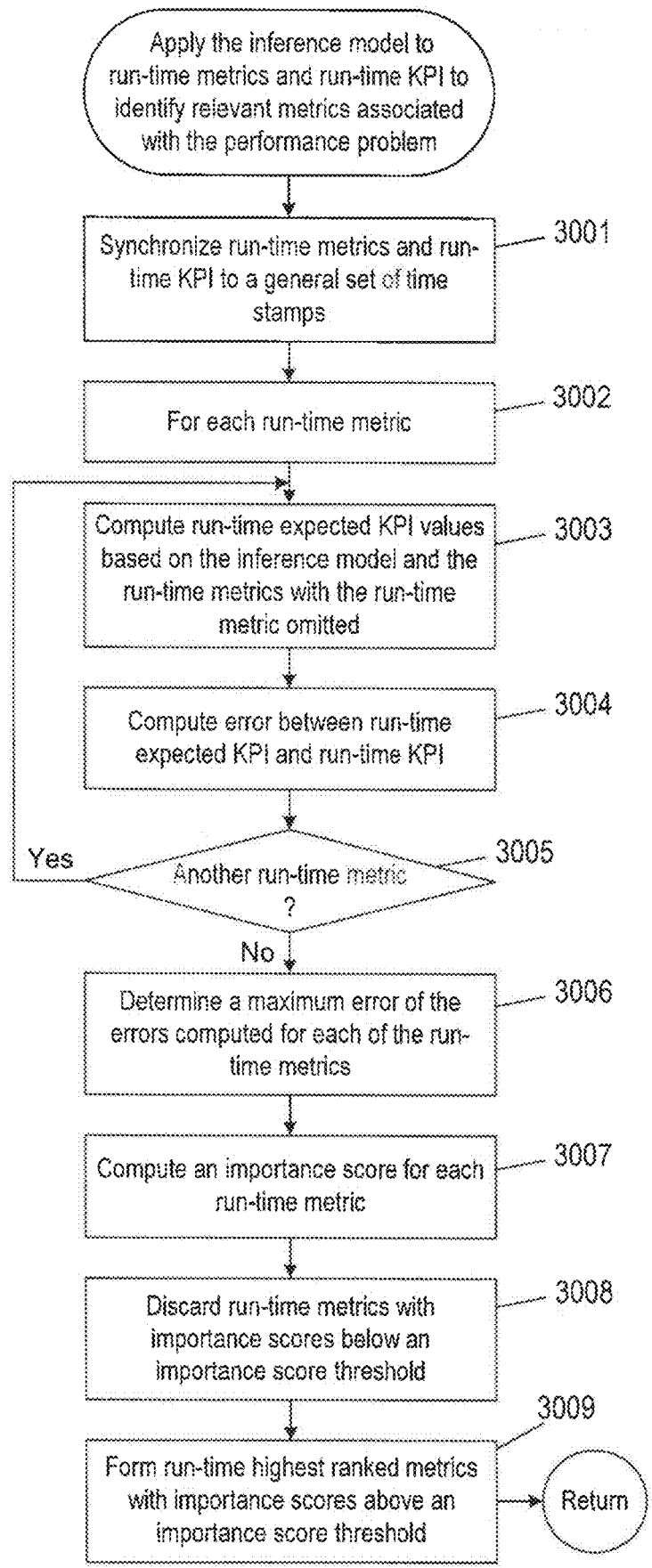
FIG. 30 is a flow diagram illustrating an example implementation of the "apply the inference model to run-time metrics and run-time KPI to identify relevant run-time metrics that are indicators of a performance problem with the application" procedure performed in FIG. 28.

FIG. 30 is a flow diagram illustrating an example implementation of the "apply the inference model to run-time metrics and run-time KPI to identify relevant run-time metrics that are indicators of a performance problem with the application" procedure performed in block 2804. In block 3001, the run-time metrics and the run-time KPI are synchronized to the same set of regularly spaced time stamps as described above with reference FIG. 16B. A loop beginning with block 3002 repeats the computational operations represented by blocks 3003-3004 for each run-time metric. In block 3003, run-time expected KPI values are computed based on the inference model and the run-time metrics with the current run-time metric omitted from the computation as described above with reference to Equation (23). In block 3004, an error, such as MSE or root MSE, is computed between the run-time expected KPI and the run-time KPI. In decision block 3005, computer-implemented operations represented by blocks 3003 and 3004 are repeated for another run-time metric. In block 3006, a maximum error of the errors is determined as described above with reference to Equation (24). In block 3007, an importance score is computed for each of the run-time metrics as described above with reference to Equation (25). In block 3008, run-time metrics with importance scores that are less than an importance score threshold are discarded. In block 3009, the run-time relevant metrics are the run-time metrics with importance scores that are greater than the importance score threshold are rank ordered based on the importance scores.

Figure 31:
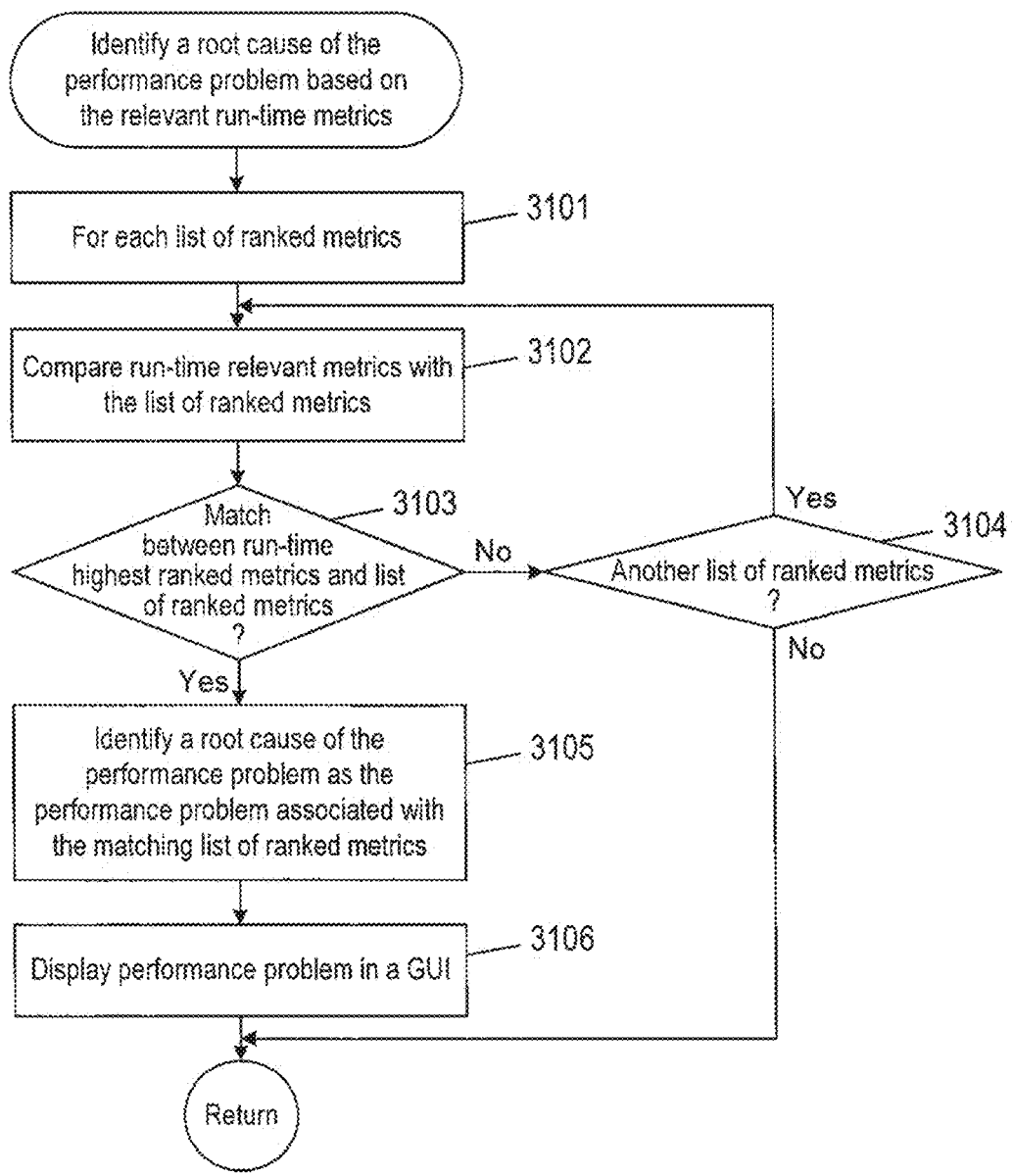
FIG. 31 is a flow diagram illustrating an example implementation of the "identify a root cause of the performance problem based on the relevant run-time metrics" procedure performed in FIG. 28.

FIG. 31 is a flow diagram illustrating an example implementation of the "identify a root cause of the performance problem based on the relevant run-time metrics" procedure performed in block 2805. A loop beginning with block 3101 repeats the computational operations represented by blocks 3103-3104 for each list of ranked metrics associated with a different type of performance problem as described above with reference to FIG. 23. In block 3102, the run-time relevant metrics are compared with the list of ranked metrics as described above with reference to FIG. 23. In block 3103, when the run-time relevant metrics matches the list of ranked metrics, control flows to block 3105. Otherwise, control flows to decision block 3104 and the block 3102 is repeated for another run-time relevant metric. In block 3105, a root cause of the performance problem is identified as the performance problem associated with the list of ranked metrics that matches the run-time relevant metrics as described above with reference FIG. 23. In block 3106, the performance problem is displayed in a GUI as described above with reference to FIGS. 24 and 25.

Figure 32:
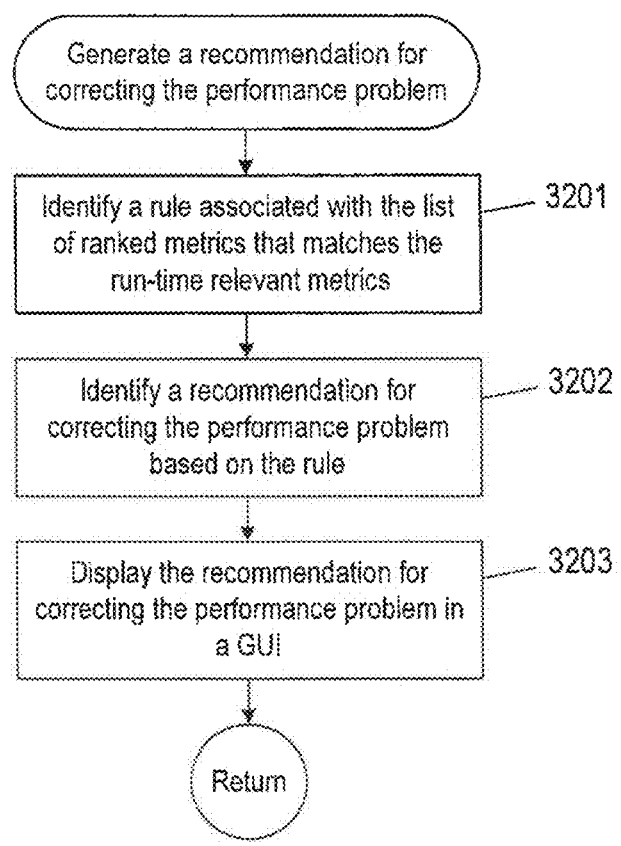
FIG. 32 is flow diagram illustrating an example implementation of the "generate a recommendation for correcting the performance problem" procedure performed in FIG. 28.

FIG. 32 is a flow diagram illustrating an example implementation of the "generate a recommendation for correcting the performance problem" procedure performed in block 2606. In block 3201, a rule associated with the list of ranked metrics that matches the run-time relevant metrics is identified, as described above with reference to FIG. 24. In another implementation, only highest ranked metrics with run-time metrics that violate corresponding thresholds are used to identify a rule associated with the performance problem, as described above with reference to Equation (29) and FIG. 25. In block 3202, a recommendation for correcting the performance problem is identified based on the rule. In block 3203, the recommendation for correcting the performance problem is displayed in the GUI.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In an automated computer-implemented process for troubleshooting and correcting a performance problem of an application running in a distributed computing system, the improvement comprising: training an inference model of the application based on metrics associated with the application and a key performance indicator ("KPI") of the application over a historical time window retrieved from a data storage device; in response to detecting a run-time performance problem in run-time KPI values, applying the inference model to run-time metrics and run-time KPI values of the application to identify relevant run-time metrics that are indicators of the performance problem; identifying a root cause of the performance problem based on the relevant run-time metrics; and using a script program to execute one or more remedial measures to correct the root cause of the performance problem, wherein the remedial measures include migrating a virtual object of the application to a different server computer, reconfiguring a virtual network used by virtual objects of the application, and allocating one or more of additional CPUs, memory, and network bandwidth to a virtual object of the application.

2. The process of claim 1 wherein training the inference model based on the metrics and the KPI comprises:
normalizing the metrics and the KPI;
synchronizing the metrics and the KPI to a general set of time stamps;
training a parametric inference model based on the metrics and the KPI over the historical time window;
computing a cross-validation estimate of the parametric inference model based on the KPI and a validating set of metrics and KPI over a historical time window;
using the parametric inference model as the inference model when the cross-validation estimate is less than a cross-validation threshold; and
computing a non-parametric inference model that is used as the inference model when the cross-validation estimate is greater than the cross-validation threshold.

3. The process of claim 1 wherein applying the inference model to the run-time metrics and the run-time KPI values of the application comprises:
normalizing the run-time metrics and the KPI;
synchronizing the run-time metrics and the run-time KPI values to a general set of regularly spaced time stamps:
for each run-time metric of the run-time metrics,
computing a run-time expected KPI based on the inference model and the run-time metrics with the run-time metric omitted, and
computing an error between the run-time expected KPI and the run-time KPI;
determining a maximum error of the errors computed for each of the run-time errors;
computing an importance score for each of the run-time metrics based on the error associated with the run-time metric and the maximum error;
rank ordering the run-time metrics based on the associated importance scores; and
discarding run-time metrics with importance scores below an importance score threshold, wherein non-discarded highest ranked metrics are the run-time relevant metrics.

4. The process of claim 1 wherein identifying the root cause of the performance problem based on the relevant run-time metrics comprises:
for each list of ranked metrics stored in a data storage device,
comparing run-time relevant metrics with a list of ranked metrics, and
when the run-time relevant metrics matches the list of ranked metrics, identifying the root cause of the performance problem as a performance problem associated with the matching list of ranked metrics.

5. The process of claim 1 wherein identifying the recommendation for correcting the performance problem based on the relevant run-time metrics comprises:
identifying a rule associated with a list of ranked metrics that matches the run-time relevant metrics; and
identifying the recommendation for correcting the performance problem based on the rule.

6. The process of claim 1 further comprising retraining the inference model based on user-selected highest rank ordered metrics.

7. The process of claim 1 further comprising executing remedial measures that correct the performance problem associated with at least one of CPU, memory, network, hosts, virtual CPU, virtual memory, virtual network, and an application coding error.

8. A computer system for automatically troubleshooting and correcting a performance problem of an application executing in a distributed computing system, the system comprising: one or more processors; one or more data-storage devices; and machine-readable instructions stored in the one or more data-storage devices that when executed using the one or more processors controls the system to execute operations comprising: training an inference model of the application based on metrics associated with the application and a performance indicator ("KPI") of the application over a historical time window retrieved from a data storage device; in response to detecting a run-time performance problem in run-time KPI values, applying the inference model to run-time metrics and run-time KPI values of the application to identify relevant run-time metrics that are indicators of the performance problem; identifying a root cause of the performance problem based on the relevant run-time metrics; and using a script program to execute one or more remedial measures to correct the root cause of the performance problem, wherein the remedial measures include migrating a virtual object of the application to a different server computer, reconfiguring a virtual network used by virtual objects of the application, and allocating one or more of additional CPUs, memory, and network bandwidth to a virtual object of the application.

9. The system of claim 8 wherein training the inference model based on the metrics and the KPI comprises:
normalizing the metrics and the KPI;
synchronizing the metrics and the KPI to a general set of time stamps:
training a parametric inference model based on the metrics and the KPI over the historical time window;
computing a cross-validation estimate of the parametric inference model based on the KPI and a validating set of metrics and KPI over a historical time window;
using the parametric inference model as the inference model when the cross-validation estimate is less than a cross-validation threshold; and
computing a non-parametric inference model that is used as the inference model when the cross-validation estimate is greater than the cross-validation threshold.

10. The system of claim 8 wherein applying the inference model to the run-time metrics and the run-time KPI values of the application comprises:
normalizing the run-time metrics and the KPI;
synchronizing the run-time metrics and the run-time KPI values to a general set of regularly spaced time stamps;
for each run-time metric of the run-time metrics,
computing a run-time expected KPI based on the inference model and the run-time metrics with the run-time metric omitted, and
computing an error between the run-time expected KPI and the run-time KPI;
determining a maximum error of the errors computed for each of the run-time errors;
computing an importance score for each of the run-time metrics based on the error associated with the run-time metric and the maximum error;
rank ordering the run-time metrics based on the associated importance scores; and
discarding run-time metrics with importance scores below an importance score threshold, wherein non-discarded highest ranked metrics are the run-time relevant metrics.

11. The system of claim 8 wherein identifying the root cause of the performance problem based on the relevant run-time metrics comprises:
for each list of ranked metrics stored in a data storage device,
comparing run-time relevant metrics with a list of ranked metrics, and
when the run-time relevant metrics matches the list of ranked metrics, identifying the root cause of the performance problem as a performance problem associated with the matching list of ranked metrics.

12. The system of claim 8 wherein identifying the recommendation for correcting the performance problem based on the relevant run-time metrics comprises:
identifying a rule associated with a list of ranked metrics that matches the run-time relevant metrics; and
identifying the recommendation for correcting the performance problem based on the rule.

13. The system of claim 8 further comprising retraining the inference model based on user-selected highest rank ordered metrics.

14. The system of claim 8 further comprising executing remedial measures that correct the performance problem associated with at least one of CPU, memory, network, hosts, virtual CPU, virtual memory, virtual network, and an application coding error.

15. An operations manager stored in one or more data storage devices and executing instructions using one or more processors of a computer system, the operations manager uses the one or more processor to execute instructions to perform operations comprising: training an inference model of an application running in a distributed computing system based on metrics associated with the application and a key performance indicator ("KPI") of the application over a historical time window retrieved from a data storage device; in response to detecting a run-time performance problem in run-time KPI values, applying the inference model to run-time metrics and run-time KPI values of the application to identify relevant run-time metrics that are indicators of the performance problem; identifying a root cause of the performance problem based on the relevant run-time metrics; and using a script program to execute one or more remedial measures to correct the root cause of the performance problem, wherein the remedial measures include migrating a virtual object of the application to a different server computer, reconfiguring a virtual network used by virtual objects of the application, and allocating one or more of additional CPUs, memory, and network bandwidth to a virtual object of the application.

16. The operations manager of claim 15 wherein training the inference model based on the metrics and the KPI comprises:
normalizing the metrics and the KPI;
synchronizing the metrics and the KPI to a general set of time stamps;
training a parametric inference model based on the metrics and the KPI over the historical time window;
computing a cross-validation estimate of the parametric inference model based on the KPI and a validating set of metrics and KPI over a historical time window;

using the parametric inference model as the inference model when the cross-validation estimate is less than a cross-validation threshold; and computing a non-parametric inference model that is used as the inference model when the cross-validation estimate is greater than the cross-validation threshold.

17. The operations manager of claim 15 wherein applying the inference model to the run-time metrics and the run-time KPI values of the application comprises:

normalizing the run-time metrics and the KPI;

synchronizing the run-time metrics and the run-time KPI values to a general set of regularly spaced time stamps;

for each run-time metric of the run-time metrics,
computing a run-time expected KPI based on the inference model and the run-time metrics with the run-time metric omitted, and
computing an error between the run-time expected KPI and the run-time KPI;

determining a maximum error of the errors computed for each of the run-time errors;

computing an importance score for each of the run-time metrics based on the error associated with the run-time metric and the maximum error;

rank ordering the run-time metrics based on the associated importance scores; and discarding run-time metrics with importance scores below an importance score threshold, wherein non-discarded highest ranked metrics are the run-time relevant metrics.

18. The operations manager of claim 15 wherein identifying the root cause of the performance problem based on the relevant run-time metrics comprises:

for each list of ranked metrics stored in a data storage device,
comparing run-time relevant metrics with a list of ranked metrics, and
when the run-time relevant metrics matches the list of ranked metrics, identifying the root cause of the performance problem as a performance problem associated with the matching list of ranked metrics.

19. The operations manager of claim 15 wherein identifying the recommendation for correcting the performance problem based on the relevant run-time metrics comprises:

identifying a rule associated with a list of ranked metrics that matches the run-time relevant metrics; and
identifying the recommendation for correcting the performance problem based on the rule.

20. The operations manager of claim 15 further comprising retraining the inference model based on user-selected highest rank ordered metrics.

21. The operations manager of claim 15 further comprising executing remedial measures that correct the performance problem associated with at least one of CPU, memory, network, hosts, virtual CPU, virtual memory, virtual network, and an application coding error.

* * * * *